(12) United States Patent
Natori

(10) Patent No.: US 11,215,449 B2
(45) Date of Patent: Jan. 4, 2022

(54) THREE-DIMENSIONAL SHAPE MEASURING APPARATUS

(71) Applicant: Keyence Corporation, Osaka (JP)

(72) Inventor: Kazuki Natori, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/918,116

(22) Filed: Jul. 1, 2020

(65) Prior Publication Data
US 2021/0041229 A1    Feb. 11, 2021

(30) Foreign Application Priority Data

Aug. 6, 2019   (JP) ............................... JP2019-144973

(51) Int. Cl.
*G01B 11/25* (2006.01)

(52) U.S. Cl.
CPC ........ *G01B 11/254* (2013.01); *G01B 11/2522* (2013.01)

(58) Field of Classification Search
CPC ..... G01B 11/24; G01B 11/2513; G01B 11/25; G01B 11/2441; G01B 11/2518; G01B 21/20; G01B 11/2527; G01B 11/0608; G01B 11/2522; G01B 11/254; G01B 11/005; G01B 11/14; G01B 11/2545; G01B 15/04; G01B 11/245; G01B 11/2504;

(Continued)

(56) References Cited

U.S. PATENT DOCUMENTS 10,323,933 B2   6/2019  Fujiwara et al.
2011/0001818 A1*  1/2011  Hur ..................... G01N 21/8806
                                                348/87

(Continued)

FOREIGN PATENT DOCUMENTS

DE      102015210440 A1 * 12/2015 ............. G06T 7/586
EP           2444210 A1 *  4/2012 ......... G01B 11/2518

(Continued)

OTHER PUBLICATIONS

U.S. Appl. No. 16/918,100, filed Jul. 1, 2020 (121 pages).
U.S. Appl. No. 16/918,108, filed Jul. 1, 2020 (117 pages).

*Primary Examiner* — Michael P Stafira
(74) *Attorney, Agent, or Firm* — Kilyk & Bowersox, P.L.L.C.

(57) ABSTRACT

A three-dimensional shape measuring apparatus includes a photoreceptor that receives measuring light which is reflected by a workpiece illuminated by an illuminator, and provides light-reception signals representing a light reception amount; and a processor that generates a set of shape data representing three-dimensional shape of a part of the workpiece which is included in the field of view at a particular position of the stage based on the signals, repeats movement of the stage by using a movement controller based on the generated data corresponding to the part of the workpiece to obtain a set of data corresponding to other part of the workpiece which is located in proximity to the part of the workpiece and the generation of a set of data of the workpiece at the position where the stage is moved, and generates combined data including the entire shape of the workpiece by combining the repeatedly obtained sets of data.

12 Claims, 44 Drawing Sheets

(58) Field of Classification Search
CPC ............ G01B 2210/52; G01B 5/0004; G01B 9/02083; G01B 9/0209; G01B 11/00; G01B 11/002; G01B 11/007; G01B 11/2536; G01B 21/04; G01B 21/047; G01B 9/02004; G01B 9/02005; G01B 9/02015; G01B 9/0203; G01B 9/02069; G01B 9/02091; G01B 9/02094; G01B 9/02096; G01B 11/02; G01B 11/03; G01B 11/04; G01B 11/0691; G01B 11/08; G01B 11/12; G01B 11/167; G01B 11/2416; G01B 11/2351; G01B 11/26; G01B 11/303; G01B 21/02; G01B 21/042; G01B 21/045; G01B 21/10; G01B 2210/42; G01B 2210/54; G01B 2290/35; G01B 2290/65; G01B 2290/70; G01B 9/02; G01B 9/02028; G01B 9/02034; G01B 9/02038; G01B 9/02042; G01B 9/02043; G01B 9/02044; G01B 9/0205; G01B 9/02059; G01B 9/02063; G01B 9/02064; G01B 9/02077; G01B 9/02081; G01B 9/02087; G01B 9/04; G01B 5/20; G01B 5/008; G01B 11/026; G01B 11/2509; G01B 11/2531; G01B 11/06; G01B 11/306; G01B 13/16; G01B 11/0658; G01B 2210/50; G01B 9/02057; G01B 9/02072; G01B 11/22; G01B 21/30; G01B 11/022; G01B 11/16; G01B 21/00; G01B 5/012; G01B 9/02039; G01B 11/30; G01B 5/0021; G01B 7/012; G01B 2290/25; G01B 5/28; G01B 15/00; G01B 5/8252; G01B 11/2408; G01B 11/272; G01B 15/025; G01B 15/045; G01B 21/22; G01B 21/24; G01B 2210/58; G01B 5/0014; G01B 11/2425; G01B 11/2433; G01B 5/00; G01B 5/24; G01B 5/245; G01B 5/25; G01B 11/255; G01B 17/06; G01B 21/08; G01B 21/18; G01B 21/32; G01B 5/201; G01B 5/024; G01B 5/213; G01B 7/284; G01B 9/02007; G01B 9/02041; G01B 9/0207; G01B 9/02089; G01B 11/18; G01B 11/27; G01B 3/14; G01B 5/0002; G01B 5/046; G01B 9/0201; G01B 9/02023; G01B 9/02055; G01B 9/02056; G01B 9/02076; G01B 9/02088; G01B 11/161; G01B 11/165; G01B 21/16; G01B 2210/56; G01B 5/0168; G01B 9/02036; G01B 9/02065; G01B 15/08; G01B 17/00; G01B 17/02; G01B 2210/286; G01B 5/004; G01B 5/205; G01B 7/28; G01B 11/0625; G01B 11/10; G01B 11/105; G01B 11/28; G01B 21/28; G01B 3/008; G01B 5/202; G01B 5/207; G01B 7/008; G01B 7/34; G01B 9/02003; G01B 9/02022; G01B 9/02062; G01B 9/02085; G01B 11/024; G01B 11/028; G01B 11/0616; G01B 11/162; G01B 11/2755; G01B 11/285; G01B 21/06; G01B 2210/14; G01B 2210/22; G01B 7/06; G01B 7/285; G01B 7/287; G01B 9/02021; G01B 9/02027; G01B 9/02048; G01B 9/02049; G01B 9/02061; G01B 9/02068; G01B 9/02071; G01B 9/02078; G01N 2223/304; G01N 23/04; G01N 23/046; G01N 21/8806; G01N 2223/306; G01N 2223/401; G01N 2223/646; G01N 2021/1785; G01N 2021/4711; G01N 2021/845; G01N 2021/8829; G01N 2021/8887; G01N 21/17; G01N 21/35; G01N 21/47; G01N 21/8851; G01N 21/95; G01N 21/9501; G01N 21/9515; G01N 21/954; G01N 21/958; G01N 2201/06113; G01N 2223/045; G01N 2223/05; G01N 2223/321; G01N 2223/6116; G01N 23/20016; G01N 23/20025; G01N 23/201; G01N 23/203; G01N 33/5008

See application file for complete search history.

(56) References Cited

U.S. PATENT DOCUMENTS

| | | | |
|---|---|---|---|
| 2011/0191050 A1* | 8/2011 | Jeong | G16Z 99/00 |
| | | | 702/82 |
| 2014/0071243 A1* | 3/2014 | Nakatsukasa | G01B 11/24 |
| | | | 348/46 |
| 2014/0071458 A1* | 3/2014 | Nakatsukasa | G01B 11/2545 |
| | | | 356/603 |
| 2014/0071459 A1* | 3/2014 | Nakatsukasa | G01B 11/24 |
| | | | 356/611 |
| 2014/0104621 A1* | 4/2014 | Ichimaru | B25J 9/1697 |
| | | | 356/602 |
| 2016/0161250 A1* | 6/2016 | Nakamura | G01B 11/2416 |
| | | | 356/610 |
| 2018/0058843 A1* | 3/2018 | Tabuchi | G01B 21/04 |

FOREIGN PATENT DOCUMENTS

| | | | | | |
|---|---|---|---|---|---|
| JP | 2017198559 A | * | 11/2017 | ........... | G01B 11/005 |
| JP | 2018004278 A | | 1/2018 | | |
| JP | 2018004279 A | * | 1/2018 | ............ | G06T 7/521 |
| KR | 20180106016 A | * | 10/2018 | | |

* cited by examiner

FIG. 18

S1801: PLACE WORKPIECE ON PLACEMENT SURFACE

S1802: SPECIFY MEAS. CONDITIONS (BRIGHTNESS, ORIENTATION)

S1803: OPEN MEAS.-AREA SETTING SCREEN AND ISSUE INSTRUCTION TO GENERATE TOP VIEW MAP IMAGE

S1804: GENERATE AND DISPLAY TOP VIEW MAP IMAGE

S1805: CHECK TOP VIEW MAP IMAGE

S1806: IMAGE CAPTURE AREAS OF TOP VIEW MAP IMAGE SUFFICIENT?
- NO → S1807
- YES → S1809

S1807: INSTRUCT TO GENERATE ADDITIONAL TOP VIEW MAP IMAGE

S1808: ADD TOP VIEW MAP IMAGE TO DISPLAY (loops back to S1805)

S1809: DEFINE MEAS. AREAS

S1810: ISSUE MEAS. INSTRUCTION

S1811: EXECUTE MEASUREMENT

FIG. 20
| Stage Position | Texture | Top View Before Combination | Top View After Combination |
|---|---|---|---|
| 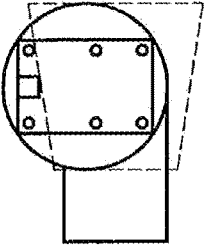 | 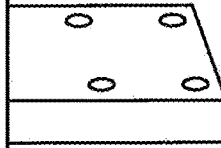 | 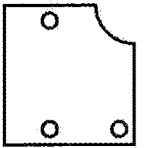 | 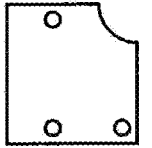 |
| 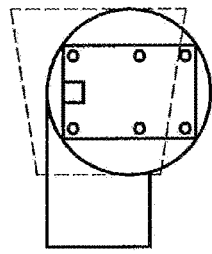 | 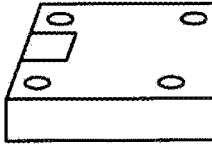 | 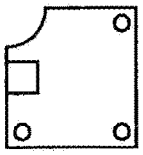 | 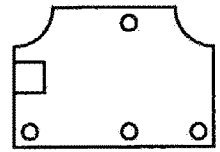 |
| 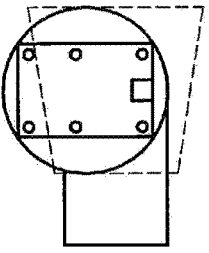 | 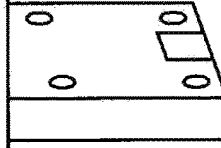 | 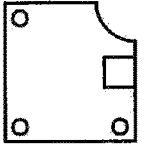 | 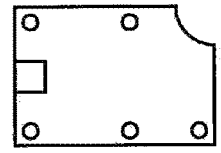 |
| 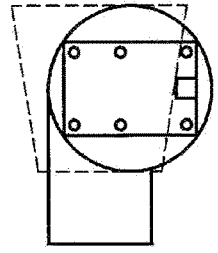 | 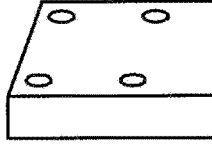 | 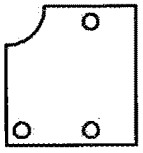 | 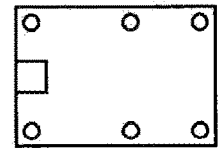 |

THREE-DIMENSIONAL SHAPE MEASURING APPARATUS

CROSS-REFERENCE TO RELATED APPLICATIONS

The present application claims priority under 35 U. S. C. § 119 to Japanese Patent Application No. 2019-144,973, filed on Aug. 6, 2019, the contents of which are incorporated herein by reference.

BACKGROUND OF THE INVENTION

1. Field of the Invention

The present disclosure relates to a three-dimensional shape measuring apparatus which performs predetermined inspections including a height information inspection on a three-dimensional measurement object.

2. Description of the Related Art

A triangulation-type three-dimensional shape measuring apparatus is known (for example, JP 2018-4278 A). The three-dimensional shape measuring apparatus includes a stage on which a measurement object is placed, and a head which is fixedly coupled to the stage to illuminate the measurement object with measuring light and receive reflected light from the measurement object. According to this, its robustness against external environment change such as robustness over change such as resistance to vibration can be improved, and a three-dimensional shape of the measurement object can be stably measured. In addition, in the three-dimensional shape measuring apparatus, the stage is a rotatable stage which rotates the measurement object in order to measure a three-dimensional shape of the measurement object from a plurality of directions.

In such a noncontact-type three-dimensional shape measuring apparatus which includes a movable stage, even a large measurement object which cannot be held in its intrinsic field of view can measure changing an area corresponding to the field of view by moving the stage.

On the other hand, in order to measure a plurality of parts of the measurement object, it is necessary to define measurement areas. However, such definition needs time and effort. That is, there are problems such as increase of the number of captured images caused by overlap between the measurement areas if the measurement areas are not properly defined, and leaving of non-measured areas in the measurement object conversely if the measurement areas insufficiently cover the measurement object.

It is one object of the present invention to provide a three-dimensional shape measuring apparatus which can efficiently measure a measurement object by using a movable stage.

SUMMARY OF THE INVENTION

A three-dimensional shape measuring apparatus according to a first aspect of the present invention is a three-dimensional shape measuring apparatus which measures a three-dimensional shape of a measurement object, the apparatus including a stage that includes a placement surface on which a measurement object is placed, and can move the placement surface; a movement controller that controls the movement of the stage; an illuminator that illuminates the measurement object, which is placed on the stage, with measuring light having a predetermined pattern; a photoreceptor that receives the measuring light which is reflected by the measurement object illuminated by the illuminator, and provides light-reception signals representing a light reception amount; and a processor that generates a set of shape data representing three-dimensional shape of at least a part of the measurement object which is included in the field of view of the photoreceptor at a particular position of the stage based on the light-reception signals which are provided from the photoreceptor, repeats movement of the stage by using the movement controller based on the generated shape data corresponding to the at least a part of the measurement object to obtain a set of shape data corresponding to other part of the measurement object which is located in proximity to the at least a part of the measurement object and the generation of a set of shape data of the measurement object at the position where the stage is moved, and generates combined shape data including the entire shape of the measurement object by combining the repeatedly obtained sets of shape data. According to this construction, three-dimensional measurement can be easily conducted based on automatic determination of the exterior shape of a measurement object without users' concern about image capture area.

Also in a three-dimensional shape measuring apparatus according a second aspect of the present invention, in addition to the aforementioned aspect, the stage includes a rotation stage part that can rotate the placement surface about a rotation axis, and a translation stage part that translates the placement surface in a plane to which the placement surface belongs, and the three-dimensional shape measuring apparatus further includes a mount that supports the rotation stage part and the translation stage part so that they overlap one another as viewed in the rotation axis direction of the rotation stage part.

Also in a three-dimensional shape measuring apparatus according a third aspect of the present invention, in addition to any of the aforementioned aspects, the processor determines whether only rotates the rotation stage part, or rotates the rotation stage part and translates the translation stage part based on the shape data corresponding to the at least a part of the measurement object. According to this construction, three-dimensional measurement can be easily conducted based on automatic determination of the exterior shape of a measurement object without users' concern about image capture area.

Also in a three-dimensional shape measuring apparatus according a fourth aspect of the present invention, in addition to any of the aforementioned aspects, the movement controller controls X-Y direction movement of the translation stage part, and then controls the rotation of the rotation stage part at the position after the X-Y direction movement.

Also in a three-dimensional shape measuring apparatus according a fifth aspect of the present invention, in addition to any of the aforementioned aspects, the translation stage part is arranged above the rotation stage part, which is supported by the mount, to be able to be translated in the stage.

Also in a three-dimensional shape measuring apparatus according a sixth aspect of the present invention, in addition to any of the aforementioned aspects, the apparatus further includes a support that is coupled to the mount, and fixedly supports the illuminator and the photoreceptor to produce a measurement area to be measured by the measuring light above the stage, and a fixer that is fastened to an upper part of the support, and fixes the illuminator and the photoreceptor to incline optical axes of the illuminator and the photoreceptor with respect to the placement surface so that the illuminator and the photoreceptor face the measurement area obliquely downward.

Also in a three-dimensional shape measuring apparatus according a seventh aspect of the present invention, in addition to any of the aforementioned aspects, the processor can generate shape data of the measurement object under simple generation conditions. According to this construction, even though the simple generation conditions provide measurement of a measurement object with low accuracy, the movement controller can roughly grasp the position of the measurement object and determine moving directions of the stage, there is an advantage that the processing can be simple.

Also in a three-dimensional shape measuring apparatus according an eighth aspect of the present invention, in addition to any of the aforementioned aspects, the simple generation conditions includes at least one of shorter exposure time of the photoreceptor than normal, higher gain than normal, reduction in resolution, limitation on the number of used illuminators if two or more illuminators are included, limitation on the number of used projection patterns of the illuminator if two or more projection patterns are included, limitation on the number of used photoreceptors if two or more photoreceptors are included, and disallowance of rotation of the rotation stage part in acquisition of the light-reception signals.

Also in a three-dimensional shape measuring apparatus according a ninth aspect of the present invention, in addition to any of the aforementioned aspects, the processor generates a top view map image representing a plan view of the measurement object, which is placed on the stage, as viewed downward from a position right above the measurement object based on simple shape data that is generated under the simple generation conditions, and determines a measurement area or measurement areas to be measured based on an outline of the measurement object which is extracted from the top view map image.

Also in a three-dimensional shape measuring apparatus according a tenth aspect of the present invention, in addition to any of the aforementioned aspects, the processor selects only rotation operation of the rotation stage part or the combination of rotation operation of the rotation stage part and translation operation of the translation stage part based on the determined measurement area or measurement areas to be measured whereby measuring the measurement area or measurement areas.

Also in a three-dimensional shape measuring apparatus according an eleventh aspect of the present invention, in addition to any of the aforementioned aspects, the apparatus further includes an exposure adjuster that adjusts exposure time of the photoreceptor based on the light-reception signals provided from the photoreceptor by removing a surrounding area of the stage from the light-reception signals.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 18 is a flowchart illustrating the procedure for instruction by users to generate a top view map image;

FIG. 20 illustrates exemplary generated top view map images;

DESCRIPTION

Figure 1:
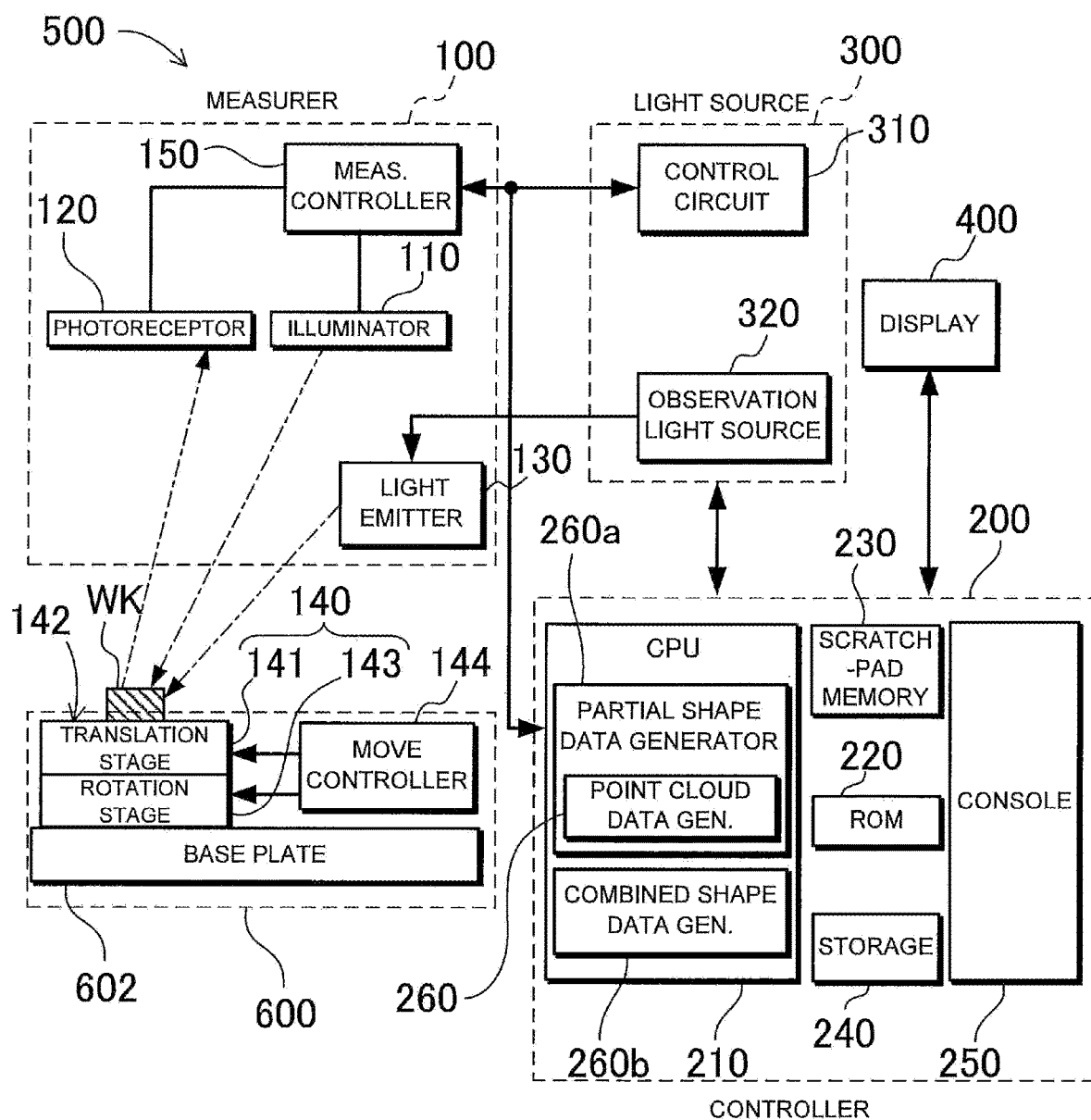
FIG. 1 is a block diagram showing an image inspection apparatus according to a first embodiment of the present invention.

The following description will describe embodiments according to the present invention with reference to the drawings. It should be appreciated, however, that the embodiments described below are illustrations of a three-dimensional shape measuring apparatus to give a concrete form to technical ideas of the invention, and a three-dimensional shape measuring apparatus of the invention is not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this invention are attached with the same designation and the same reference numerals and their description is omitted. In addition, a plurality of structural elements of the present invention may be configured as a single part that serves the purpose of a plurality of elements, on the other hand, a single structural element may be configured as a plurality of parts that serve the purpose of a single element.

In this specification, the term "texture image" refers to an observed image (typically, optical image) which includes texture information. In addition, the term "height image" is also referred to as depth map and the like, and is used to mean an image which includes height information. Examples of height images can be provided by images which have height information converted into luminance, chromaticity, or the like represented as a two-dimensional image, and images have height information as Z coordinate information represented as a three-dimensional image. Also, height images include a three-dimensional combined image which is obtained by applying a texture image as texture information onto the aforementioned exemplary height image. In addition, in this specification, display forms for height images are not limited to two-dimensional representation but can include three-dimensional representation. For example, the display forms for height images can include two-dimensional representation which has height information included in a height image converted into luminance or the like, and three-dimensional representation which has height information converted into Z coordinate information.

In addition, in this specification, the term "orientation" of a measurement object which is placed on a stage refers to a rotation angle of the measurement object. It is noted that in the case in which a measurement object is an axially symmetrical shape such as a circular cone which has a circle as viewed in a plan view its orientation is not required to be defined because the same result is obtained irrespective of its rotation angle.

In the following embodiments, in order to obtain height information of a measurement object, the measurement object is illuminated with measuring light having a predetermined pattern so that its height information is obtained by using signals obtained from reflected light which is reflected by surfaces of the measurement object. For example, a measuring method using triangulation which uses structured light as the measuring light having a predetermined pattern, projects it onto a measurement object, and uses striped projection images obtained from the reflected light. However, the principle and construction for obtaining height information of a measurement object in the present invention are not limited to this but other method can be used to obtain height information of a measurement object.

First Embodiment

A three-dimensional shape measuring apparatus can measure heights in a measurement object image in three dimensions. Also, in addition to the three-dimensional measurement, two-dimensional measurement can be performed. FIG. 1 is a block diagram showing a three-dimensional shape measuring apparatus according to a first embodiment of the present invention. This illustrated three-dimensional shape measuring apparatus 500 includes a measurer 100, a mount 600, a controller 200, a light source 300, and a display 400. The three-dimensional shape measuring apparatus 500 illuminates a measurement object WK with structured light by using the light source 300, captures striped projection images of the measurement object WK to generate a height image including height information, and can measure the three-dimensional dimensions and shape of the measurement object WK based on the height image. Because the measurement using such striped projection can measure height without moving the measurement object WK or the optical system such as lenses in the Z direction, there is an advantage that measurement time can be reduced.

The measurer 100 includes an illuminator 110, a photoreceptor 120, a measurement controller 150, and an illumination light emitter 130. The illuminator 110 illuminates the measurement object WK, which is placed on the stage 140, with measuring light having a predetermined pattern. The photoreceptor 120 is fastened to the placement surface 142 in an inclined orientation. The photoreceptor 120 is illuminated by the illuminator 110, and receives measuring light reflected from the measurement object WK to provide light-reception signals representing a light reception amount. The photoreceptor 120 can generate an observed image for observing the entire shape of the measurement object WK by capturing images of the measurement object WK which is placed on the stage 140.

The mount 600 includes the stage 140 and a movement controller 144. This mount 600 supports the stage 140 on a base plate 602. The movement controller 144 serves as a member which moves the stage 140. Although the movement controller 144 is provided on the mount 600 side, it may be provided on the controller 200 side.

The light source 300 is connected to the measurer 100. The light source 300 emits measuring light, and provides it to the measurer 100. The controller 200 controls image capture in the measurer 100. The display 400 is connected to the controller 200, displays generated images, and serves as an HMI for necessary settings.

(Stage 140)

The mount 600 shown in FIG. 1 includes the stage 140 and the movement controller 144. The stage 140 has the placement surface 142 on in which the measurement object WK is placed. This stage 140 includes a rotation stage part 143 which rotates the placement surface 142, and a translation stage part 141 which translates the placement surface 142.

(Movement Controller 144)

The movement controller 144 controls rotational movement of the rotation stage part 143 and translational movement of the translation stage part 141 based on a measurement area which is defined by a measurement area setting part 264. In addition, the movement controller 144 controls movement operation of the stage 140 by a stage movement part based on the measurement area which is defined by the later-discussed measurement area setting part 264.

The controller 200 includes a CPU (central processing unit) 210, a ROM (read-only memory) 220, a scratch-pad memory 230, a storage 240, and a console 250. PCs (personal computers) or the like can be used for the controller 200. Also, the CPU 210 realizes the function of partial shape data and combined shape data generators 260*a* and 260*b* which generate point cloud data (discussed later in details), and the like.

(Block Diagram of Measurer 100)

Figure 2:
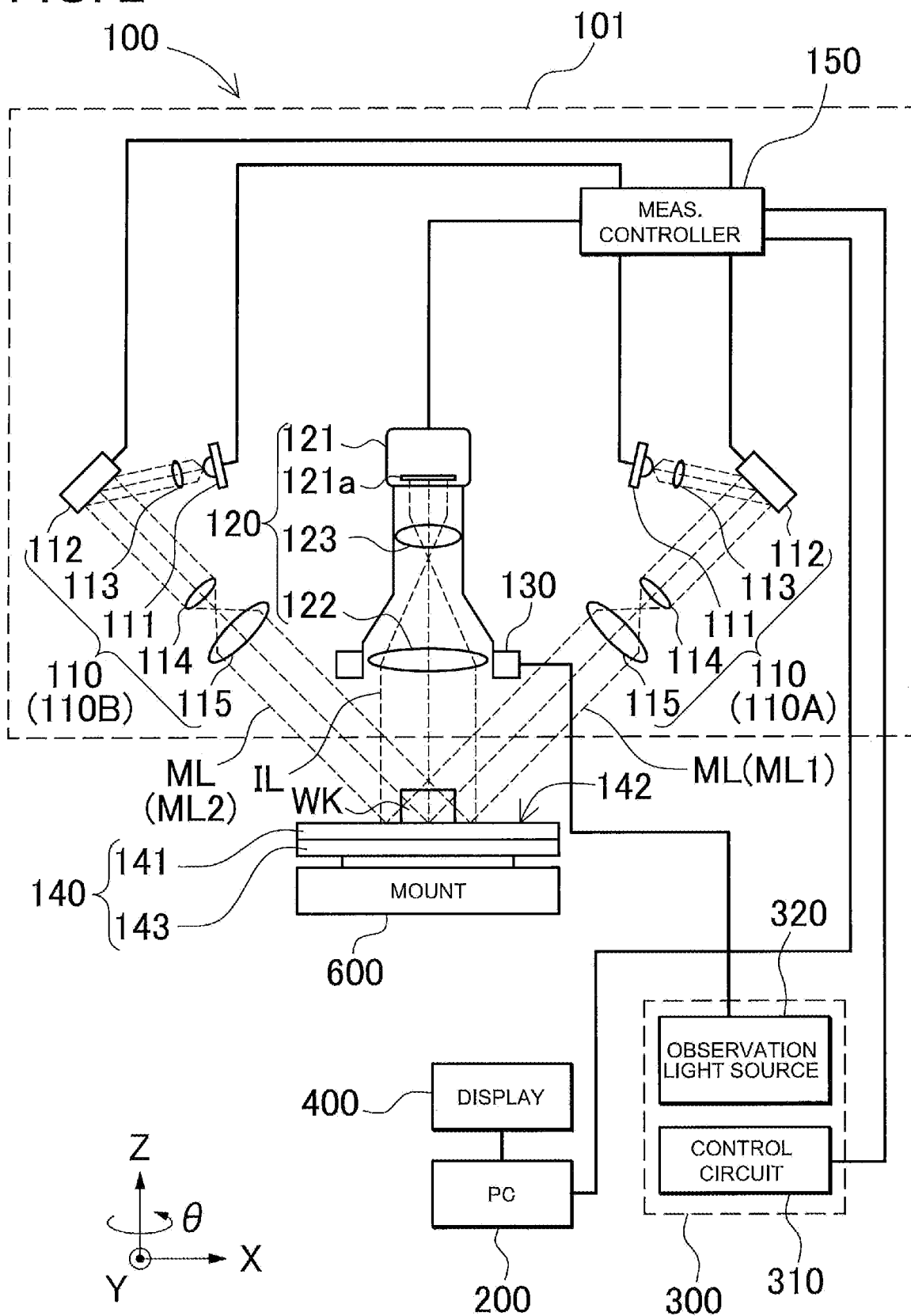
FIG. 2 is a block diagram showing the construction of a measurer in FIG. 1.

FIG. 2 is a block diagram showing the construction of the measurer 100 of the three-dimensional shape measuring apparatus 500 shown in FIG. 1. The measurer 100 is a microscope, for example, and includes the illuminator 110, the photoreceptor 120, the illumination light emitter 130, the measurement controller 150, a body case 101 which accommodates them, and the stage 140. The illuminator 110 includes a measuring light source 111, a pattern generator 112, and a plurality of lenses 113, 114 and 115. The photoreceptor 120 includes a camera 121, and a plurality of lenses 122 and 123. The measurement object WK is placed on the stage 140. The body case 101 is a resin or metal casing.

(Illuminator 110)

The illuminator 110 is arranged obliquely above the stage 140. The measurer 100 can include a plurality of illuminators 110. In the embodiment shown in FIG. 2, the measurer 100 includes two illuminators 110. In this embodiment, a first measuring-light illuminator 110A (right side in FIG. 2) which can illuminate the measurement object WK with first measuring light ML1 in a first direction, and a second measuring-light illuminator 110B (left side in FIG. 2) which can illuminate the measurement object WK with second measuring light ML2 in a second direction different from the first direction are provided. The first measuring-light illuminator 110A and the second measuring-light illuminator 110B are symmetrically arranged with respect to the optical axis of the photoreceptor 120. It is noted that three or more illuminators may be provided, or a common illuminator may be provided but a measurement object can be illuminated with light in different illumination directions by moving the common illuminator and the stage relative to each other. On the other hand, although a plurality of illuminators 110 are provided and the common photoreceptor 120 receives light in the foregoing embodiment, a plurality of photoreceptors may be provided to receive light from a common illuminator. In addition, although an illumination angle of illumination light which is emitted by the illuminator is fixed with respect to the vertical direction in this embodiment, the illumination angle can be changed.

(Measuring Light Source 111)

The first and second measuring-light illuminators 110A and 110B include first and second measuring light sources, respectively, as the measuring light source 111. The measuring light sources 111 are a halogen lamp which emits white light, for example. The measuring light source 111 may be a light source which emits monochromatic light, other light source such as white LED (light emitting diode) or organic electroluminescence which emits white light, for example. Light which is emitted by the measuring light source 111 (hereinafter, referred to as "measuring light") is properly condensed by the lens 113 and then enters the pattern generator 112.

(Pattern Generator 112)

The pattern generator 112 reflects light which is emitted by the measuring light source 111 to illuminate the measurement object WK with measuring light. The measuring light which enters the pattern generator 112 is converted into a predetermined pattern and predetermined intensity (brightness) and emitted from the pattern generator 112. The measuring light which is emitted from the pattern generator 112 is converted into light having a larger diameter than an observable and measurable field of view of the photoreceptor 120 by the lenses 114 and 115, and then incident on the measurement object WK on the stage 140.

The pattern generator 112 is a member which can be changed between an illumination state in which the measurement object WK is illuminated with measuring light and a non-illumination state in which the measurement object WK is not illuminated with measuring light. A DMD (digital micro mirror device) can be suitably, used for the pattern generator 112, for example. The pattern generator 112 which uses a DMD can be controlled by the measurement controller 150 between a reflection state in which measuring light is reflected to travel along an optical path as the illumination state and a light interception state in which the measuring light is intercepted as the non-illumination state.

The DMD is an element which includes a number of micro mirrors (very small mirror surfaces) MM arranged in a flat plane. Because the micro mirrors can be individually switched between ON and OFF states by the measurement controller 150, desired projection patterns can be formed by combination of ON and OFF states of the micro mirrors. Accordingly, the measurement object WK can be measured by generating a pattern required for triangulation. Consequently, the DMD serves as a projection pattern optical system which illuminates the measurement object WK with an alternate projection pattern for measurement when the measurement object WK is measured. In addition, such a DMD has an advantage of high response speed and high operating speed compared with shutters and the like.

It is noted that although the pattern generator 112 has been illustratively described to use the DMD in the foregoing embodiment, the pattern generator 112 is not limited to a DMD but other member can be used as the pattern generator. For example, a LCOS (Liquid Crystal on Silicon: reflective liquid crystal element) may be used as the pattern generator 112. Alternatively, instead of reflective members, a transmissive member may be used to adjust a transmission amount of measuring light. In this case, the pattern generator 112 is arranged on the optical path of measuring light, and is switched between the illumination state in which the measuring light passes through the pattern generator 112 and the light interception state in which the measuring light is intercepted. An LCD (liquid crystal display) can be suitably, used for the pattern generator 112, for example. Alternatively, the pattern generator 112 may be constructed of a projection system using a plurality lines of LEDs or a projection system using a plurality of light paths, an optical scanner system constructed of a laser and galvanometer mirrors, etc., an AFI (Accordion fringe interferometry) system using interference fringes produced by superposing beams divided by a beam splitter, a projection system using gratings constructed of a piezo stage, high resolution encoder, etc. and a moving mechanism, or the like.

In addition, although the three-dimensional shape measuring apparatus has been illustratively described to include two measuring-light illuminators in the embodiment shown in FIG. 2, etc., the present invention is not limited to this but the three-dimensional shape measuring apparatus can include three or more the measuring-light illuminators. Alternatively, the three-dimensional shape measuring apparatus can only include a single measuring-light illuminator. In this case, the measurement object WK can be illuminated with measuring light in different directions by moving the single measuring-light illuminator which is movable between different positions.

(Photoreceptor 120)

The photoreceptor 120 is arranged above the stage 140. Measuring light which is reflected upward of the stage 140 by the measurement object WK is condensed to form an image by the lenses 122 and 123 of the photoreceptor 120, and is then received by the camera 121.

(Camera 121)

The camera 121 is a CCD (charge-coupled device) camera which includes an image pickup device 121a and lenses, for example. The image sensor 121a is a monochromatic CCD (charge-coupled device), for example. The image pickup devices 121a may be other image pickup device such as CMOS (complementary metal-oxide semiconductor) image sensor. Because color image pickup devices necessarily includes pixels which receive red light, green light, and blue light, color image pickup devices have lower measurement resolution as compared with monochromatic image pickup devices, and color image pickup devices have lower sensitivity because color filters are necessarily provided to their pixels. For this reason, in this embodiment, a monochromatic CCD is used as the image pickup device, and color images are captured by separately illuminating a measurement object with R light, G light, and B light which are emitted by the later-discussed illumination light emitter 130 at different timing. According to this construction, color images of the measurement object can be captured without reduction of measurement accuracy.

However, needless to say, a color image pickup device may be used as the image pickup device 121a. In this case, although measurement accuracy or sensitivity will be reduced, the illumination light emitter 130 does not necessarily emit R light, G light, and B light at different timing, and the illumination optical system can be simple because color image can be captured by emitting only white light. The pixels of the image pickup device 121a provide analog electric signals corresponding to amounts of their received light (hereinafter, referred to as "light-reception signals") to the measurement controller 150.

Such captured images of a measurement object WK form a similar figure very accurately similar to the measurement object WK in accordance with the characteristics of the lens. In addition, the dimensions in the image and the dimensions in the actual measurement object WK can be accurately associated with each other by calibration using scaling of the lens.

(Measurement Controller 150)

The measurement controller 150 includes an A/D convertor (analog/digital converter) and FIFO (First In First Out) memory (not shown). The light-reception signals which are provided from the camera 121 are periodically sampled at a fixed sampling period by the A/D convertor of the measurement controller 150, and are converted into digital signals under control of the light source 300. The digital signals which are provided from the A/D convertor are sequentially accumulated in the FIFO memory. The digital signals which are accumulated in the FIFO memory are sequentially transmitted as pixel data to the controller 200.

(Controller 200)

As shown in FIG. 1, the controller 200 includes the CPU 210, the ROM 220, the scratch-pad memory 230, the storage 240, and the console 250. The console 250 can include a keyboard and a pointing device. A mouse or joy stick can be used as the pointing device.

The ROM 220 stores a system program. The scratch-pad memory 230 is constructed of a RAM (random access memory), and is used for various types of data processing. The storage 240 is constructed of a hard disk and the like. The storage 240 stores a three-dimensional shape measurement program for operating the three-dimensional shape measuring apparatus. In addition, the storage 240 is used to save various types of data such as pixel data which are provided by the measurement controller 150 and the like. Also, the storage stores illuminance information, height information, and attribute information of pixels which are included in the measurement image.

(CPU 210)

The CPU 210 is a control circuit or a controlling device which performs various types of computations by operation on provided signals and data, and provides the calculation results. In this specification, the term "CPU" refers to a device or circuit which performs computations, and is not limited to a processor such as CPU for general-purpose PC, MPU, GPU and TPU but used to include a processor or microcomputer such as FPGA, ASIC, and LSI, or a chip set such as SoC.

Figure 3:
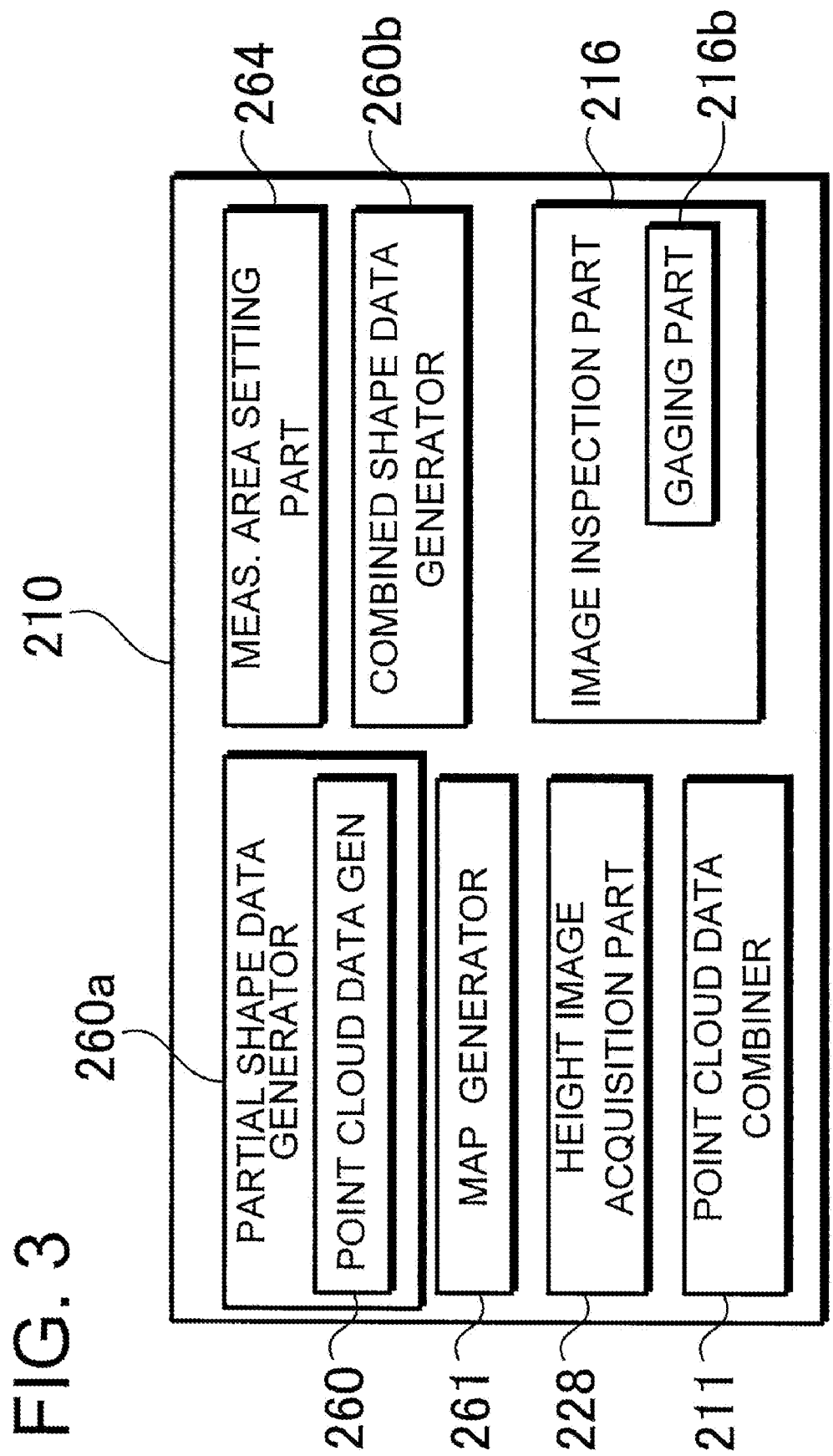
FIG. 3 is a block diagram showing the construction of a CPU of a controller in FIG. 1.

The CPU 210 generates image data based on pixel data provided from the measurement controller 150. In addition, the CPU 210 performs various types of processing on the generated image data by using the scratch-pad memory 230, and displays images based on the image data on the display 400. FIG. 3 is a block diagram of the CPU 210. The CPU realizes functions of the partial shape data generator 260a, the combined shape data generator 260b, the top view map image generator 261, the measurement area setting part 264, a height image acquisition part 228, and a point cloud data combiner 211, and the like.

(Partial Shape Data Generator 260a)

The partial shape data generator 260a generates a set of shape data representing at least a part of three-dimensional shape of the measurement object which is included in the field of view of the photoreceptor 120 at a particular position of the stage 140 based on the light-reception signals which are provided from the photoreceptor 120. The partial shape data generator 260a can be configured in the point cloud data generator 260 which generates point cloud data as a set of points including three-dimensional position information representing a three-dimensional shape of a measurement object WK based on the light-reception signals which are provided by the photoreceptor 120, for example.

(Combined Shape Data Generator 260b)

The combined shape data generator 260b moves the stage 140 by using the movement controller 144 based on the set of shape data corresponding to the at least a part of a measurement object which is generated by the partial shape data generator 260a to obtain a set of shape data corresponding to other part of the measurement object which is located in proximity to the at least a part of the measurement object, repeats the generation of a set of shape data of the measurement object by the partial shape data generator 260a at the position where the stage is moved, and generates combined shape data including the entire shape of the measurement object by combining the obtained sets of shape data. The movement controller 144 determines whether only rotates the rotation stage part 143, or rotates the rotation stage part 143 and translates the translation stage part 141 based on the shape data corresponding to the at least a part of the measurement object. Accordingly, three-dimensional measurement can be easily conducted based on automatic determination of the exterior shape of a measurement object without users' concern about image capture area.

The translation stage part 141 is moved in the X and Y directions, and the rotation stage part 143 is then rotated at the moved position by control of the movement controller 144.

(Prescanning)

Also, the partial shape data generator 260a can generate shape data of a measurement object under simple generation conditions. Accordingly, even though the simple generation conditions provide measurement of a measurement object with low accuracy, the movement controller 144 can roughly grasp the position of the measurement object and determine moving directions of the stage 140, there is an advantage that the processing can be simple.

The simple generation conditions for generating such shape data can include image capture conditions or calculation conditions. For example, the simple generation conditions can include shorter exposure time of the photoreceptor 120 shorter than normal, higher gain than normal, rough calculation which reduces the resolution, one-side illumination in which not both but one of right and left illuminators is used, limited stripe projection in which only a space encoding method is used, limited image capture in which one of two or more of cameras is used, or the like.

(Top View Map Image Generator 261)

The top view map image generator 261 generates a top view map image representing a plan view of a measurement object WK, which is placed on the stage 140, as viewed downward from a position right above the measurement object WK based on point cloud data that is generated by the partial shape data generator 260a. Because the top view map image which is viewed downward from the position right above the measurement object WK is generated, users can easily grasp the entire shape of the measurement object WK, and as a result can easily define its measurement area. For example, the top view map image generator 261 applies a two-dimensional texture image of the measurement object WK which is captured by the photoreceptor 120 onto the point cloud data which is generated by the partial shape data generator 260a for three-dimensionally defined points in the point cloud data to generate the top view map image. Alternatively, a mesh image the surfaces of which are formed by applying polygons onto the points in the point cloud data generated by the partial shape data generator 260a may be generated. The top view map image is generated from the mesh image. The top view map image generator 261 may generate the mesh image, or the mesh image may be generated by a mesh image generator.

Also, the top view map image generator 261 may generate a combined top view map image by combining two or more top view map images of two or more different areas of the measurement object WK which are captured by the photoreceptor 120. According to this, because a top view map image in a wider field of view can be obtained by combining two or more top view map images, it is possible to provide users with a user-friendly environment in operations such as measurement area definition.

In this case, the top view map image generator 261 can accept definition of a location relative to the top view map image displayed on a top view map image display area to which an additional top view map image is added. In response to this definition, the top view map image generator 261 generates the additional top view map image of the defined location, and combines the combined top view map image which has been generated and the additional top view map image to display a new combined top view map image in the top view map image display area. Accordingly, from the obtained top view map image, a top view map image corresponding to a part in which information on the measurement object WK is insufficient can be added based on users' instruction, and a top view map image suitable for measurement use or purpose can be is obtained.

(Measurement Area Setting Part 264)

The measurement area setting part 264 defines a measurement area on an observed image which is displayed on the display 400.

The height image acquisition part 228 produces a height image which includes height information based on two or more striped projection images. In addition, the point cloud data combiner 211 combines two or more sets of point cloud data generated by the point cloud data generator 260. Here, the point cloud refers to a set of data points in space which includes coordinates in a three-dimensional space (e.g., XYZ Cartesian coordinate system). Thus, the surface shape of a measurement object can be more precisely represented by superposing items of sets of point cloud data of the measurement object, which are generated at different positions of the stage, corresponding to the same coordinate in the three-dimensional space by using the point cloud data generator 211

(Image Inspection Part 216)

The image inspection part 216 performs predetermined image inspections of an image of a measurement object WK, which is captured by the measurer 100. This image inspection part 216 can include a gaging part 216*b* which performs predetermined measurement of a measurement object image. According to this construction, image inspection can be performed based on the measurement results which are measured by the gaging part 216*b*. Inspections such as determination of non-defective/defective can be performed based on the measurement results of lengths and angles of predetermined parts of the measurement object WK, for example. In the measurement by the gaging part 216*b*, a profile graph can be displayed on the display 400 by calculating contour lines which pass through a profile line selected in the texture image and are taken by a flat plane perpendicular to the screen, or a radius of a circle, a length of a straight line and the like can be calculated by extracting the circle, straight line and the like from the contour lines shown in the profile graph.

As discussed above, the CPU 210 solely serves as different parts for realizing various functions. However, needless to say, the present invention is not limited to the construction in which one member solely serves as different parts but two or more members which serve as their corresponding parts or realize their corresponding functions may be provided, or two or more members to which the parts or functions to be realized are assigned one by one may be individually provided.

(Display 400)

The display 400 is a member which displays a striped projection image obtained by the measurer 100, a height image generated by the height image acquisition part 228 based on the striped projection image, or a texture image captured by the measurer 100. The display 400 is constructed of an LCD panel or organic electroluminescence (electroluminescence) panel, for example. Also, the display can serves as the console in the case in which the display includes a touch panel.

In addition, the display 400 displays an observed image which is generated by the photoreceptor 120.

(Stage 140)

Two directions which perpendicularly intersect each other in a flat plane on the stage 140 where the measurement object WK is placed (referred to as "placement surface") are defined as the X and Y directions which are shown by arrows X and Y in FIG. 2, respectively. A direction which perpendicularly intersects the placement surface 142 of the stage 140 is defined as the Z direction, and is shown by an arrow Z. A rotational direction (angular coordinate) which rotates about an axis parallel to the Z direction is defined as a $\theta$ direction, and is shown by an arrow $\theta$.

The stage 140 includes the translation stage part 141 and the rotation stage part 143. The translation stage part 141 includes an X-direction movement mechanism and a Y-direction movement mechanism. The rotation stage part 143 includes a $\theta$-direction rotation mechanism. The stage 140 is constructed of the translation stage part 141 and the rotation stage part 143. In addition, the stage 140 may include a fastening member (clamp) which fastens a measurement object WK to the placement surface 142. Also, the stage 140 may include a tilt stage which includes a tiltable mechanism which can rotate about an axis parallel to the placement surface 142.

Here, as shown in FIG. 2, the relative positional relationship between the photoreceptor 120, the illuminator 110, and the stage 140 is defined so that the center axes of the right and left illuminators 110, and the center axis of the photoreceptor 120 intersect each other at a point in which a proper position of the measurement object WK on the stage 140, and a proper depth of field of the illuminator 110 and the photoreceptor 120 are provided. In addition, the center rotation axis of the $\theta$ direction agrees with the center axis of the photoreceptor 120 so that the measurement object WK can be rotated about the rotation axis within a field of view without getting out of the field of view when the stage 140 rotates in the $\theta$ direction. It is noted that, because the measurer 100 includes its arrangement which is rotated about the X direction in the paper plane in FIG. 2, the optical axis of the photoreceptor 120 and the top surface normal of the stage 140 (Z direction) do not necessarily agree each other.

(Light Source 300)

The light source 300 includes a control circuit board 310 and an observation illumination light source 320. A CPU (not shown) is mounted on the control circuit board 310. The CPU in the control circuit board 310 controls the illuminator 110, the photoreceptor 120, and the measurement controller 150 based on instructions from the CPU 210 in the controller 200. It is noted that this construction is illustrative, and other construction may be used. For example, the illuminator 110 and the photoreceptor 120 may be controlled by the measurement controller 150, or the illuminator 110 and the photoreceptor 120 are controlled by the controller 200 so that the control circuit board can be omitted. Alternatively, a power supply circuit for driving the measurer 100 may be arranged in the light source 300.

(Observation Illumination Light Source 320)

The observation illumination light source 320 includes three colors of LEDs which emit red light, green light, and blue light, for example. Any color of light can be can be produced by the observation illumination light source 320 by controlling luminance of light emitted by the LEDs. Illumination light IL which is produced by the observation illumination light source 320 is emitted by the illumination light emitter 130 of the measurer 100 through a light guiding member (light guide). It is noted that suitable light sources other than LEDs such as semiconductor laser (LD), halogen light, and HID can be used for the observation illumination light source. In particular, in the case in which a device capable of capturing color images is used as the image pickup device, a white light source can be used for the observation illumination light source.

The illumination light IL emitted from the illumination light emitter 130 is switched between red light, green light, and blue light when a measurement object WK is illuminated separately with these colors of light at different timing.

Accordingly, a texture image can be generated by combining images which are captured when the measurement object WK is illuminated separately with RGB colors of light so that a color texture image is obtained and displayed on the display 400.

The illumination light emitter 130 in FIG. 2 has a ring shape, and is arranged above the stage 140 to surround the photoreceptor 120. According to this arrangement, the illumination light emitter 130 illuminates the measurement object WK with illumination light in a ring shape without shadow appearance.

Also, in addition to such ring illumination, the illumination light emitter 130 can additionally include transmitted illumination and coaxial vertical light illumination. In the embodiment shown in FIG. 2, a transmitted illumination part is provided in the stage 140. The transmitted illumination part illuminates the measurement object WK with light from a lower part of the stage 140. To achieve this, the stage 140 includes a transmitted illumination light source, a reflecting plate, and an illumination lens system.

It is noted that the ring illumination and transmitted illumination may be suitably omitted. If they are omitted, two-dimensional images can be captured by using the illumination for three-dimensional measurement (i.e., the illuminator).

In the embodiment shown in FIG. 1, the observation illumination light source 320 is not included in the body case 101, but the observation illumination light source 320 is provided in the light source 300 added externally to the measurer 100. According to this arrangement, the quality of illumination light provided from the observation illumination light source 320 can be easily improved. For example, because the RGB LEDs which are included in the observation illumination light source 320 have different light distribution characteristics from each other, lighting color unevenness will occur in the field of view if the different light distribution characteristics are not treated when RGB texture images are captured by the monochromatic image pickup device 121*a*. To address this, optical systems desiccated to their corresponding LED adjusted to its light distribution characteristics are provided and combined with each other so that the light distribution characteristic difference is accommodated, and uniform white illumination without color unevenness is produced and then guided to the measurer 100.

Also, adverse influence of heat generated by the observation illumination light source 320 on the optical system of the measurer 100 can be prevented. That is, if a heat source is located near members of the optical system, thermal expansion may affect their dimensions and reduce measurement accuracy, but because the observation illumination light source which is a heating source is arranged outside the body case 101 such a problem resulting from the heat generated by observation illumination light source can be avoided. In addition, as a result, there is an advantage that a high-output light source which will generate a large amount of heat can be used for the observation illumination light source.

The measuring light source 111 of each of the illuminators 110A and 110B is a blue LED (light emitting diode), for example. The measuring light sources 111 may be other light source such as halogen lamp. Light which is emitted by the measuring light source 111 (hereinafter, referred to as measuring light) is properly condensed by the lens 113 and then enters the pattern generator 112.

The pattern generator 112 is a DMD (digital micro mirror device), for example. The pattern generator 112 may be an LCD (liquid crystal display), LCOS (Liquid Crystal on Silicon: reflective liquid crystal element), or mask. The measuring light which enters the pattern generator 112 is converted into a predetermined pattern and predetermined intensity (brightness) and emitted from the pattern generator 112. The measuring light which is emitted from the pattern generator 112 is converted into light having a larger diameter than the dimensions of the measurement object WK by the lens 114, and then incident on the measurement object WK on the stage 140.

The measuring light source 111, the lens 113, and the pattern generator 112 of the illuminator 110A are aligned with each other substantially parallel to the optical axis of the photoreceptor 120. Similarly, the measuring light source 111, the lens 113, and the pattern generator 112 of the illuminator 110*b* are aligned with each other substantially parallel to the optical axis of the photoreceptor 120. On the other hand, the lenses 114 of the illuminators 110A and 110*b* are offset relative to the measuring light source 111, the lens 113, and the pattern generator 112. According to this arrangement, the optical axes of the illuminators 110A and 110*b* are inclined with respect to the optical axis of the photoreceptor 120 so that measuring light is emitted toward the measurement object WK from the both sides of the photoreceptor 120.

In this embodiment, in order to provide a wide illumination area of the measuring light, the illuminators 110A and 110*b* are constructed to have a certain angle of view. The angle of view of the illuminators 110A and 110*b* is defined by the dimensions of the pattern generator 112 and the focal length of the lens 114, for example. In the case in which a wide illumination area of the measuring light is not required, a telecentric optical system which has an angle of view substantially zero degree may be used for the illuminators 110A and 110*b*.

Measuring light which is reflected upward of the stage 140 by the measurement object WK is condensed to form an image by the lens 122 of the photoreceptor 120, and is received by the image pickup device 121*a* of the camera 121.

In this embodiment, in order to provide a wide imaging visual field of the photoreceptor 120, the photoreceptor 120 is constructed to have a certain angle of view. In this embodiment, the imaging visual field of the photoreceptor 120 refers to the spatial area whose image can be captured by the photoreceptor 120. The angle of view of the photoreceptor 120 is defined by the dimensions of the image pickup device 121*a* and the focal length of the lens 122, for example. In the case in which a wide field of view is not required, a telecentric optical system may be used for the photoreceptor 120. Here, the lenses 122 of two photoreceptors 120 which are included in the measurer 100 have a different scaling factor. In this case, images of the measurement object WK can be captured by two scaling factors different from each other by selectively using the two photoreceptors 120. The two photoreceptors 120 are preferably to be arranged so that the optical axes of the two photoreceptors 120 are parallel to each other.

The camera 121 is a CCD (charge-coupled device) camera, for example. The image sensor 121*a* is a monochromatic CCD (charge-coupled device), for example. The image pickup devices 121*a* may be other image pickup device such as CMOS (complementary metal-oxide semiconductor) image sensor. The pixels of the image pickup device 121*a* provide analog electric signals corresponding to amounts of their received light (hereinafter, referred to as light-reception signals) to the control circuit board 150.

Dissimilar to color CCDs, monochromatic CCDs do not necessarily include pixels that receive light of red wavelength, pixels that receive light of green wavelength, and pixels that receive light of blue wavelength. Here, in the case in which a particular wavelength such as blue wavelength is used, color CCDs can use only pixels that receive light of the particular wavelength, but monochromatic CCDs do not have such a restriction. For this reason, monochromatic CCDs have measurement resolution higher than color CCDs. Also, dissimilar to color CCDs, monochromatic CCDs do not necessarily include color filters provided for pixels. For this reason, monochromatic CCDs have sensitivity higher than color CCDs. Therefore, later-discussed point cloud data can be obtained with high accuracy. For these reasons, a monochromatic CCD is provided for the camera 121 in this embodiment.

In this embodiment, the illumination light emitter 130 separately emits light of red wavelength, light of green wavelength, and light of blue wavelength toward the measurement object WK at different timing. According to this construction, color images of the measurement object WK can be captured by the photoreceptor 120 which uses such a monochromatic CCD.

On the other hand, in the case in which a color CCD has sufficient resolution and sensitivity, the image pickup device 121a may be such a color CCD. In this case, the illumination light emitter 130 does not necessarily separately illuminate the measurement object WK with light of red wavelength, light of green wavelength, and light of blue wavelength toward at different timing but illuminate the measurement object WK with white light. Accordingly, the illumination light source 320 can have a simple structure.

Figure 4:
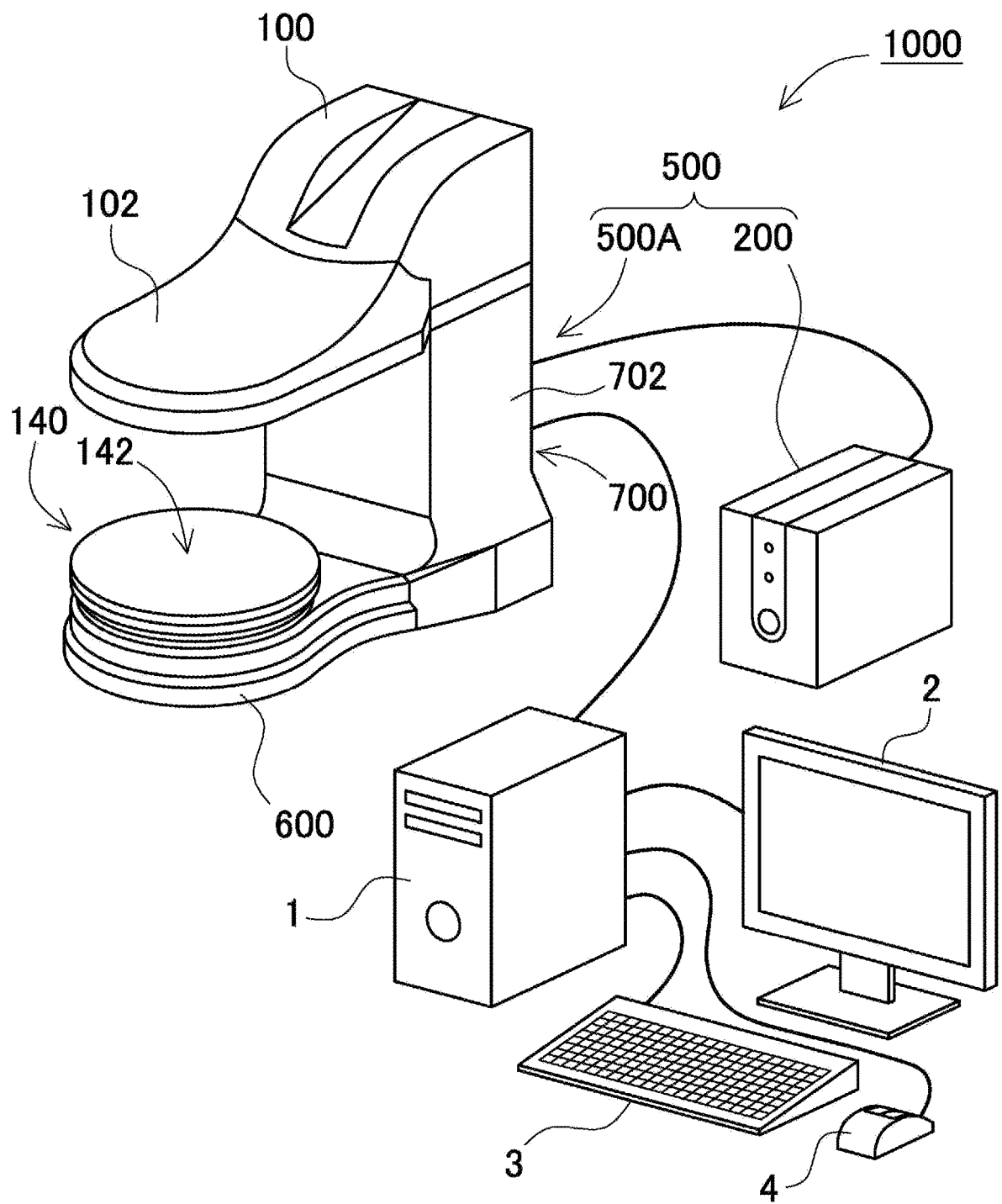
FIG. 4 is a block diagram showing a three-dimensional shape measurement system.

FIG. 4 shows a three-dimensional shape measurement system 1000 which includes a three-dimensional shape measuring apparatus 500 according to the first embodiment. In this illustrated three-dimensional shape measurement system 1000, a PC 1 used for control, a monitor 2, a keyboard 3, and a input device 4 (e.g., mouse) are connected to the three-dimensional shape measuring apparatus 500 which is constructed of a three-dimensional shape measuring apparatus main body 500A and the controller 200. A three-dimensional shape measuring program for executing three-dimensional shape measurement by using the three-dimensional shape measuring apparatus 500 is installed in the control PC 1. Users can instruct settings and execution (e.g., image capture, measurement, etc.) of the three-dimensional shape measuring apparatus 500 by using the three-dimensional shape measuring program.

It is noted that, although the controller 200 is provided separately from the three-dimensional shape measuring apparatus main body 500A in the embodiment shown in FIG. 4, the controller may be integrally constructed with the three-dimensional shape measuring apparatus main body side. Alternatively, the function of the controller may be included in the control PC.

Figure 5:
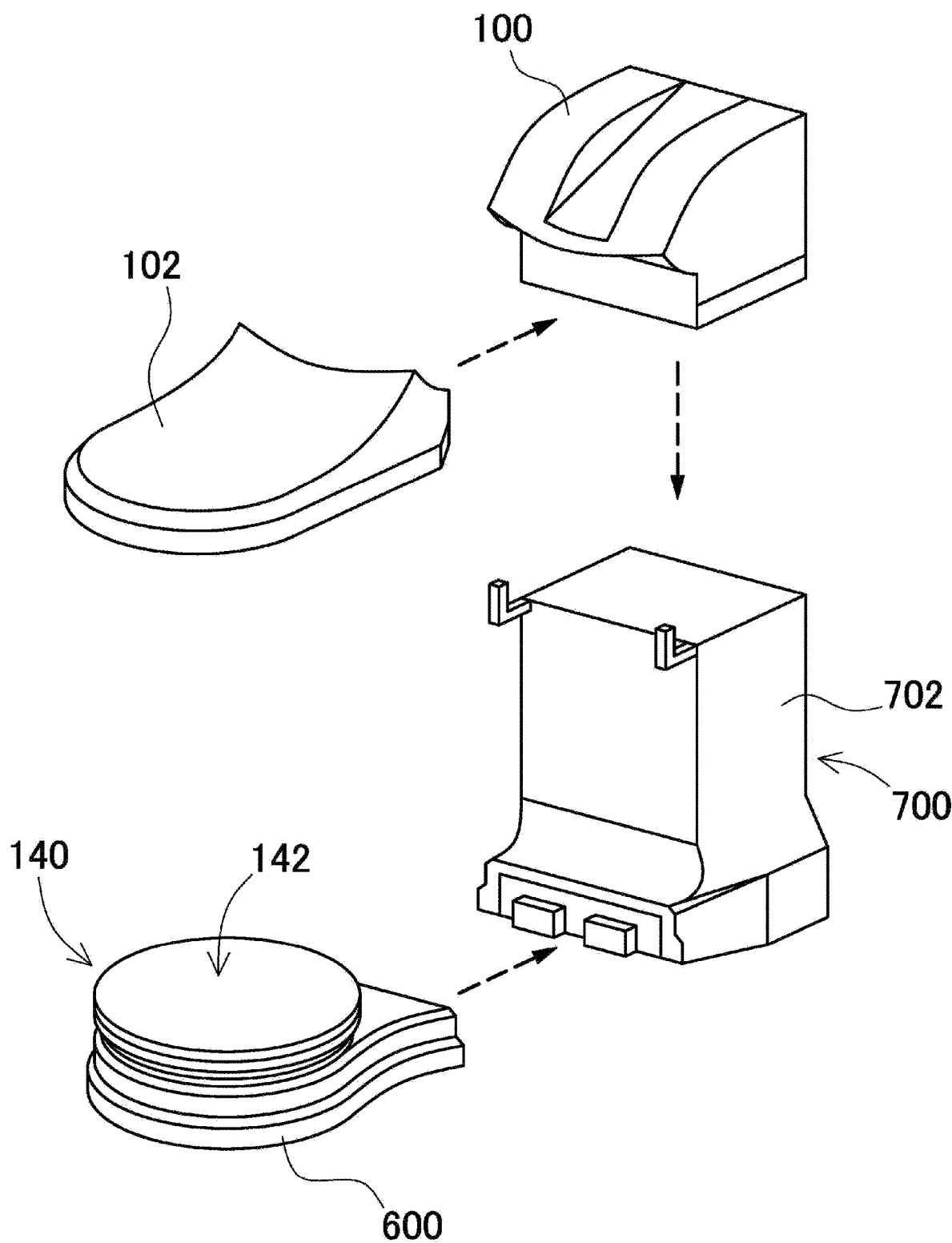
FIG. 5 is an exploded perspective view of a main body of the three-dimensional shape measuring apparatus shown in FIG. 4.

The three-dimensional shape measuring apparatus 500 includes the measurer 100, a support 700, the mount 600, and a light-shielding cover 102. The measurer 100, the support 700, the mount 600, and the light-shielding cover 102 are constructed as detachable units as shown in an exploded perspective view of FIG. 5. According to this construction, these members are advantageous in terms of ease of maintenance and portability. The light-shielding cover 102 extends frontward of the photoreceptor 120 and the illuminator 110 to cover them, and is held above the placement surface 142 in an orientation spaced away from the placement surface 142 to intercept external light from the measurement area above the placement surface 142. The light-shielding cover 102 can be detached depending on a measurement object, and the basic minimum configuration for measurement is a combination of the measurer 100 and the mount 600.

The mount 600 includes the stage 140. This stage 140 includes the rotation stage part 143 for rotating the placement surface 142 on which the measurement object is placed as discussed above, and the translation stage part 141 for translating the placement surface 142. Here, the stage 140 is constructed of an XYθ stage which includes an XY stage as the translation stage part 141 mounted on the upper surface of a θ stage as the rotation stage part 143.

The mount 600 holds the measurer 100 in a vertical orientation through the support 700. In addition, the measurer 100 fixedly holds the illuminator 110 and the photoreceptor 120 in inclined orientations in which their optical axes are inclined with respect to the placement surface 142. To this end, the illuminator 110 includes a fixer 125 which fixes the illuminator 110 and the photoreceptor 120. The fixer 125 is supported by a support stand 702 in an orientation in which the fixer 125 is spaced away from the mount 600 as discussed later with reference to FIG. 7. In addition, the fixer fixes the illuminator 110 and the photoreceptor 120 in inclined orientations in which their optical axes are inclined with respect to the placement surface 142. According to this arrangement, the measurement area to be measured with the measuring light is defined above the stage 140. In addition, the optical system such as the illuminator 110 and photoreceptor 120 is held in an orientation in which they face the measurement area obliquely downward.

The support 700 couples the mount 600 and the measurer 100 to each other. The measurer 100 is held by the support 700, and arranged above the stage 140. The measurer 100 includes the illuminator 110 and the photoreceptor 120 as an observation optical system as discussed above. The measurer 100 is held with respect to the placement surface 142 of the stage 140, which is arranged in the mount 600, not vertically above the placement surface 142 but in an orientation in which the measurer 100 faces the placement surface 142 obliquely downward. According to this arrangement, there is an advantage that the shapes of upper and side surfaces of the measurement object can easily obtained by a single measurement operation. In particular, to acquire height-directional information, the information on the side surfaces which have large height difference in the measurement object is useful. On the other hand, it is difficult to grasp the entire shape of the measurement object based on only the side surfaces. For this reason, in order that the measurer 100 is brought in an orientation in which the measurer 100 can see the measurement object from a point which is located obliquely above the measurement object so that both the upper surface which can provide easy grasp of the entire exterior shape and the side surfaces which can provide easy grasp of height information can be obtained by a single measurement operation, it is useful to hold the measurer 100 in an orientation in which the measurer 100 is inclined with respect to the placement surface 142. In the embodiment shown in a side view of FIG. 6, the measurer 100 is held an inclined orientation in which the optical axes of the illuminator 110 and the photoreceptor 120 of the measurer 100 form an angle of approximately 45° with respect to the placement surface 142 of the XYθ stage. According to this arrangement, the measurer 100 is coupled to the mount 600 by the support 700 to maintain a bird's eye view of the measurement object at 45°. As a result, the measurer 100 constantly sees the placement surface 142 at a fixed angle from a fixed position, and the positional relationship between the three axes of XYθ as the driving axes of the placement surface 142 and the observation optical system is kept fixed.

Figure 7:
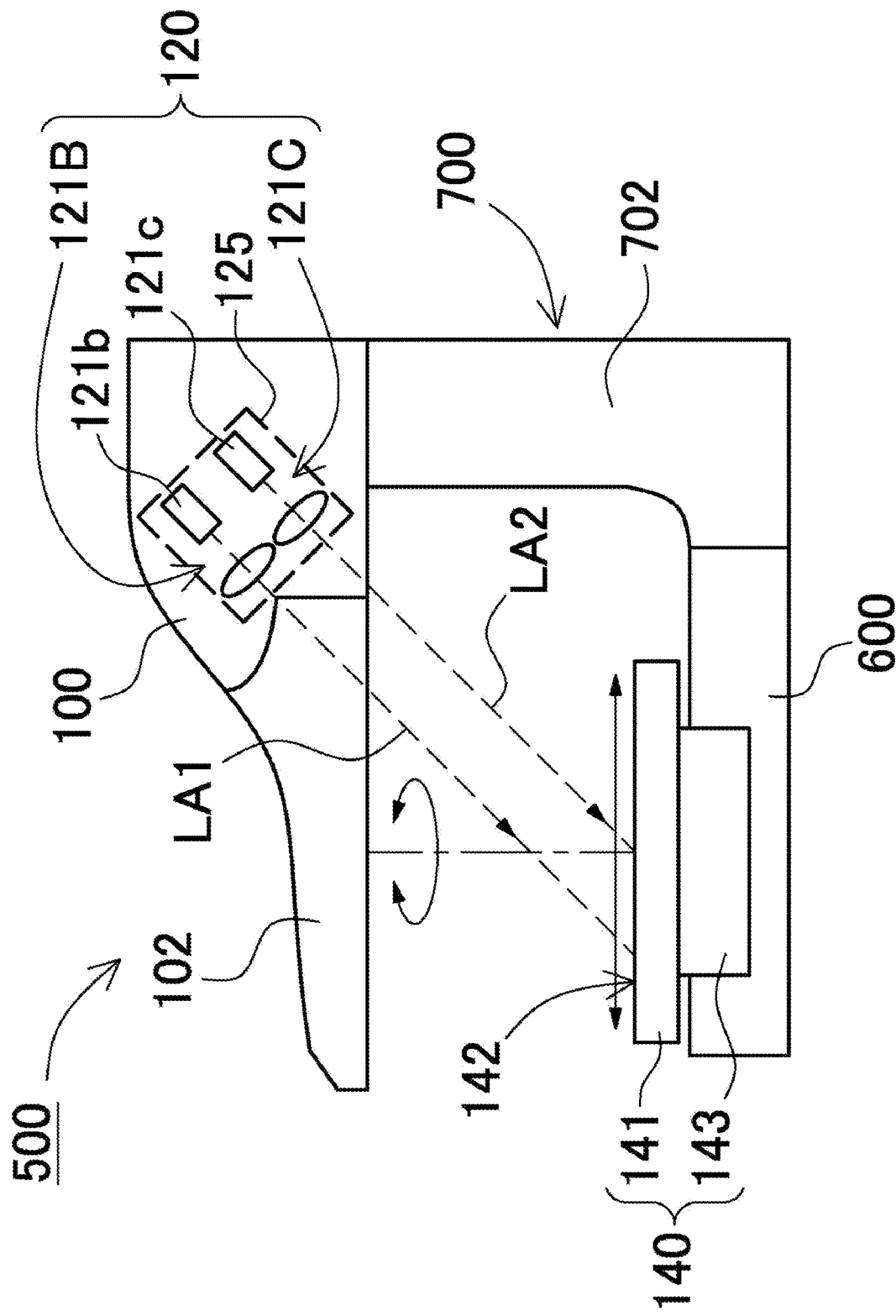
FIG. 7 is a side view of the three-dimensional shape measuring apparatus which includes a plurality of photoreceptors having a scaling factor different from each other.

The photoreceptor 120 may include two or more optical systems having a different scaling factor. Such an exemplary photoreceptor is shown in FIG. 7. In this example, the photoreceptor 120 includes a first optical system having a first scaling factor and a second optical system having a second scaling factor higher than the first scaling factor. According to this, because the optical systems having a different scaling factor, one of their corresponding fields of view can be selected in accordance with a size of a measurement object WK which is placed on the placement surface 142. In this example, first and second photo-receiving devices 121*b* and 121*c* which are optically connected to the first and second optical systems respectively are provided as photo-receiving devices. Hereinafter, the first optical system and the first photo-receiving device 121*b* are occasionally referred together to as a first camera 121B, and the second optical system and the second photo-receiving device 121*c* are occasionally referred together to as a second camera 121C. In the case in which two or more photo-receiving devices are prepared, and the photo-receiving devices independently capture images by using their own optical system, image-capturing processes for processing images captured by the optical systems can be performed in parallel so that the processing speed can be improved and optical coupling can be simplified. However, two or more optical systems may be optically coupled to a single photo-receiving device.

The first and second optical systems are arranged so that their optical axes are parallel to each other. First and second optical axes LA1 and LA2 of the first and second optical systems are both inclined approximately 45° with respect to the placement surface 142. Here, the second optical system having a higher scaling factor, that is, the second camera 121C is aligned with the first camera 121B as the first optical system, and arranged on the lower side of the first camera 121B in the fixer 125. According to this arrangement, because when the optical system is switched from the first optical system to the second optical system the viewpoint moves to the closer side of a measurement object WK, there is an advantage that users can relatively easily grasp the viewpoint change. More exactly, in the case in which a measurement object WK placed on the placement surface is large in the first optical system having a larger field of view (lower scaling factor), or on the other hand in the case in which a measurement object WK placed on the placement surface is small in the second optical system having a smaller field of view (higher scaling factor), the measurement object WK can be entirely included in their fields of view under the whole rotation of the measurement object WK in either case.

(XYθ Stage)

Figure 8:
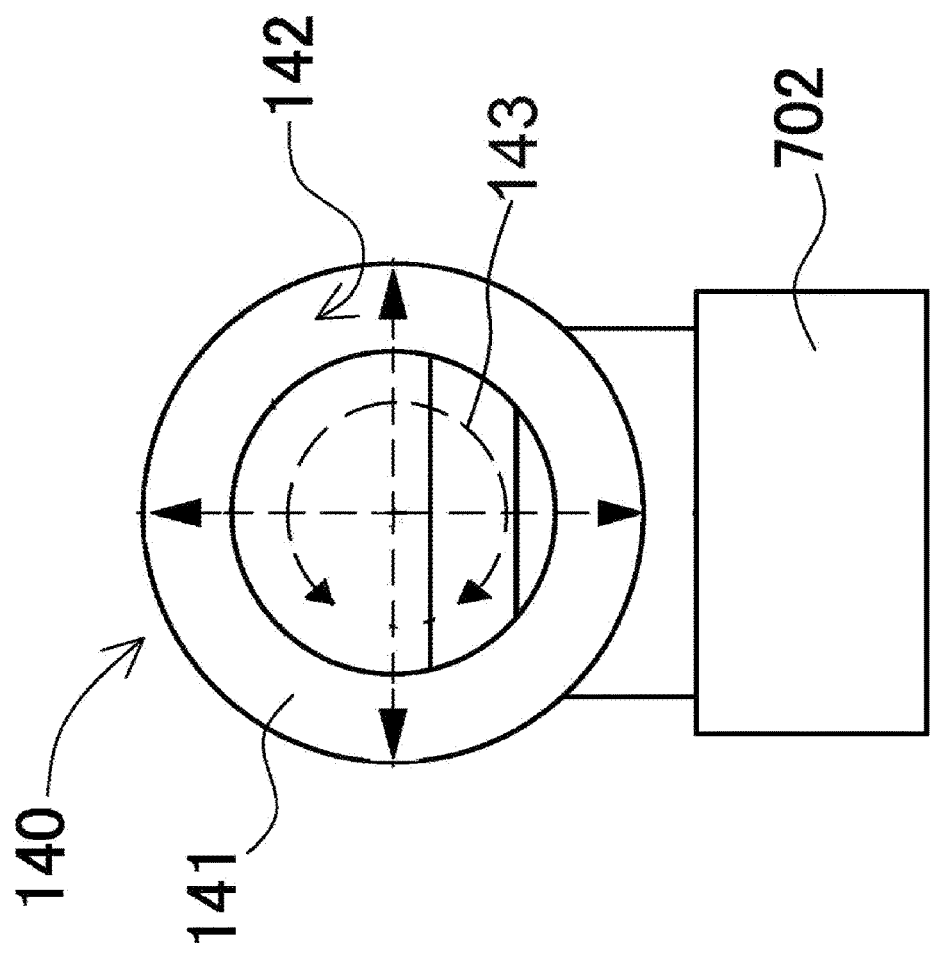
FIG. 8 is a plan view showing driving directions of a placement surface.
Figure 9:
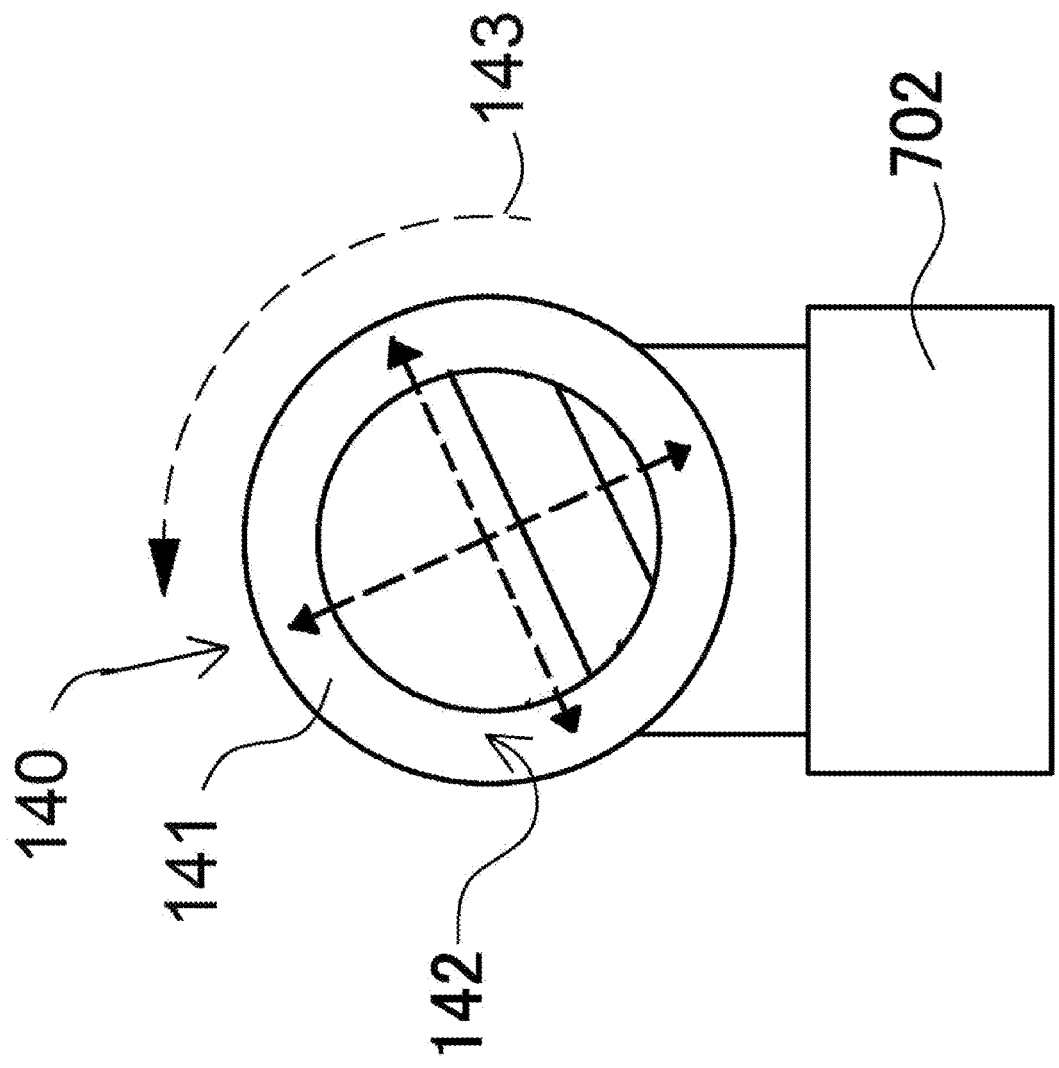
FIG. 9 is a plan view showing driving directions of the placement surface.

Exemplary configuration of the mount 600 is now described with reference to FIGS. 7 to 9. In the embodiment shown in FIG. 7, the XYθ stage includes the θ stage as the rotation stage part 143 which is fixed on the mount 600, and the XY stage as the translation stage part 141 which is placed on the θ stage. Also, the rotation stage part 143 is arranged so that its rotation axis intersects both the optical axes of the first and second optical systems at an angle of 45°. The translation stage part 141 placed on the rotation stage part 143 has a structure in which the XY driving axes rotate together with rotation of the rotation stage part 143 as shown in the plan views of FIGS. 8 and 9. The X and Y axes in which the translation stage part 141 can be moved are shown in FIG. 8. The θ direction in which the rotation stage part 143 can rotate is shown in FIG. 9. According to this arrangement in which the translation stage part 141 is placed on the rotation stage part 143, the optical axis of the measurer 100 and the rotation axis of the rotation stage part 143 can easily have a fixed relationship in which they are mechanically secured to each other. In addition, stage driving axes in the coordinate system in the observation space of the measurer 100 can be grasped by calibration of a moving direction of the translation stage part 141, and calibration of a rotational direction about the stage rotation axis when necessary.

Also, as shown in FIG. 8, the reference position relating to the movement of the translation stage part 141 is a position with respect to which the translation stage part is translated, for example. Typically, the point of origin D (0, 0) in the XY plane is defined as the reference position. In addition, a point C shown in FIG. 9 is the center of rotational movement in the θ direction, and agrees with the rotation axis of the rotation stage part 143 in the case of FIG. 9. In the case in which the translation stage part 141 is arranged on the rotation stage part 143 so that the point C agrees with the point D, the movement of the translation stage part 141 can be easily controlled.

Figure 10:
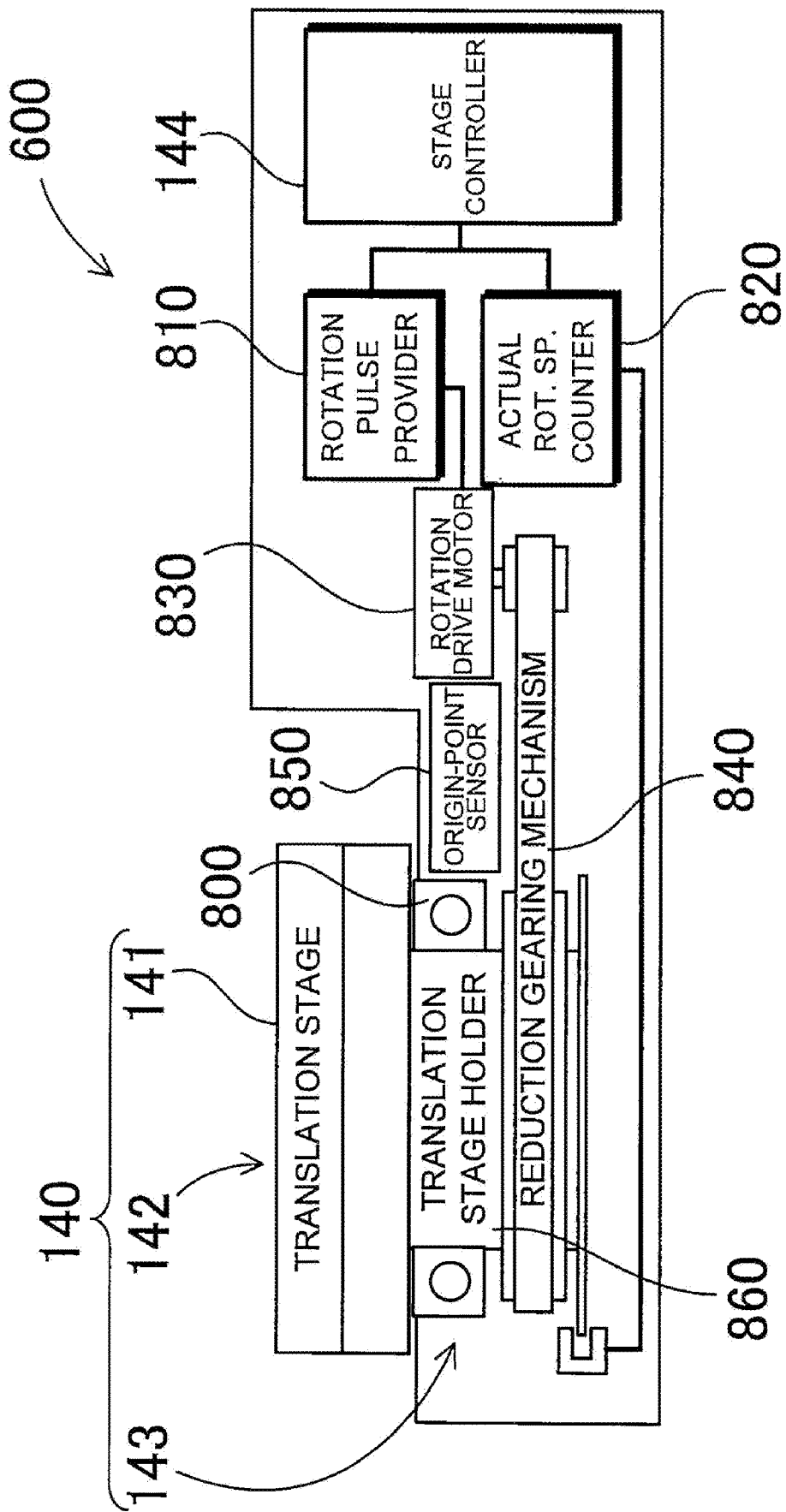
FIG. 10 is a block diagram showing construction of a rotation stage part.
Figure 11:
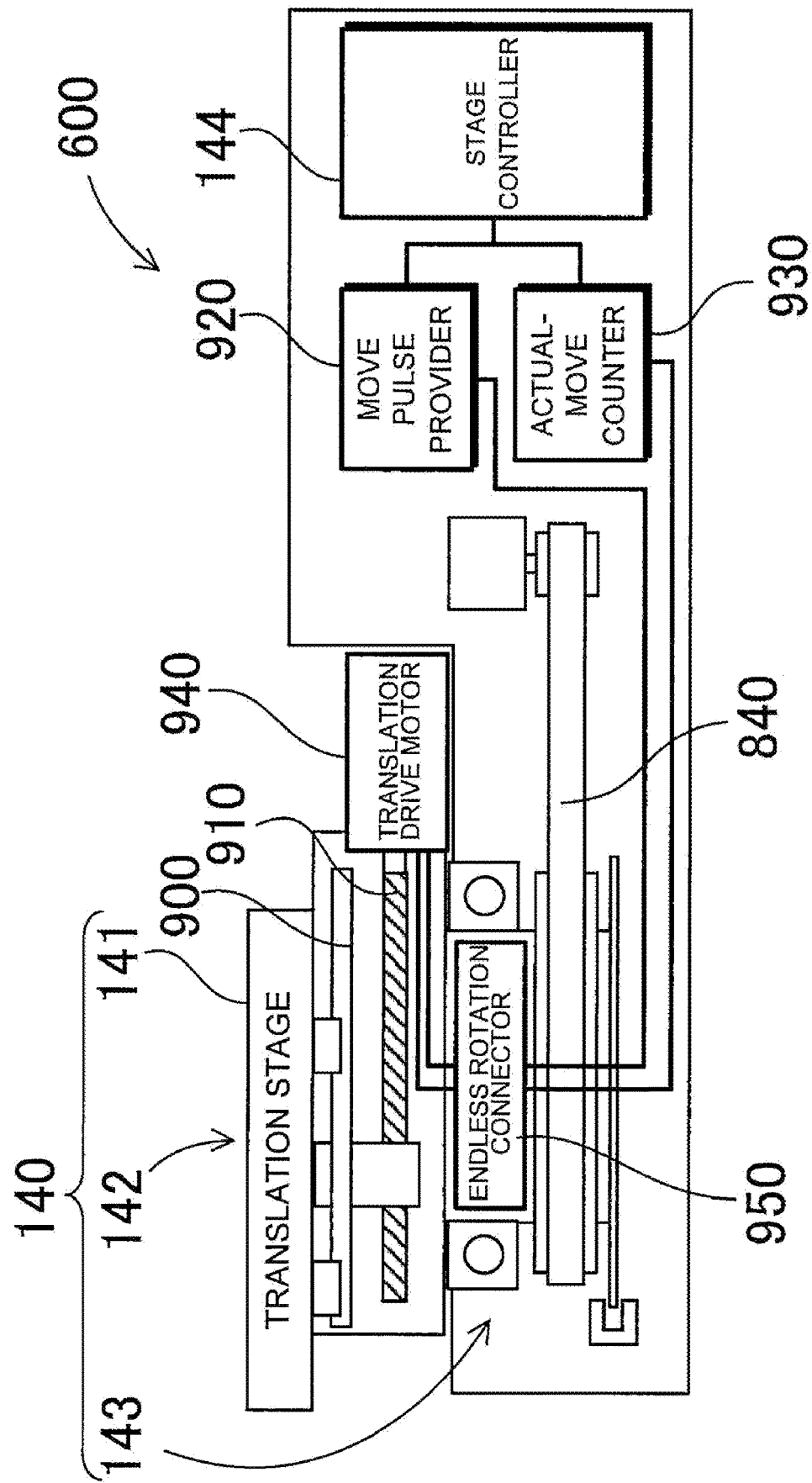
FIG. 11 is a block diagram showing construction of a translation stage part.

Here, FIG. 10 shows exemplary construction of a rotating mechanism which rotates the rotation stage part 143, and FIG. 11 shows exemplary construction of a moving mechanism which the translation stage part 141. In the exemplary stage 140 shown in FIGS. 10 and 11, the translation stage part 141 is arranged on the rotation stage part 143 as discussed above.

As shown in FIG. 10, the rotating mechanism of the rotation stage part 143 includes a rotation guide 800, a rotation pulse provider 810, an actual-rotation-speed counter 820, a rotation drive motor 830, a reduction gearing mechanism 840, an origin-point sensor 850, a translation-stage-part holder 860, and the movement controller 144 in the mount 600. The rotation guide 800 is directly secured to the mount 600 so that the rotation axis can be mechanically uniquely defined. The movement controller 144 sends control signals to the rotation pulse provider 810. The rotation pulse provider 810 generates rotation pulses in response to the control signals from the movement controller 144 so that the rotation drive motor 830 rotates in accordance with the rotation pulses. The rotation drive motor 830 transmits the power to the rotation guide 800 through the reduction gearing mechanism 840 to generate rotation of the rotation stage part 143 through the rotation guide 800. In the exemplary construction shown in FIG. 10, the reduction gearing mechanism 840 reduces the speed and transmits power through a timing belt. Also, the rotational driving amount of the rotation stage part 143 is detected by the actual-rotation-speed counter 820. It can be determined whether the rotation stage part 143 is successfully controlled or not by comparing an estimated rotation amount which is converted from the number of rotation pulses provided from the rotation pulse provider 810 with the actual rotation amount which is detected by the actual-rotation-speed counter 820. For example, an unexpected rotation stop due to collision or the like can be detected. Also, the origin sensor 850 determines an initial coordinate of the rotation stage part 143. Accordingly, the initial coordinate of the rotation stage part 143 which can endlessly rotate can be grasped.

Also, the translation stage part 141 is fastened to the rotation stage part 143 through the translation stage part holder 860. The rotational movement of the rotation stage part 143 which is generated through the rotation drive guide 800 is transmitted also to the translation stage part 141 so that the rotational orientation of the placement surface 142 on the mount 600 is changed.

As shown in FIG. 11, the driving mechanism of the translation stage part 141, includes a linear motion guide 900, a linear motion power transmitter 910, a movement pulse provider 920, an actual-movement counter 930, a translation drive motor 940, an endless rotation connector 950, the movement controller 144 in the mount 600. According to this construction, the control signals or driving electric power which is provided from the fastening side of the rotation stage part 143 can be provided to the driving side of the rotation stage part 143 (i.e., the fastening of the translation stage part 141) by the endless rotation connector 950 so that the rotation stage part 143 can be endlessly rotated. It is noted that if the endless rotation connector is not included, a harness twists in the rotation, and as a result the rotation stroke is limited. The translation drive motor 940 rotates in accordance with a movement amount provided through the endless rotating connector 950 by the movement pulse provider 920 controlled by the movement controller 144 arranged on the fastening side of the rotation stage part 143 so that the translation stage part 141 can be driven through the linear motion transmitting power transmitter 910 and the linear motion guide 900. The movement amount of the translation stage part 141 is detected by the actual-movement counter 930. It can be determined whether the translation stage part 141 is successfully controlled or not by comparing an estimated movement amount which is converted from the number of movement pulses from the movement pulse provider 920 with the actual movement amount which is detected by the actual-movement-speed counter 930.

Also, in the aforementioned exemplary construction of the stage 140, it has been illustratively described that the translation stage part 141 is arranged on the upper surface of the rotation stage part 143. According to this arrangement, the rotation stage part 143 can be rotably mounted to the mount, and the translation stage part 141 can be rotated together with a measurement object which is placed on the upper surface of the translation stage part 141 by the rotation stage part 143. Because the measurement object and the translation stage part 141 are rotated together with each other as discussed above, the positional relationship between the measurement object and the translation stage part 141 can be kept fixed unless a placement orientation of the measurement object is not changed. As a result, three-dimensional measurement is executed on the same area of a measurement object in a plurality of different viewpoints where the rotation stage part 143 is rotated to different angular coordinates, which in turn can obtain averaged data at one point from sets of data which are obtained in the different viewpoints, the measurement object can be stably entirely measured, and therefore the measurement accuracy can be improved.

Figure 12:
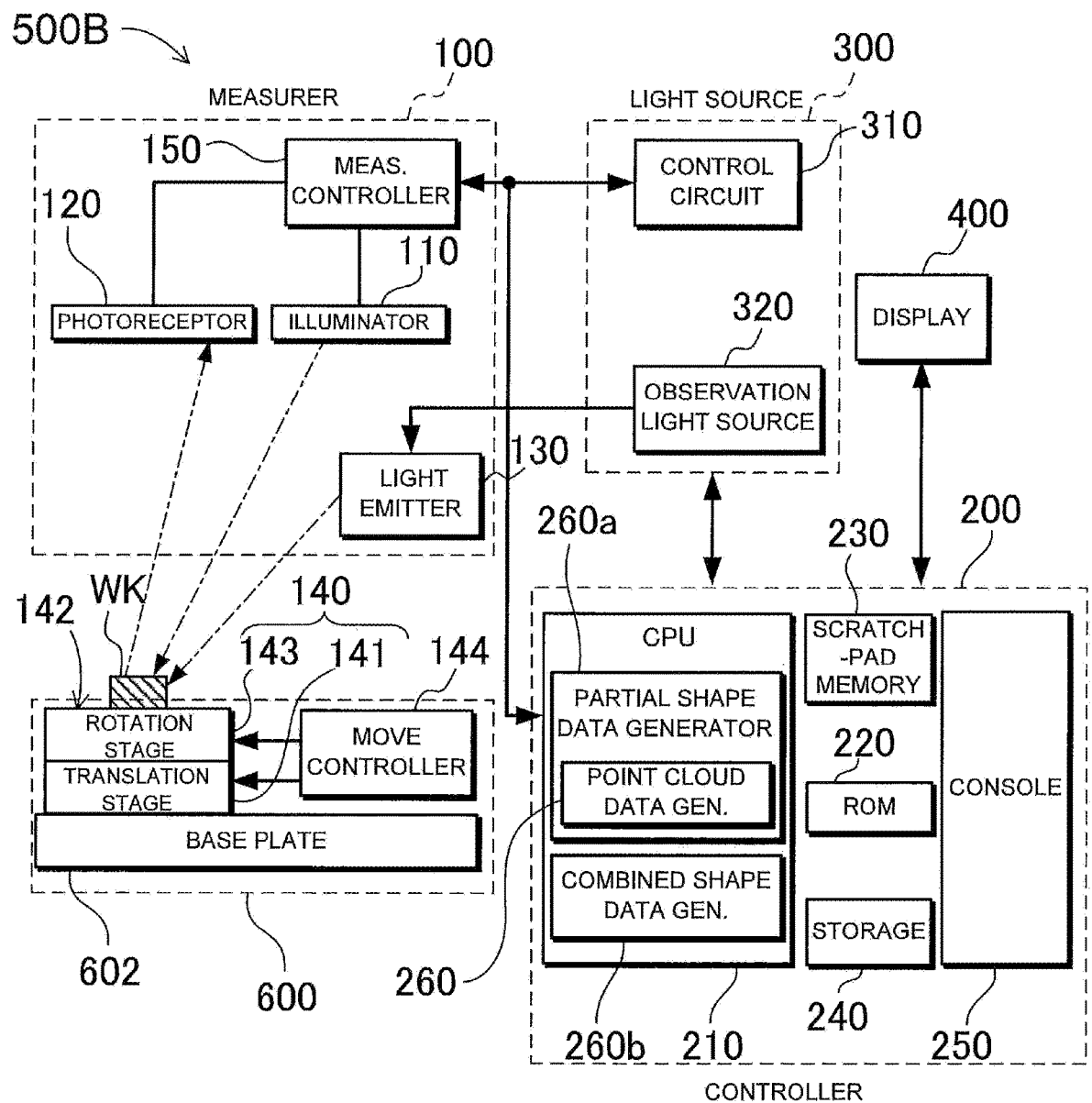
FIG. 12 is a block diagram showing a three-dimensional shape measuring apparatus according to a second embodiment.

However, the stage 140 in the present invention is not limited to this arrangement, the rotation stage part 143 may be arranged on the upper surface of the translation stage part 141 as shown in a three-dimensional shape measuring apparatus 500B according to a second embodiment shown in FIG. 12, for example.

(Top View Map Image)

Figure 6:
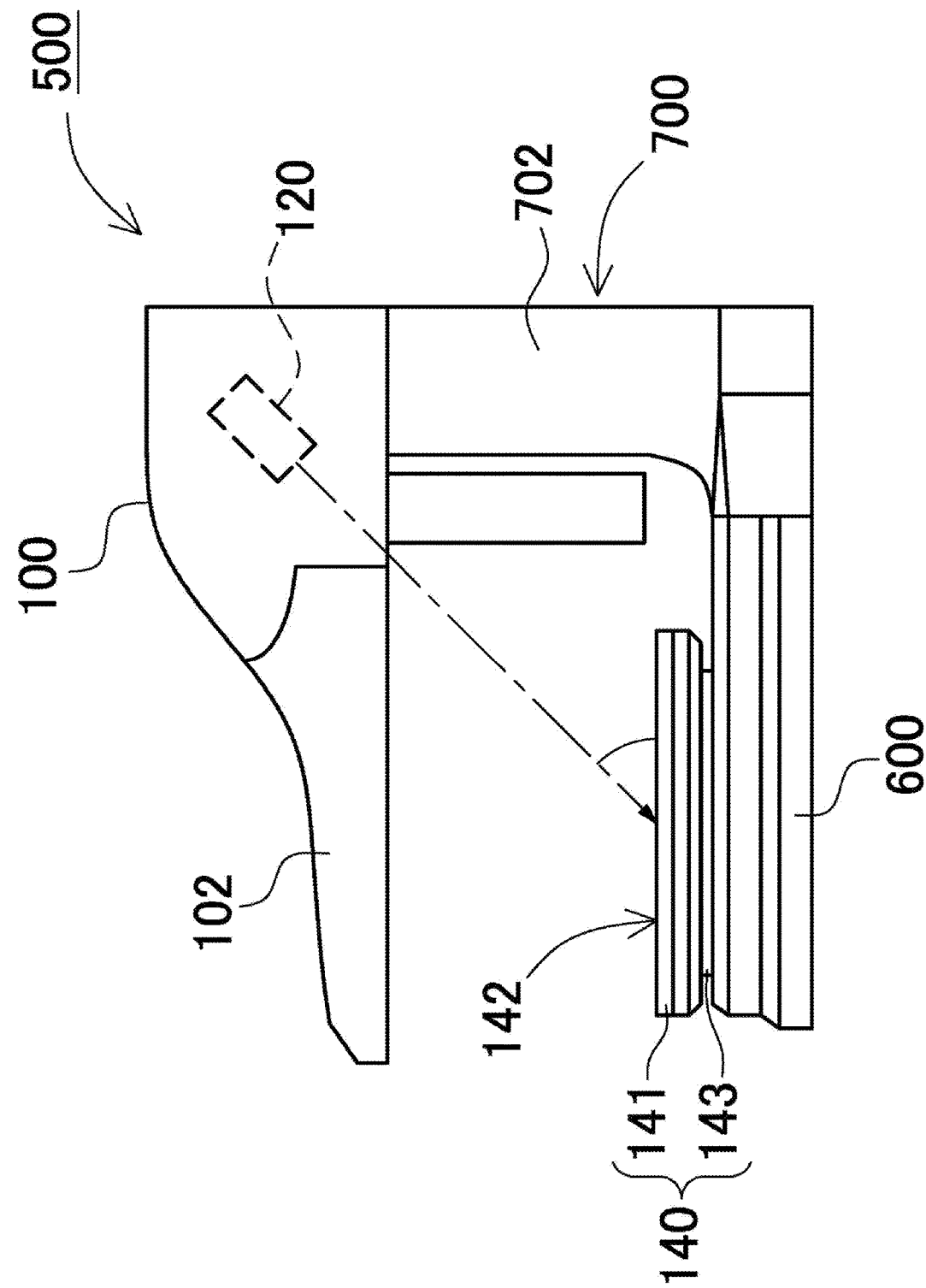
FIG. 6 is a side view of the main part of the three-dimensional shape measuring apparatus shown in FIG. 4.

The three-dimensional shape measuring apparatus according to the embodiment has a function of generating a top view map image. The top view map image refers to an image of a measurement object placed on the stage 140 as viewed from the top side and corresponds to a plan view of the measurement object. In particular, in the case of the three-dimensional shape measuring apparatus which observes the measurement object not from a position right above the measurement object but in a slanting direction from the top as shown in FIG. 6, users often cannot easily visually grasp an exterior shape of the measurement object, and the like. To address this, a top view map image which is viewed like a plan view of the measurement object is prepared to show the entire image of the measurement object to users so that users can easily grasp a part of the measurement object which is currently included in the field of view to be observed in a slanting direction from the top, that is, can easily grasp a relative positional relationship of this part in the measurement object.

The viewpoint of the top view map image is basically provided as viewed in a direction perpendicular to the placement surface 142. However, the top view map image may be provided as viewed in a direction slightly inclined with respect to the direction perpendicular to the placement surface. For example, the top view map image may be provided as viewed in a direction approximately +/−5° where the vertical direction perpendicular to the placement surface 142 is defined zero degree. In this specification, such an image as viewed in a direction slightly inclined with respect to the vertical direction also referred to as a top view map image. Also, because the top view map image is aimed at navigation such as at grasping the measuring point of a measurement object, the top view map image is not limited to an optical image captured by the image pickup device but may be a pseudo-image which represents the measurement object. Also, because measurement executed by the three-dimensional shape measuring apparatus is obtained based on not the top view map image but three-dimensional images, and the like which are separately generated, the top view map image is not required to have high accuracy.

Figure 13:
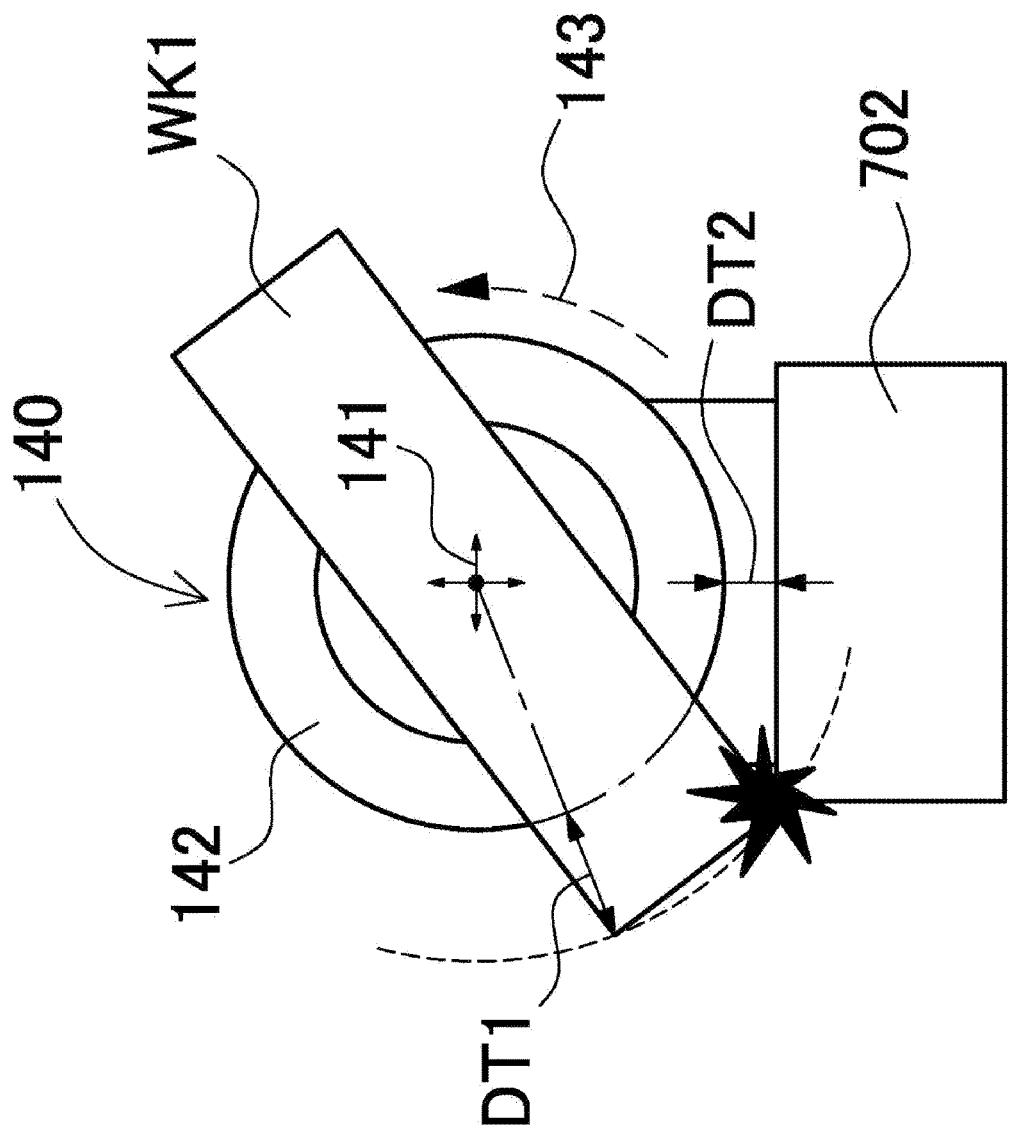
FIG. 13 is a schematic view showing collision of a measurement object when rotated by the rotation stage part.

The three-dimensional shape measuring apparatus which is a non-contact type measuring apparatus and observes down a measurement object in a slanting direction from the top as shown in FIG. 6 is considered to be used to measure not only an upper surface of the measurement object but also a three-dimensional shape of the measurement object including its outer peripheral side surfaces. In this arrangement, the measurement object is observed in a slanting direction from the top (45° in the case of FIG. 6) to include the top surface and side surfaces of the measurement object in the observation visual field. In the three-dimensional measurement, in order to obtain the exterior shape of the measurement object, the rotation stage part 143 can be rotated to observe all the peripheries of the measurement object. In addition, the translation stage part 141 can be considered to be used to measure a larger measurement object. On the other hand, there is the need to measure a larger measurement object. In this case, if a long measurement object WK1 is placed on the stage 140 and is rotated as shown in FIG. 13, there may be a risk that the measurement object WK1 collides with support stand 702 or the like of the three-dimensional shape measuring apparatus. In FIG. 18, if a distance DT1 as protruding amount of the measurement object WK1 is larger than a distance DT2 between the outermost periphery of the placement surface 142 and the support stand 702, such collision occurs.

(Function of Detecting Exterior Shape of Measurement Object)

To address this, the three-dimensional shape measuring apparatus according to this embodiment has an exterior-shape-detecting function of detecting an exterior shape of a measurement object. The exterior shape of the measurement object is detected by using the image capture optical system included in the measurer 100 based on image information which is obtained by capturing images of the measurement object placed on the placement surface 142. The exterior shape of the measurement object is detected by the CPU 210, for example. A known method such as edge detection can be suitably uses for the exterior-shape-detecting function algorithm. In addition, in the case in which the image capture optical system includes two photo-receiving devices including low and high scaling factors are included as discussed above, even when the high scaling factor photo-receiving device is selected to observe a measurement object, the low scaling factor photo-receiving device can be used to capture a small image of the measurement object so that exterior shape information of a wider area of the measurement object is obtained. For this reason, even in the case in which low and high scaling factor measurement modes are included as measuring modes of the three-dimensional shape measuring apparatus, an image is preferably captured by the low scaling factor photo-receiving device in order to grasp the exterior shape of the measurement object irrespective of selection of measuring mode.

Figure 14:
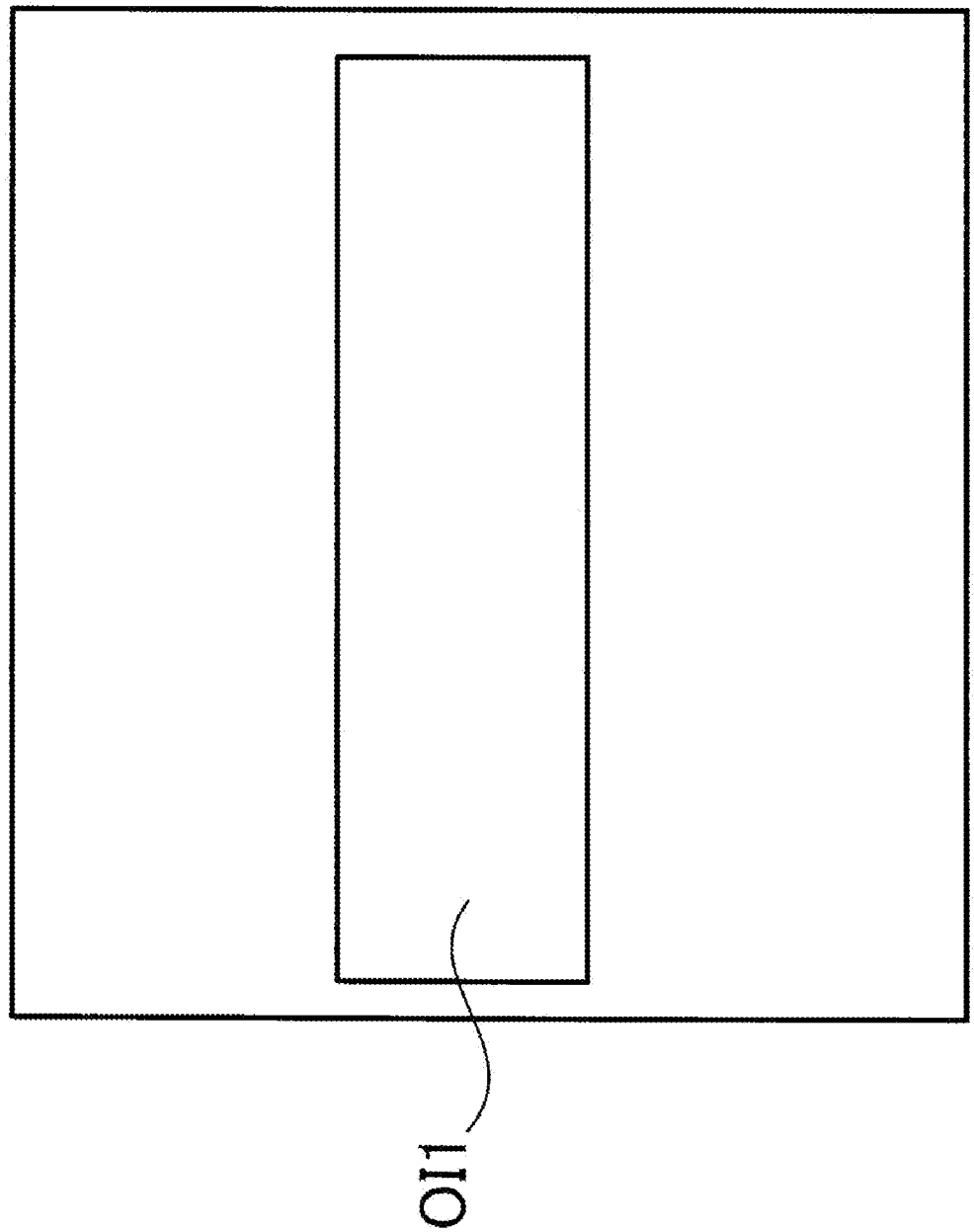
FIG. 14 is an image showing an observed image of a measurement object as viewed in a slanting direction from the top.
Figure 15:
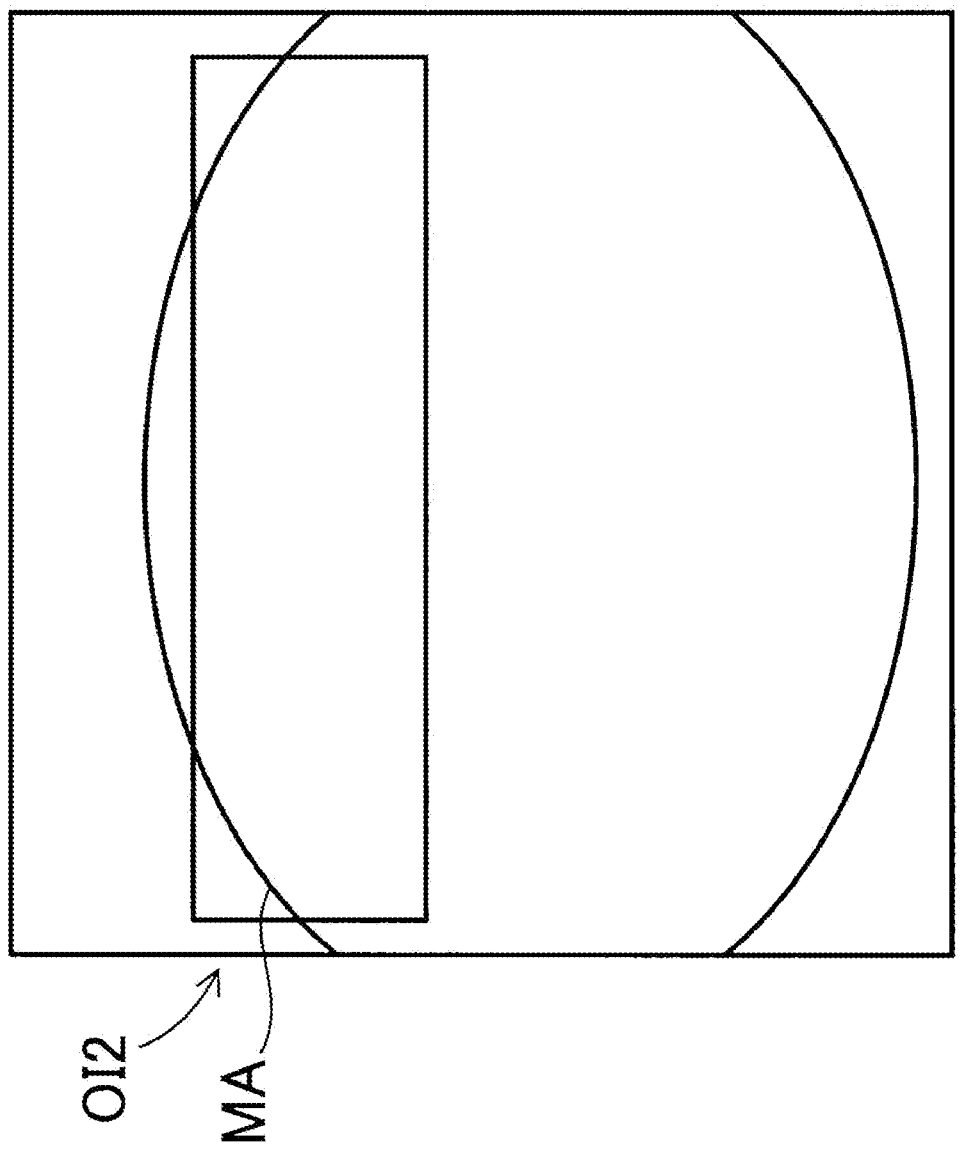
FIG. 15 is an image showing a measurable area.

FIG. 14 shows an observed bird's-eye view image of a measurement object which is captured in a slanting direction, and FIG. 15 shows the observed image on which a measurable area is superposed. Generally, wide-angle lenses are often used to capture a small image corresponding to wide area measurement, and its field of view is distorted toward the far side. In the image capture optical system which looks down a measurement object in a slanting direction with respect to the placement surface 142, according to the arrangement of its wide angle optical system, its captured image is affected by perspectivities, and as a result there is a problem that an extracted outline of the measurement object does not always accurately represent the exterior shape of the measurement object. This is because that its scaling factor varies in its depth direction, and a depth distance corresponds to a different pixel length depending on the depth.

Figure 16:
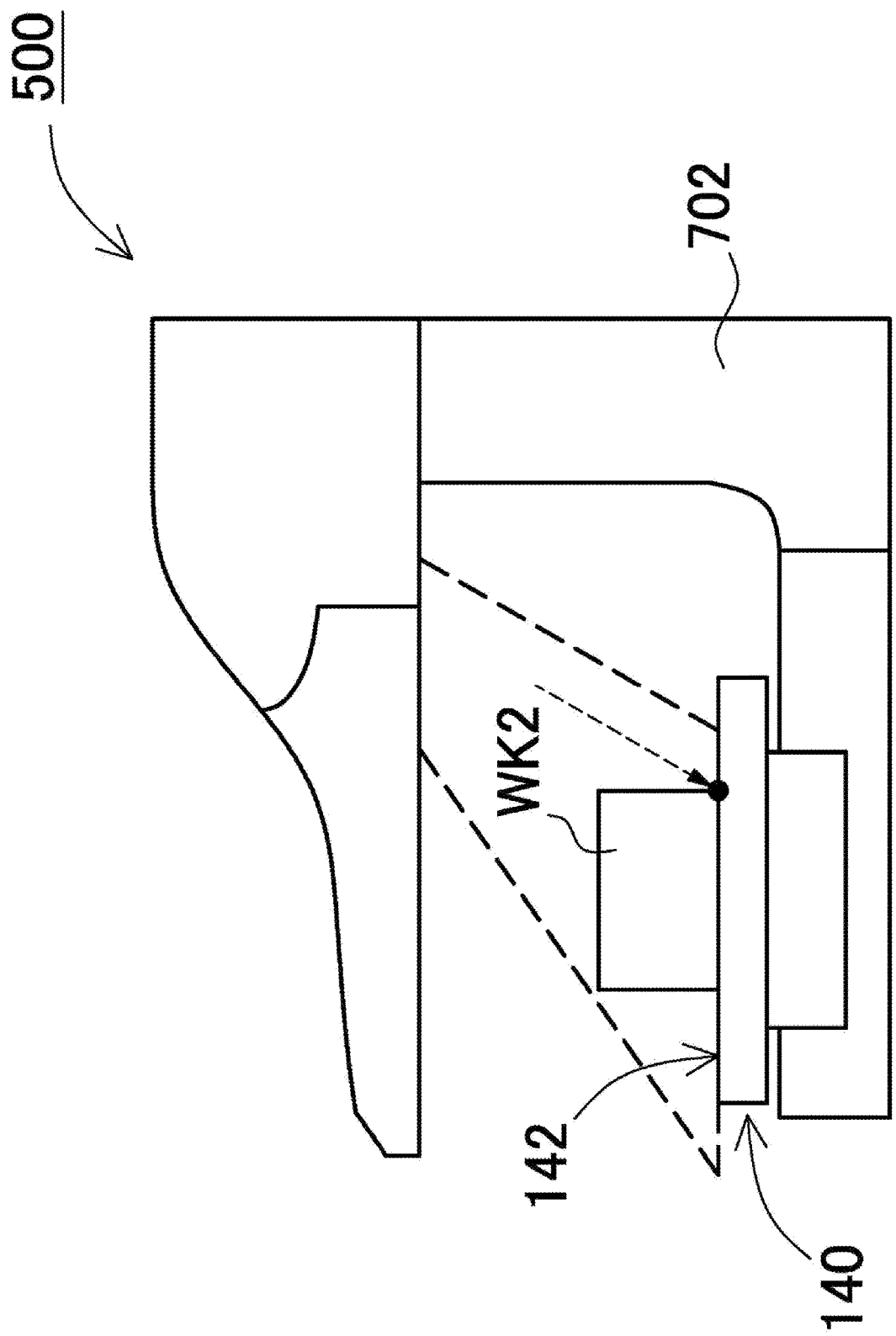
FIG. 16 is a schematic side view showing an arrangement in which a measurement object is placed in a horizontal orientation on a placement surface and observed in a slanting direction from the top.
Figure 17:
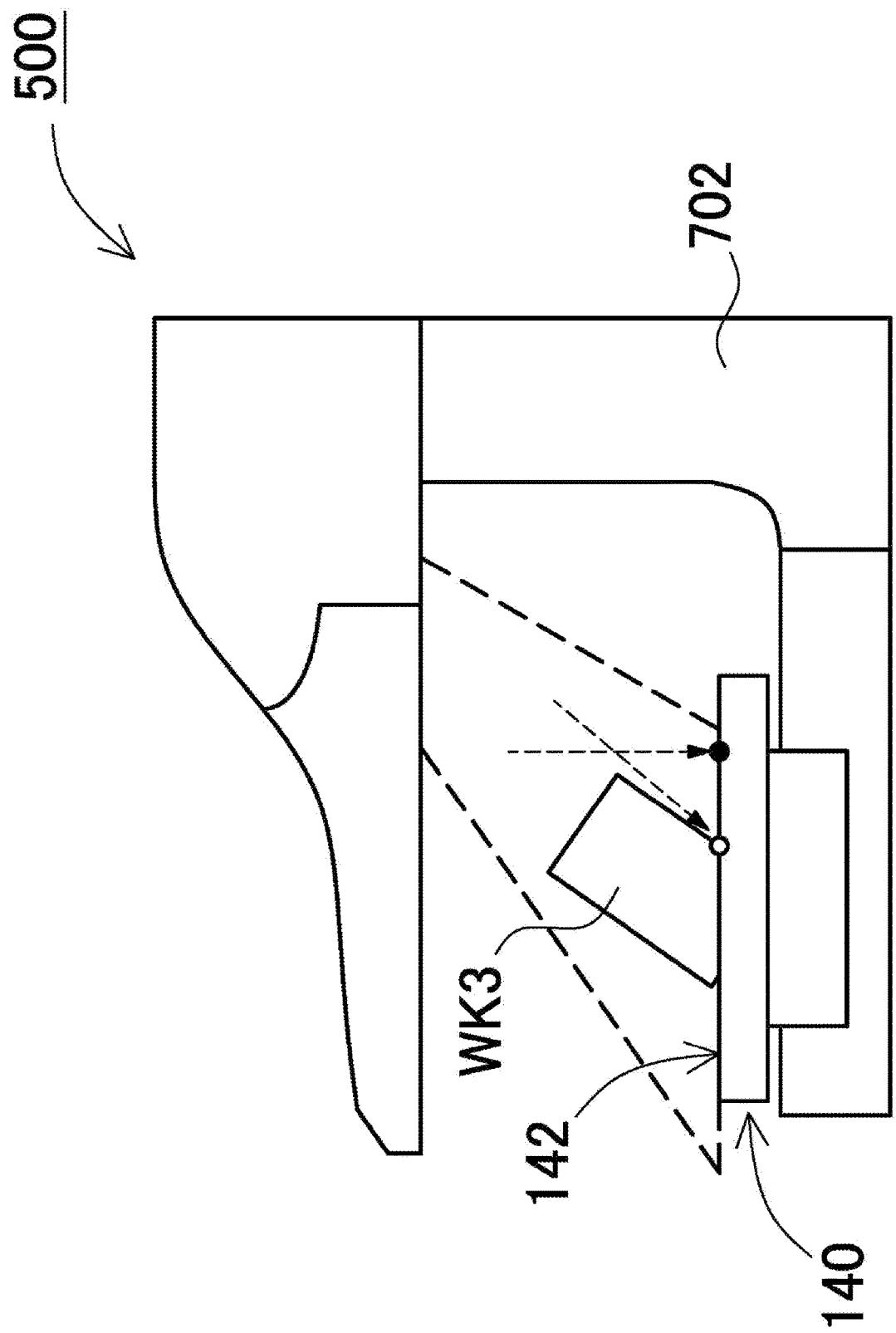
FIG. 17 is a schematic side view showing an arrangement in which a measurement object placed in an inclined orientation on the placement surface and observed in a slanting direction from the top.

In addition to a problem that such bird's-eye view images as viewed in a slanting direction from the top lack exterior shape information of a back surface of a measurement object, a problem arises that an outline of a front surface of the measurement object included in the field of view cannot always accurately represent the "end" of the measurement object which is placed on the placement surface 142. Here, this problem in detection of the end of a measurement object in a wide angle bird's-eye view is discussed with reference to FIGS. 16 and 17. In the case in which a bottom surface of a measurement object WK2 properly touches the placement surface 142 as shown in FIG. 16, the outline of the measurement object WK2 (shown by a solid black circle in FIG. 16) agrees with the exterior shape of the measurement object WK2. However, in the case in which the measurement object WK3 is placed on the placement surface 142 in an inclined orientation as shown in FIG. 17, the outline which is recognized in a captured image (shown by a solid white circle in FIG. 17) does not agree with the end of the measurement object WK3. Also, even in the case of FIG. 16, if a measurement object has a protruding part which protrudes upward, its outline does not agree with its end.

In these cases, even if a measurement area which can be obtained by moving the placement surface 142 is shown, users cannot recognizes the end of such a measurement object, and as a result a problem arises that users cannot recognize the area definition accuracy. For example, also in the case of the displayed image on which the measurement area is superposed shown in FIG. 15, in addition to uncertainty whether the back side is included in the measurement area, it can be found that determination whether the measurement object is inclined or the measurement object is positioned on the far side is difficult.

Accordingly, to address the difficulty in the detection of the exterior shape of such a measurement object, the three-dimensional shape measuring apparatus according to this embodiment generates a top view map image of the measurement object which is a top bird's-eye view image as viewed from the top like a plan view of the measurement object in order to change the viewpoint. The measurement area can be shown to users for ease of their grasp on the area by displaying the top view map image. In addition, because users can grasp the orientation of the measurement object which is placed on the placement surface 142 and the exterior shape of the measurement object, there is an advantage that movement control can be conducted in consideration of collision prevention and the like to prevent unintentional collision of the measurement object with other members when moving the placement surface 142.

The top view map image generator 261 generates a top view map image. Specifically, generation procedure of a top view map image is described. Firstly, point cloud data of a measurement object is generated. Subsequently, the generated point cloud data is mapped onto a plan view as viewed downward from the position right above the measurement object to generate the top view map image. A process which prompts users to specify a measurement area on the top view map image may be provided if necessary. In addition, a process which automatically specifies a measurement area on the top view map image may be provided.

As discussed above, although the three-dimensional shape measuring apparatus according to this embodiment includes an optical system which observes down a measurement object not from a position right above the measurement object but in a slanting direction from the top, the three-dimensional shape measuring apparatus obtains three-dimensional information of the measurement object, and generates and displays a top view map image as viewed from a position right above the measurement object to allow users to easily grasp the entire shape of the measurement object, and as a result the measurement area can be properly defined.

(Procedure of User Instruction to Generate Top View Map Image)

In the procedure definition and measurement flow in which the measurement area is defined on the top view map image and measured, the top view map image is first generated and displayed, and subsequently the measurement area is defined on the top view map image and then measured. A series of operations by users in this procedure is described with reference to a flowchart of FIG. 18. Firstly, a measurement object is placed on the stage in Step S1801. Subsequently, in Step S1802, measurement conditions for measuring the measurement object are defined. Here, examples of measurement conditions can be provided by brightness, orientation, measurement area, and the like of images. Subsequently, in Step S1803, an instruction to generate a top view map image is issued. For example, users open a measurement-area setting screen through a three-dimensional shape measuring apparatus operation program, and selects "generation of top view map image".

Accordingly, the top view map image is generated by the top view map image generator 261, and is displayed on the display 400 (Step S1804). After that, users see the top view map image (Step S1805), and determine whether the image capture area of the top view map image is sufficient or insufficient (Step S1806). If determining the image capture area is insufficient, users instruct to generate an additional top view map image (Step S1807). In this case, the additional top view map image is added and a new top view map image is displayed (Step S1808), and users determine whether the image capture area of the top view map image is sufficient or insufficient again (Step S1806).

On the other hand, if it is determined that the image capture area of the top view map image is sufficient, the procedure goes to Step S1809 in which the measurement area is defined. Subsequently, an instruction to measure the measurement object is issued in Step S1810 so that the measurement object is measured (Step S1811). As a result, the top view map image is generated.

(Procedure of Generation of Top View Map Image)

Figure 19:
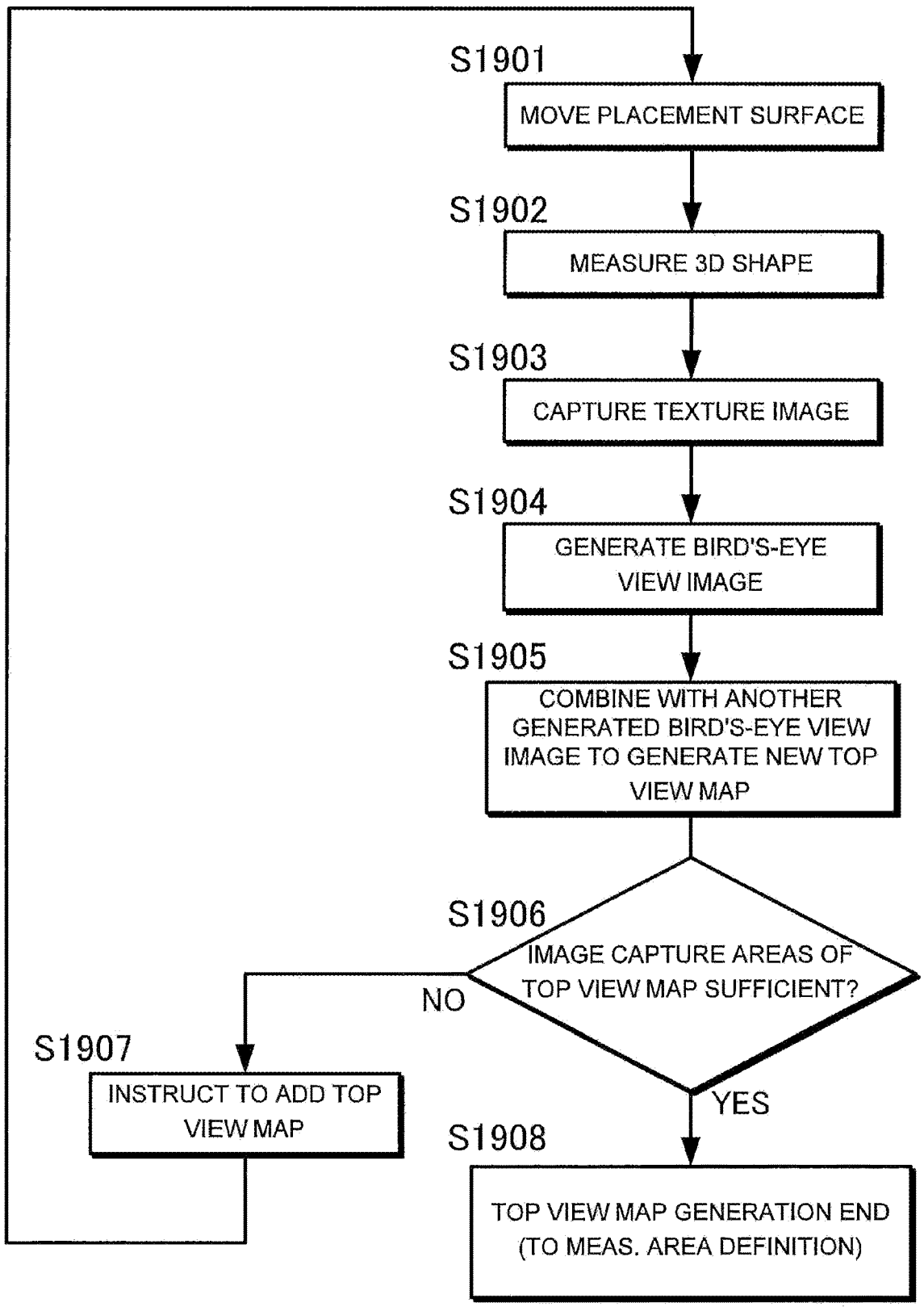
FIG. 19 is a flowchart illustrating the procedure for generating a top view map image.

The top view map image is a single top bird's-eye view image or an image which is generated by combining two or more top bird's-eye view images. Such top view map images have an advantage that two or more top bird's-eye view images can be easily combined with each other. Contrary to this, in the case of wide angle images as viewed in a slanting direction, because the wide angle images are affected by perspectivities, it is not easy to accurately combine two or more images with each other. Because two or more top bird's-eye view images can be easily combined with each other, there is an advantage that an additional image is easily added to a top view map image which has been generated. For this reason, when the top view map image is generated, because the procedure from the three-dimensional measurement and image capture to the image combination can be recursively executed, the size of the top view map image (i.e., field of view) can be increased until users feel that the size of the top view map image is sufficient. Here, the procedure as a series of processes for generating a top view map image is now described with reference to a flowchart of FIG. 19.

In the procedure in the three-dimensional shape measuring apparatus, the placement surface 142 is first moved in Step S1901. Subsequently, in Step S1902, a three-dimensional shape is measured at the position where the placement surface has been moved. Subsequently, a texture image is captured in Step S1903, and a top bird's-eye view image is generated in Step S1904. In addition, in Step S1905, this top bird's-eye view image is combined with another top bird's-eye view image which has been generated to generate a new top view map image.

Subsequently, in Step S1906, determination whether the image capture area is sufficient or insufficient is made as users' operation when users see the generated top view map image. If the image capture area is insufficient, the procedure goes to Step S1907 in which users instruct the three-dimensional shape measuring apparatus to add an additional image to the top view map image. According to this instruction, the procedure returns to Step S1901 so that the three-dimensional shape measuring apparatus repeats the processes for generating a top view map image. On the other hand, if it is determined that the image capture area of the top view map image is sufficient in Step S1906, the procedure goes to Step S1908 so that the series of processes for generating a top view map image ends. After that, the procedure goes to measurement area definition if necessary.

Here, FIG. 20 shows texture images, top view map images (top bird's-eye view images) before combination, and top view map images after combination at four positions (stage positions) in the case in which additional images are added to a top view map image one after another by moving the stage 140 to the four positions to increase the size of the top view map image (i.e., field of view). It can be found from FIG. 25 that the field of view becomes wider with increase of the number of stage positions so that the grasp of the entire shape of the measurement object becomes better.

In this case although the field of view becomes wider with the number of stage positions, time required to generate the top view map image correspondingly becomes longer. To grasp the entire shape of a measurement object, processes for capturing images at two positions can be sufficient in some cases but even processes for capturing images at four positions may be in sufficient in some other cases depending on the measurement object. As the procedure which generates a sufficient top view map image by generating images at a necessary and sufficient number of stage positions, it is conceivable that the field of view is increased until users stop the increase of field of view, for example. Alternatively, the top view map image generation process may stop for every position so that users determine whether to increase the field of view or not. Also, the top view map image generator 261 may recognize the increase degree of a visual field of the measurement object after top view map image combination to automatically increase the field of view if determining that the top view map image of the measurement object is insufficient.

(Top View Map Image Generation Process)

As discussed in the aforementioned series of processes for generating a top view map image, the top view map image generation process includes a process for creating a top bird's-eye view image at every stage position, and a process for combining top bird's-eye view images which have been created with each other.

(Creation of Top Bird's-Eye View Image)

A top bird's-eye view image which is used to generate a top view map image is generated from three-dimensional information and a texture image which are obtained from a measurement object. An example of a creation method of a top view map image can be provided by a method for mapping a two-dimensional image from point cloud data. Here, the method for mapping a two-dimensional image from point cloud data to generate the top view map image will be described.

(Mapping of Two-Dimensional Image from Point cloud)

Figure 21:
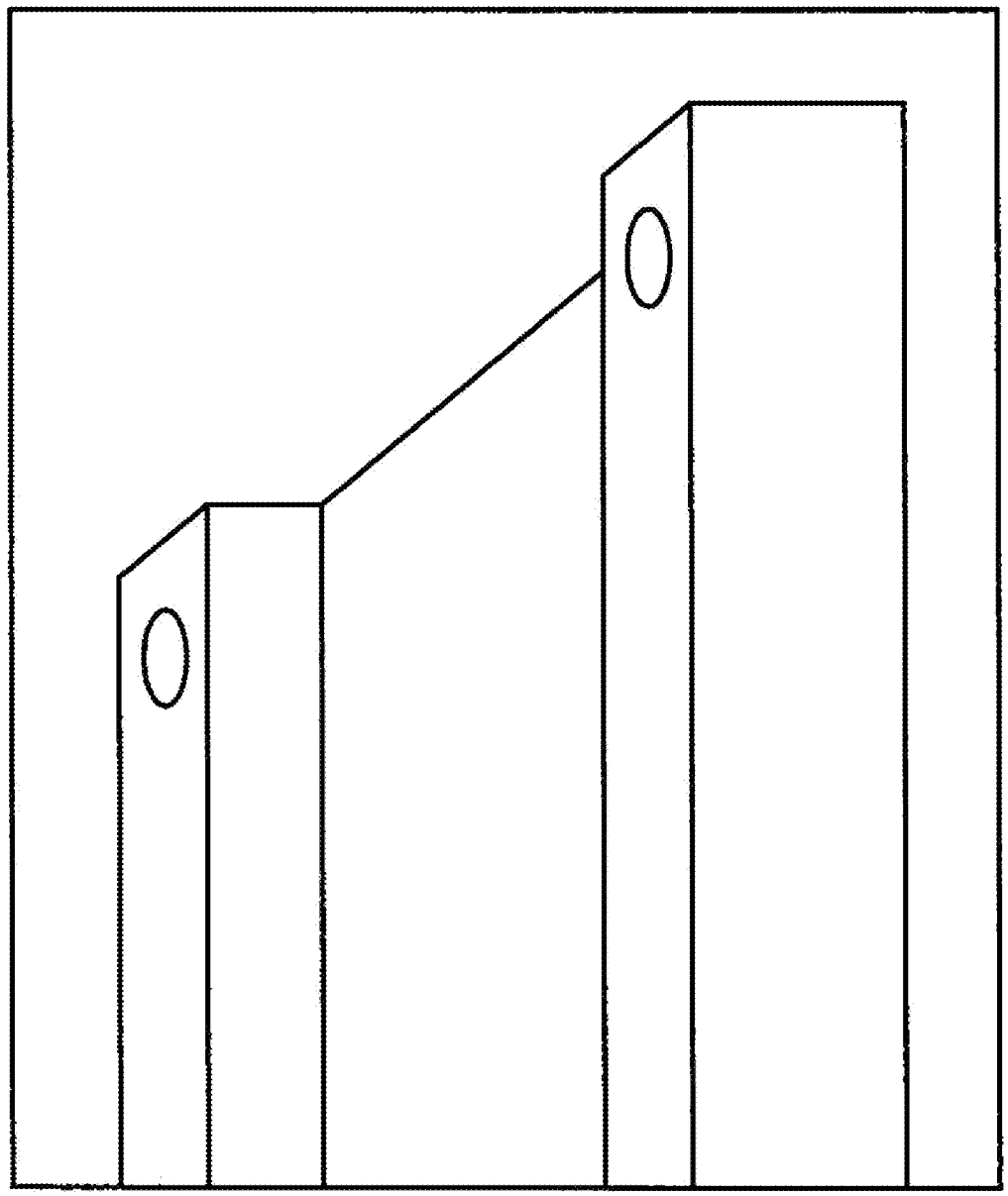
FIG. 21 is an image showing an exemplary texture image of a measurement object.
Figure 22:
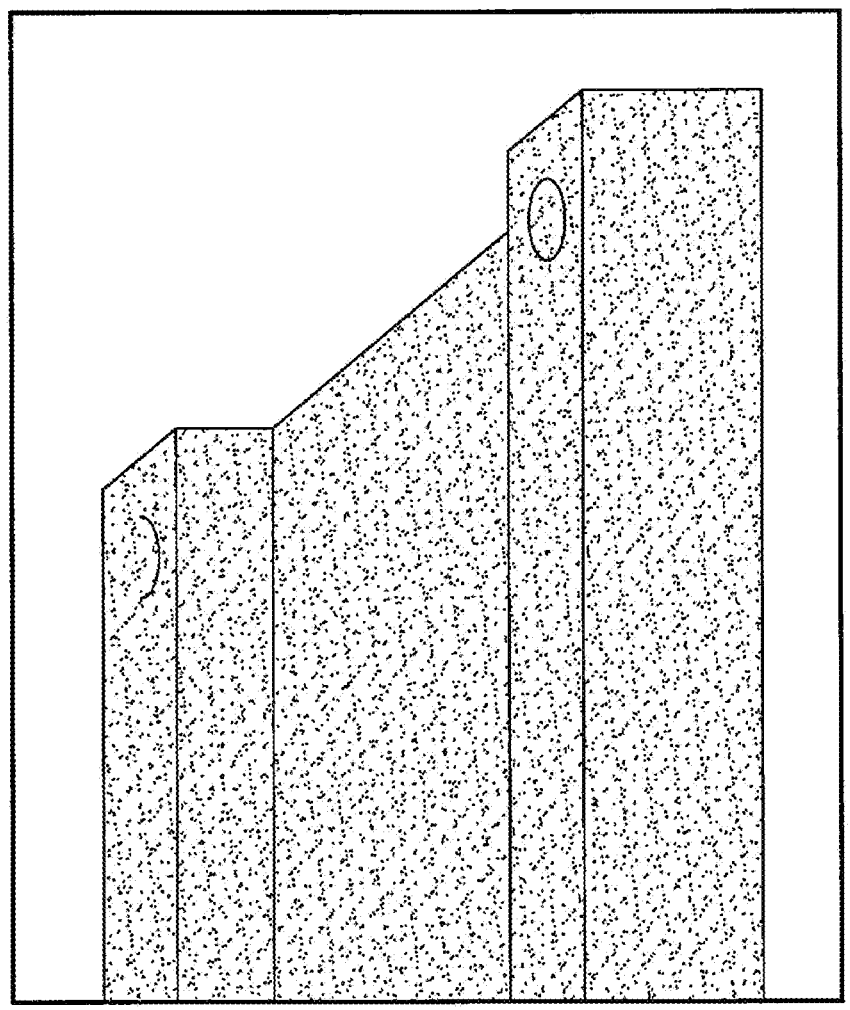
FIG. 22 is an image showing a point cloud image of the measurement object shown in FIG. 21.
Figure 23:
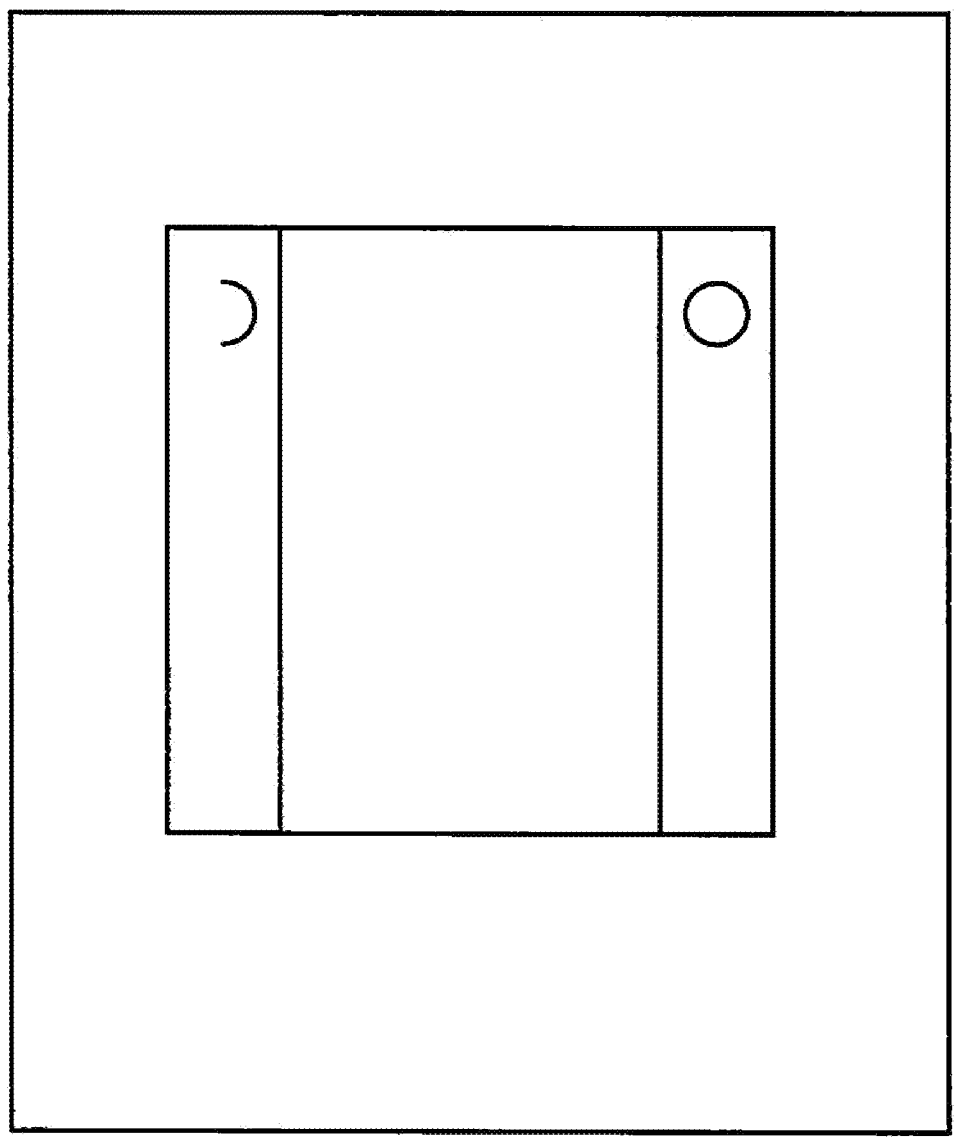
FIG. 23 is an image showing a top view map image of the measurement object shown in FIG. 21.
Figure 24A:
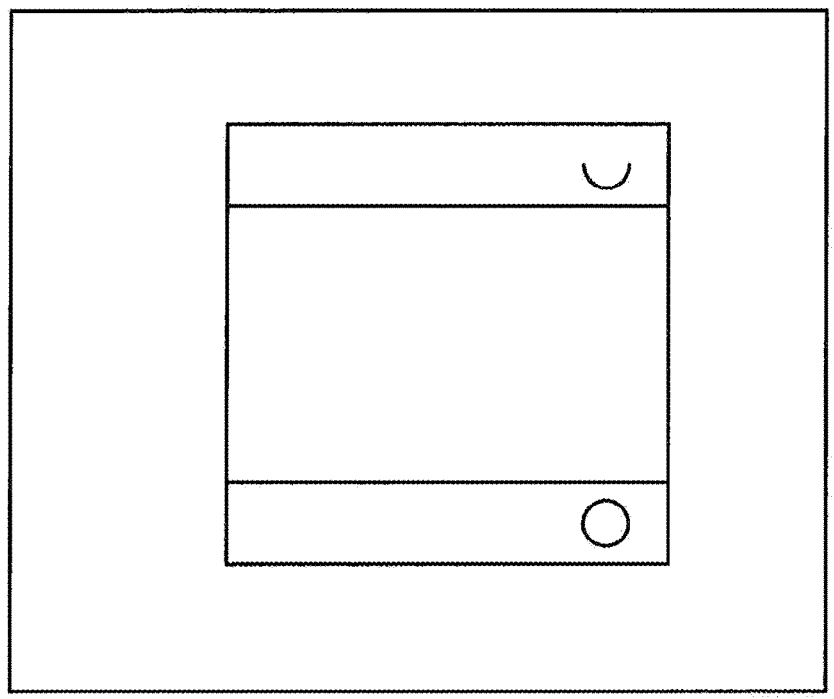
FIG. 24A is an image showing a top view map image before complementary to missing pixels.
Figure 24B:
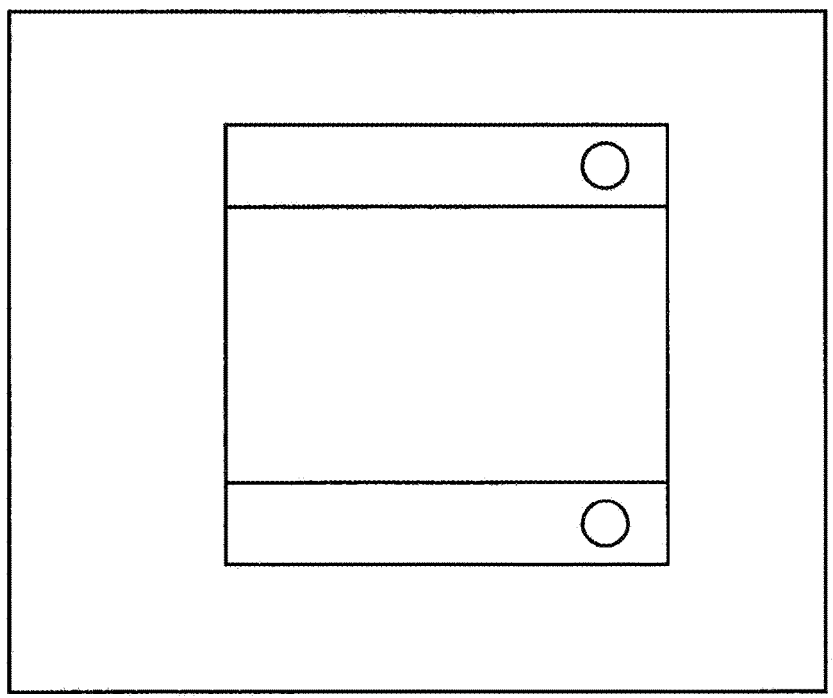
FIG. 24B is an image showing a top view map image after the complementary.

Three-dimensional information includes point cloud information (structured point cloud which holds positions of points for every pixel of the camera), and mesh data which is generated from the point cloud information. The top view map image is created by assigning brightness values in the texture image to positions of points for every pixel of the camera as photo-receiving device by using the point cloud information. Specifically, a top view map image shown in FIG. 23 is created from a texture image shown in FIG. 21 and a point cloud image shown in FIG. 22. However, because the top view map image is created by mapping points one by one, some of pixels may be missing. In this case, the top view map image generator 261 can interpolate such missing pixels based on peripheral pixels around the missing pixels to create a better quality image. As in such a case, FIG. 24A shows an exemplary top view map image before complementary which includes missing pixels, and FIG. 24B shows an exemplary top view map image after complementary which is created by complementing the missing pixels.

(3D Rendering by Generating Textured Mesh)

It is noted that the generation method of a top view map image used in the present invention is not limited to the aforementioned method for mapping a two-dimensional image from point cloud data but other methods can be used. Another exemplary generation method of a top view map image by generating a mesh with texture to render a 3D image is described. In this case, point cloud data is not used as it is, but a mesh image is first created, and a textured mesh image which has texture on the mesh image is created. In this method, a top view map image is generated by rendering a three-dimensional image of the created mesh image and changing the viewpoint and angle of view to provide a top bird's-eye view of the three-dimensionally rendered image. That is, the viewpoint from which the mesh image is viewed is set to a position right above a measurement object so that a view of the mesh image is shown in a plan view, and consequently the plan view of the mesh image is used as the top view map image. Although this method requires increase processing time as compared with the case in which point cloud information is used as it is because mesh image generation processing is needed, there is an advantage that other images which are viewed from different viewpoints such as side views and back view can be generated if required.

(Top Bird's-Eye View Image Combination)

Also, top bird's-eye view images can be simply superposed on each other, and as a result there is an advantage that processing required for combination of top bird's-eye view images is simple. For this reason, such a top bird's-eye view image can be easily added to a top view map image which has been generated, and therefore a top view map image of a wider area can be provided as shown in FIG. 20 if necessary.

(Speed Enhancement of Top View Map Image Generation)

Because top view map images are not used for measurement, high accuracy such as for measurement is not required for top view map image generation. For this reason, it can be said that a top view map image is preferably provided faster even if its accuracy is slightly poor. From this viewpoint, as compared with capture of images to be used for normal three-dimensional shape measurement, time required to generate a top view map image is reduced by simplification of image capture conditions and the like when the top view map image is captured. In this embodiment, when a top view map image is generated, the top view map image generator 261 generates the top view map image under simple measurement conditions which require a lower processing load than measurement conditions in normal three-dimensional shape measurement (normal measurement conditions). Because the simple measurement conditions are defined to reduce the load as compared with the normal measurement as discussed above, the top view map image can be generates and displayed in a short time.

(Simple Measurement Conditions)

The simple measurement conditions can include lower image resolution and shorter exposure time than the normal measurement conditions, a limited operation in which only a single image capture operation is executed with only one of the illuminators 110 (if two or more illuminators 110 are included to capture images by using the photoreceptor 120 every when the illuminators 110 of the photoreceptor 120 illuminate a measurement object with light one after another), and the like. Among them, it can be considered that the lower image resolution is provided by scaling the resolution of the camera as the photo-receiving device down when top view map images are captured. According to this scaling down of resolution, the number of elements in point cloud and the number of texture pixels are reduced, and as a result computation time can be reduced. For example, image capture time and image processing time can be reduced by reduction in mage size by half.

Also, shorter exposure time can be provided by increasing analog gain by using the analog gain function of the camera, for example. According to this increase of analog gain, although camera noise will increase, such noise provide not a detriment because accuracy is not required for top view map images; rather there is an advantage that exposure time of the camera can be reduced.

Also, the limited operation in which only a single image capture operation is executed with only one of the illuminators 110 (if two or more illuminators 110 are included) can be provided by using only the first illuminator 110A or the second illuminator 1106 when a top view map image is created in the case in which the aforementioned right and left illuminators 110 are included as shown in FIG. 2 to use their right and left measuring illumination systems when normal three-dimensional information is obtained. According to this limited operation, the illumination time can be reduced by half, and as a result, computation time can be reduced. In this case, although the area of a top view map image which can be measured at one stage position becomes smaller than the case in which the right and left illuminators are used, a drop-off area can be complemented by another top view map image which is obtained at another stage position. In addition, in the case in which the three-dimensional shape measuring apparatus includes a single illuminator and two or more photoreceptors, an image is captured by using only one of the photoreceptors when a top view map image is created so that the top view map image creation processing can be similarly simplified.

(Measurement Area Definition)

The measurement area is specified from a top view map image which has been created as discussed above. Examples of measurement area definition can be provided by automatic selection which is automatically executed by the three-dimensional shape measuring apparatus, and manual selection which is manually selected by users.

(Automatic Selection of Measurement Area)

Figure 25:
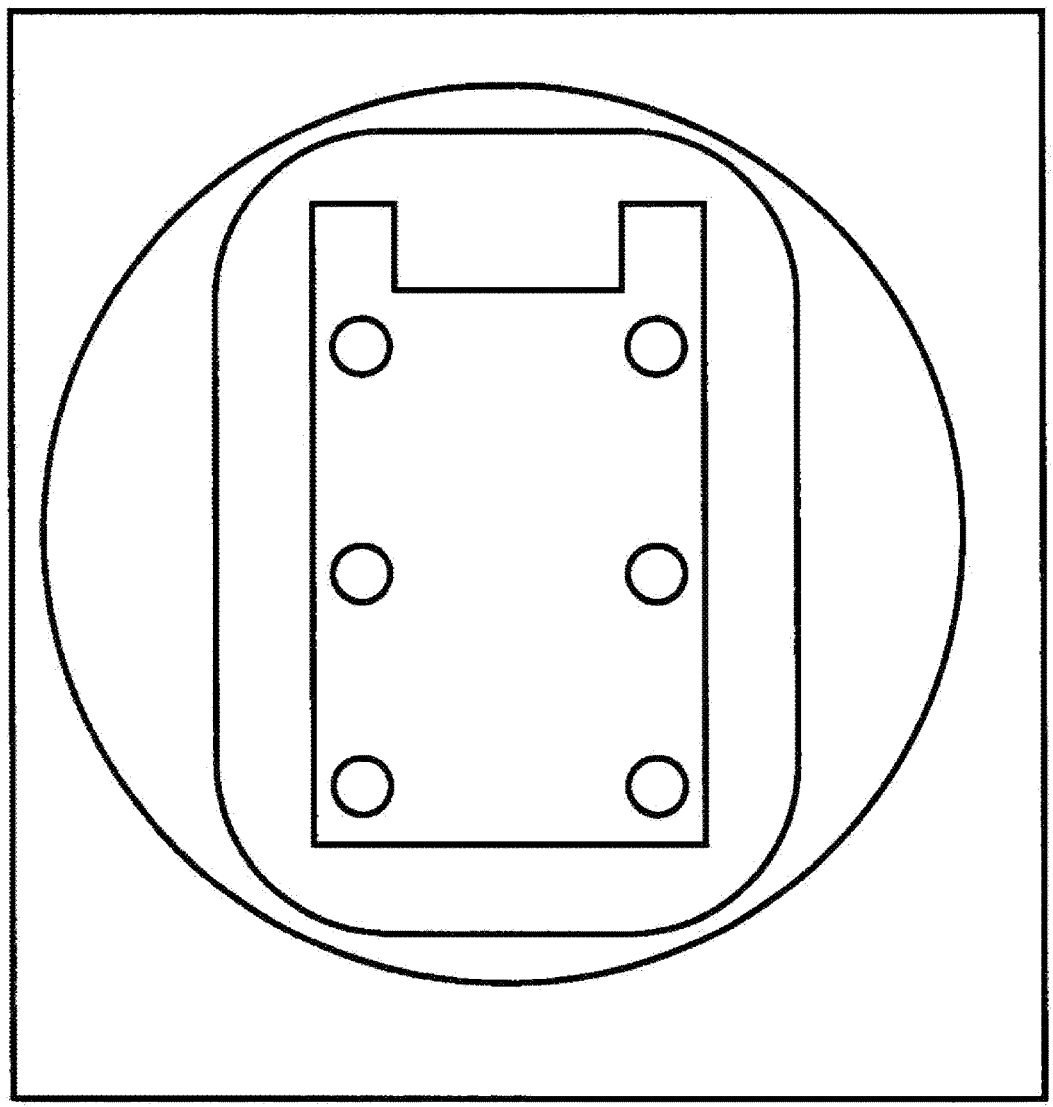
FIG. 25 illustrates an image showing an exemplary top view map image of the measurement area which is automatically determined.

Here, the automatic selection of the measurement area is described with reference to FIG. 25. FIG. 25 shows exemplary superposition display of the outline of a measurement object and the measurement area which is automatically determined. Because the top view map image generator 261 acquires the three-dimensional information of the measurement object in the creation process of the top view map image, it can determine which part of the top view map image is the measurement object. Here, it is determined that the part above the placement surface 142 of the stage 140 is the measurement object. Accordingly, the measurement area can be automatically determined so that the measurement area encloses the measurement object. In the case of FIG. 25, the measurement area is defined by an oval or rounded rectangular shape to enclose the outline of the measurement object shown by the thick line.

(Manual Selection of Measurement Area)

Figure 26:
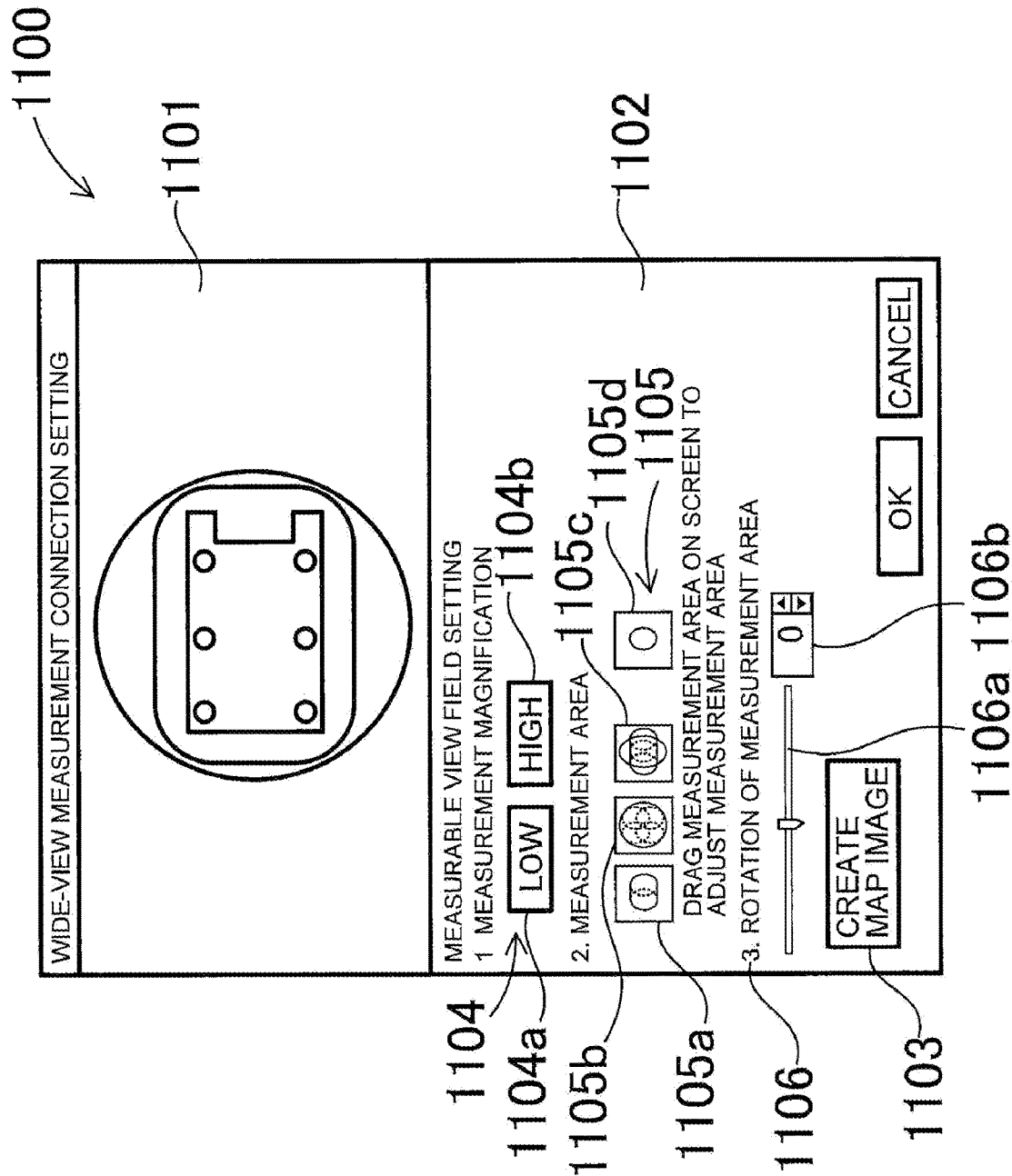
FIG. 26 is an image showing a user interface screen of a three-dimensional shape measuring program for allowing users to manually define a measurement area.

Next, exemplary manual selection in which users manually specify the measurement area is described with reference to FIG. 26. FIG. 26 shows an exemplary user interface screen of the three-dimensional shape measuring program to be displayed on the display 400. This screen is a measurement area setting screen 1100 which is one form of the measurement area setting part 264 which receives manual entry to specify the measurement area by using the top view map image. The measurement area setting screen 1100 includes a top view map image display area 1101 and an operation area 1102.

(Top View Map Image Display Area 1101)

The top view map image which is generated by the top view map image generator 261 is displayed in the top view map image display area 1101. In addition, the white line shows the outer edge of the stage 140 (circular line in FIG. 26), and the thin brown line shows the measurement area so that they are superposed on the top view map image.

(Operation Area 1102)

In the operation area 1102, buttons and tools which allow users to specify conditions and the like for creating a top view map image in the top view map image generator 261 are arranged. Also, guidance and the like may be shown in addition to the buttons and tools in the operation area. The operation area 1102 of the measurement-area setting screen 1100 shown in FIG. 26 includes a top view map image creation button 1103 for generating a top view map image, as well as a scaling-factor setting field 1104 for setting a measurement scaling factor, a measurement-area setting field 1105 for specifying a measurement area, and a measurement-area rotation field 1106 for rotating a measurement area as the buttons and tools which allow users to specify conditions for generating the top view map image. These fields to which their number corresponding to the setting order are arranged in increasing order from the top toward the bottom so that users can specify a measurement area by specifying these settings in this order. As discussed above, the operation area 1102 shows users the items corresponding conditions to be specified by users in the setting order, and as a result a navigation function which directs users to properly define the measurement area is realized. Also, a guidance function which gives guidance of procedure of various settings or shows specifications of measurement, cautions in measurement and the like by voice or video may be additionally provided. Accordingly, even if a user is not sophisticated about operations of the three-dimensional shape measuring apparatus, the procedure of settings is shown to the user so that the user will be directed to define user's desired measurement area without confusion. Of course, if a user is sophisticated about the operations, the user does not always necessarily follow such shown procedure but can suitably select necessary settings to specify user's desired conditions. Also, in this case, the navigation function or the guidance function can be switched between ON and OFF. This allows users to flexibly specify the settings in accordance with their experience and preference.

(Scaling-Factor Setting Field 1104)

A measurement scaling factor of a top view map image is defined in the scaling-factor setting field 1104. Also, a predetermined low scaling factor of a top view map image is determined to capture a wide top view map image. In the exemplary user interface screen shown in FIG. 26, low and high scaling factor buttons 1104a and 1104b which select a low or high scaling factor are provided. When the low scaling factor button 1104a is pressed, the first optical system which is included in the photoreceptor 120 and has the low scaling factor is selected, and a low scale image is captured. FIG. 26 shows the exemplary user interface screen shown in which the low scaling factor button 1104a is selected by pressing it. In particular, because the top view map image is required to include a wide area, preferably the entire shape of a measurement object, it is desirable to select the low scaling factor which provides a wide area image. In particular, even when high scaling factor measurement is actually performed, easy-to-operate environments in which operations such as measurement area setting can be easily conducted can be realized. From this viewpoint, the low scaling factor button 1104a may be selected as a default setting in the scaling-factor setting field 1104.

However, the top view map image does not necessarily include the entire image of the measurement object. For example, in the case in which an area which includes only a part (e.g., fore end) of a measurement object is measured, the top view map image is only required to include such a needed part. Alternatively, a case is conceivable in which a measurement area is carefully defined. To address such a case, to capture not only a low scale image but also a high scale image also when a top view map image is captured, the high scaling factor button 1104b shown in FIG. 26 can be provided.

Also, the scaling-factor setting field 1104 is not limited to the binary decision in which the low or high scaling factor is selected but may have another arrangement. For example, in a measurement-area setting screen 1200 according to a modified embodiment shown in FIG. 27, one scaling factor can be selected from a predetermined set of scaling factors in a pull-down list. Alternatively, the scaling-factor setting field may accept direct entry of any numerical value as the scaling factor.

Also, the photoreceptor may be moved away from the stage 140 so that a wider area top view map image can be captured. For example, the translation stage part 141 is translated by the movement controller 144 in a direction opposite to the support stand 702 from the previously-defined original position. In the case in which the translation stage part 141 is first moved to a position away from the photoreceptor 120, and the point cloud data generator 260 then generates point cloud data which represents a three-dimensional shape of a measurement object, a wide angle of view can be surely provided so that a wide area image can be captured, and therefore there is an advantage that even a large measurement object can be easily included in the field of view.

(Measurement-Area Setting Field 1105)

One shape can be selected from a predetermined set of shapes in the measurement-area setting field 1105 so that users can easily define an area to be measured. In the exemplary user interface screen shown in FIG. 26, buttons which represent a field of view by a pattern constructed of a circle or circles so that users can easily intuitively grasp their corresponding measurement areas. Specifically, four buttons are provided including a two-field pattern button 1105a represented by two fields of view which are horizontally aligned and partially overlap each other, a four-field pattern button 1105b represented by four fields of view which are arranged in four corner parts and partially overlap each other, a three-field pattern button 1105c represented by three fields of view which are horizontally aligned and partially overlap each other, and a one-field pattern button 1105d represented by only a single field of view. These pattern buttons show a field arrangement diagram roughly representing their arrangement of fields so that users can intuitively grasp the arrangement patterns of the fields of view which are assigned to the pattern buttons. It is noted that, although the fields of view are represented by a circular shape in the exemplary user interface screen for ease of understanding, actual fields of view are not limited to a circular shape but may have a trapezoidal shape. The reason to represent the field patterns by circular shapes is that such a circular shape helps users to grasp the field patterns, and areas which are abstracted by the circular shapes from the fields of view which are actually captured provide reliable data higher than the other parts.

When users select a desired one from the pattern buttons, the selected measurement area is superposed on an image shown in the top view map image display area 1101. For example, when a user selects a two-field pattern button 1105*a*, the measurement-area setting screen 1100 of FIG. 26 is shown. As shown in FIG. 26, the measurement area corresponding to the selected two-field pattern button shown by the brown line is superposed on an image shown in the top view map image display area 1101. In addition, the selected two-field pattern button 1105*a* is highlighted in the measurement-area setting field 1105 so that the user can visually determine which measurement area template is currently selected.

In addition, users may arbitrarily adjust the measurement area. Users can move the location of a measurement area, tilt or rotate the measurement area, or change the size of the measurement area by dragging the measurement area in the top view map image display area 1101 by using a pointing device such as mouse. Accordingly, users can intuitively specify the measurement area. In this case, the centers of the circular shapes of the two-field pattern can be shown. These shown centers of the circular shapes help users to grasp the current locations and relative positional relationship of the fields of view so that users can minutely adjust their locations and relative positional relationship.

Figure 28:
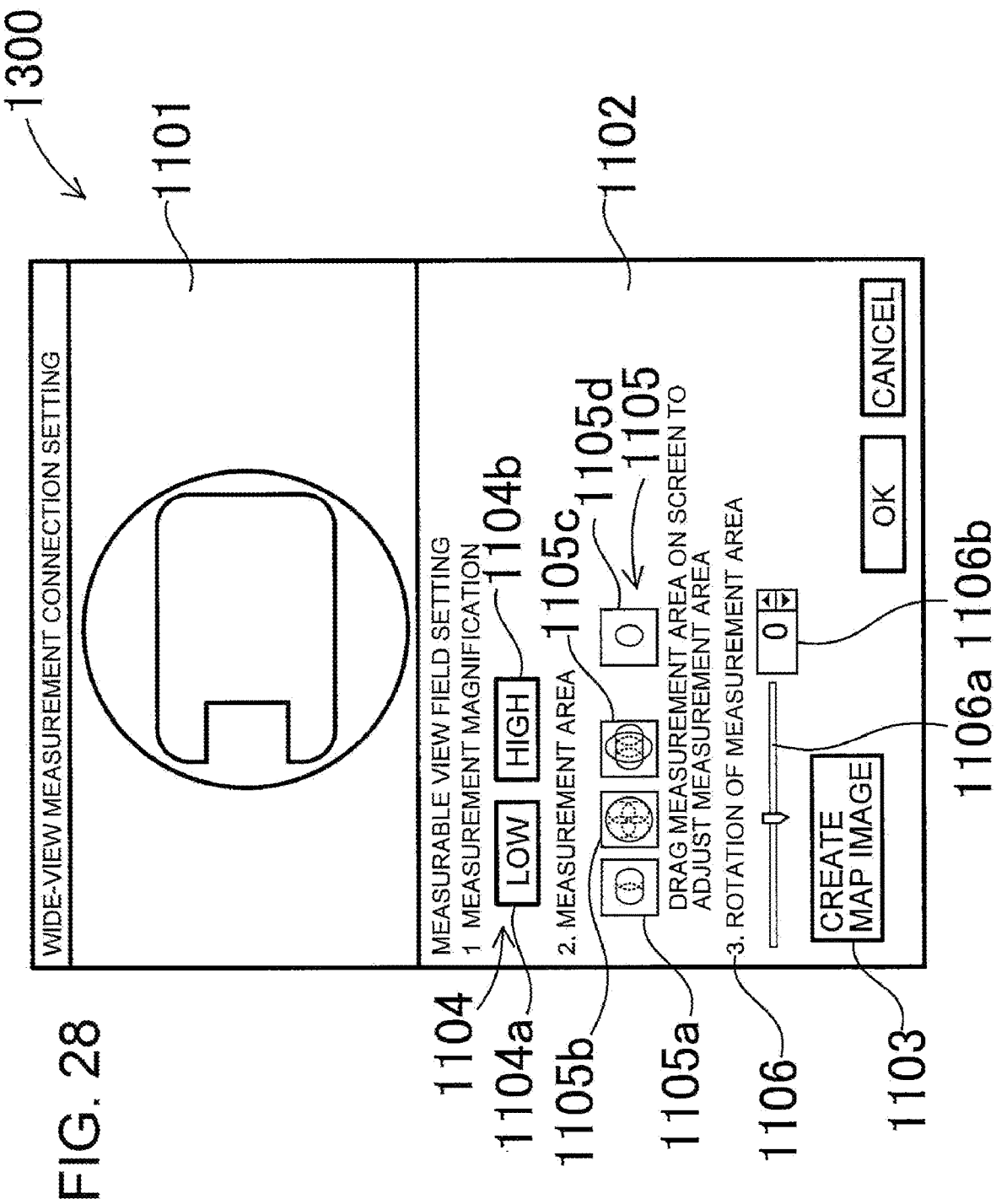
FIG. 28 is an image showing a screen in which a four-field pattern is selected in the measurement area setting screen shown in FIG. 26.
Figure 29:
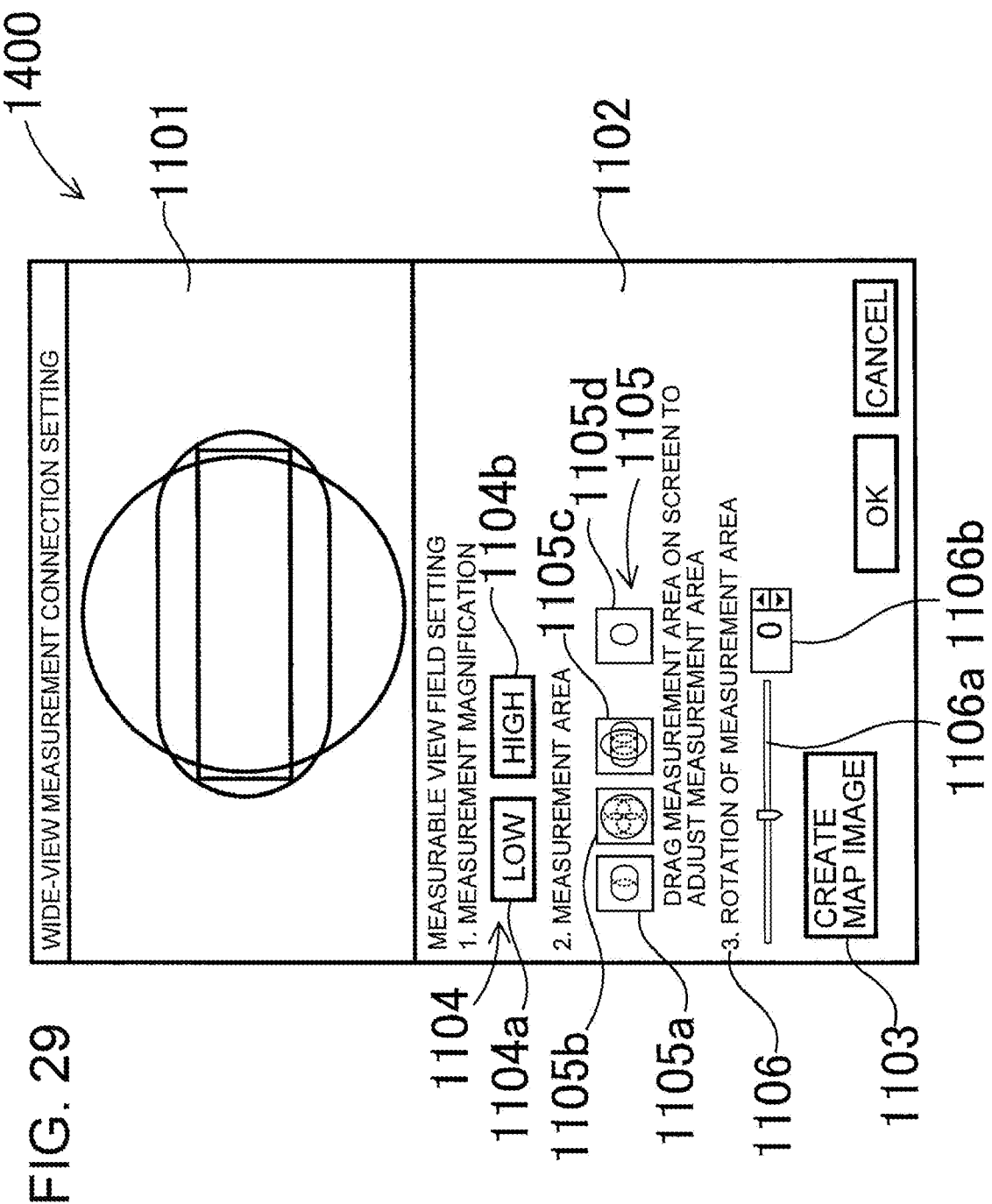
FIG. 29 is an image showing a screen in which a three-field pattern is selected in the measurement area setting screen shown in FIG. 26.
Figure 30:
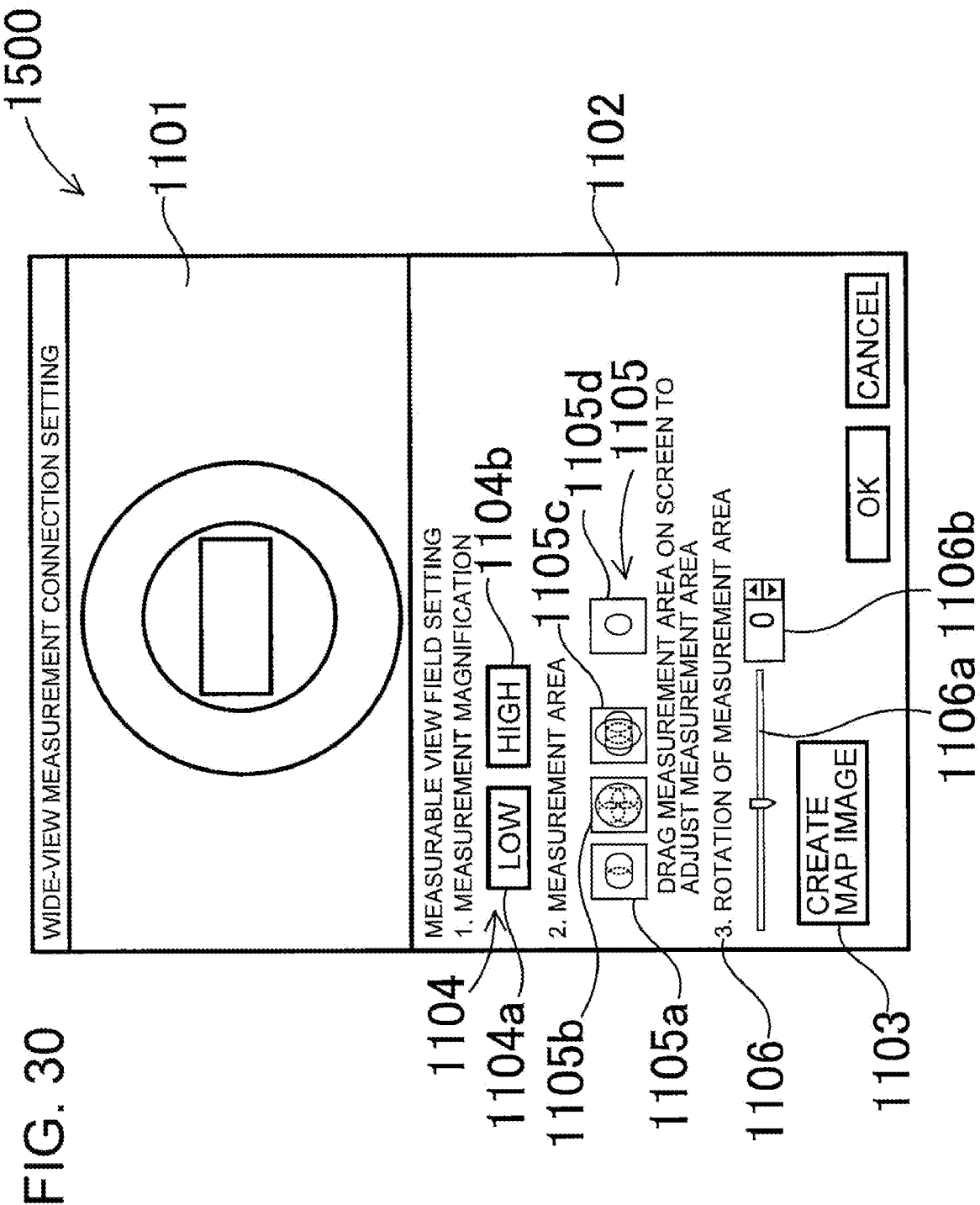
FIG. 30 is an image showing a screen in which a one-field pattern is selected in the measurement area setting screen shown in FIG. 26.

Similarly, when a user selects a four-field pattern button 1105*b*, a measurement-area setting screen 1300 of FIG. 28 is shown. Also, when a user selects a three-field pattern button 1105*c*, a measurement-area setting screen 1400 of FIG. 29 is shown. Also, when a user selects a one-field pattern button 1105*d*, a measurement-area setting screen 1500 of FIG. 30 is shown. Because measurement areas are previously provided like as templates as discussed above, users can select a suitable one from the previously-provided templates depending on the exterior shape of a measurement object. It is noted that the aforementioned templates are illustrative, and other patterns such as rhombus, trapezoid, polygon, and ring can be used. In addition to selection of a suitable template, users may directly draw a rectangular shape, circular shape, and the like on the top view map image display area 1101, alternatively, users may draw a line freehand to specify a measurement area and the area which is enclosed by the freehand line is converted into one of predetermined shapes which is selected as a roughly similar shape to the enclosed area by the top view map image generator 261.

(Measurement-Area Rotation Field 1106)

The measurement-area rotation field 1106 is a tool for rotating a measurement area which has been defined. In the exemplary user interface screen shown in FIG. 26, a slider for rotation 1106*a* is provided, a cursor can be moved along the rotation slider 1106*a* so that the measurement area in the top view map image display field is correspondingly rotated. Also, users can directly enter a numerical value as rotation angle into a numeric input field 1106*b* which is arranged on the right side of the rotation slider 1106*a*.

(Top View Map Image Creation Button 1103)

After the measurement area is defined as discussed above, a top view map image can be created. The top view map image creation button 1103 for creating a top view map image is provided under these operation fields. When users press the top view map image creation button 1103, the top view map image generator 261 generates the top view map image, and the generated top view map image is displayed in the top view map image display area 1101. Accordingly, users can visually grasp the displayed top view map image.

Figure 31:
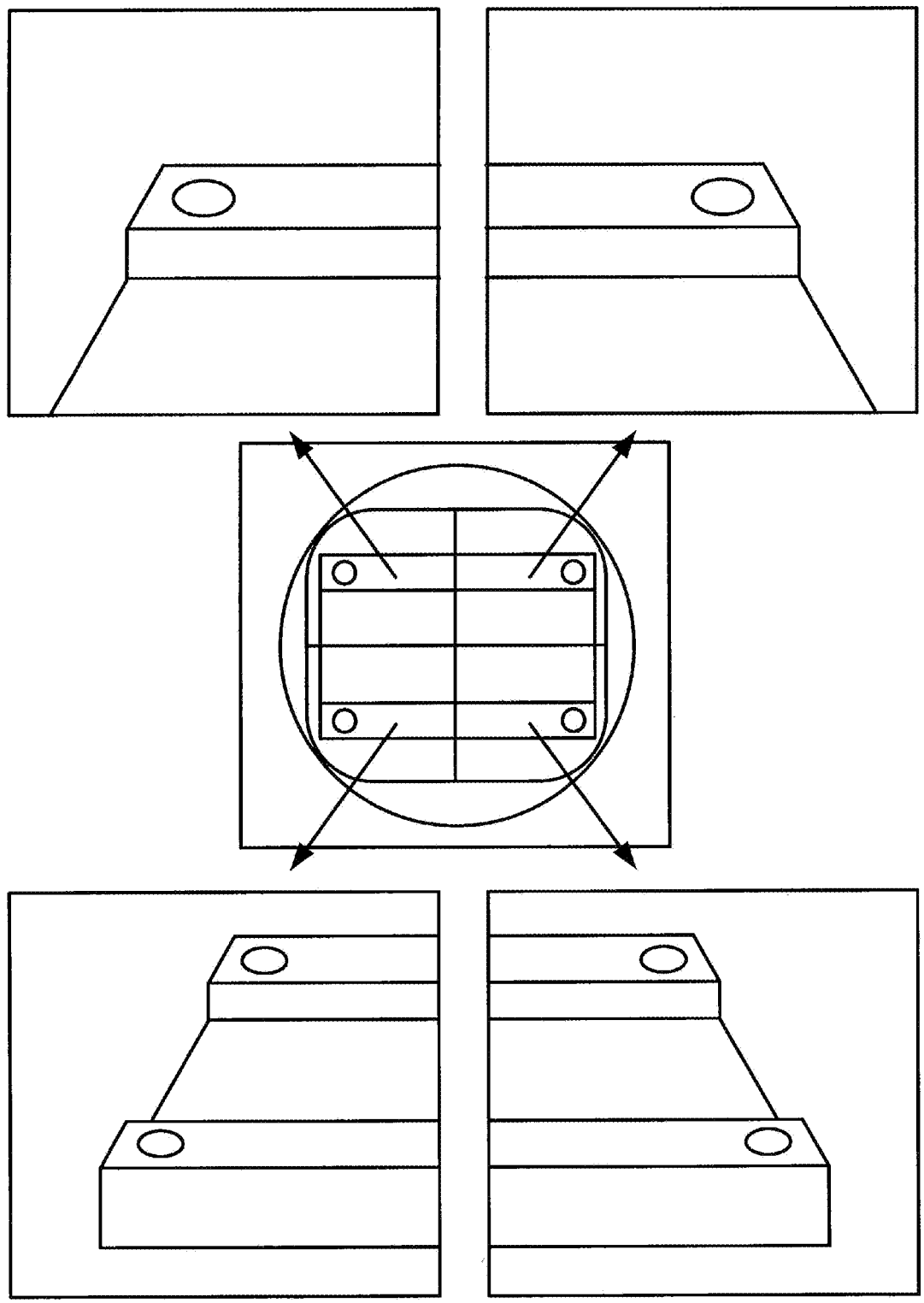
FIG. 31 is an image showing exemplary measurement area setting and measurement locations.

The top view map image generator 261 moves the translation stage part 141 so that measurement positions are positioned at the center of their corresponding field of view of the three-dimensional shape measuring apparatus. FIG. 31 shows a defined area and exemplary measurement positions in the defined area. Although only the translation stage part 141 is illustratively moved in this example, needless to say, rotation of the rotation stage part 143 can be combined with the movement of the translation stage part 141. In addition, in the case in which the rotation of the rotation stage part 143 can be combined with the movement of the translation stage part 141, after the translation stage part 141 is moved, the rotation stage part 143 is rotated at a position where the minimum rotation radius of the translation stage part 141 including the placement surface 142 as a whole is provided, and then the translation stage part 141 is translated.

(Top View Map Image Addition Function)

In addition, a top view map image addition function for adding an additional image to a top view map image which has been obtained may be additionally provided to spread the field of view of the top view map image. According to this function, if a top view map image is not properly obtained, for example, if right and left parts of a measurement object are unclear, or if a right or left part of a measurement object is not fully included, an image of the right or left part of the measurement object can be added to the obtained top view map image so that a wider field of view can be provided. An exemplary top view map image addition function is shown as a modified embodiment in FIG. 27. In this embodiment, an "auto" button 11038 is provided as the top view map image creation button 1103, and its information "1. Top View Map Creation: You Can Create Image Viewed from Top" or the like is shown in the upper part of an operation field. In addition, left and right buttons 1107*a* and 1107*b* are provided as addition buttons 1107 which realizes the top view map image addition function so that users can add an additional field of view to the left or right side to the top view map image which is currently shown. After that, a new top view map image corresponding to the wider field of view is similarly shown in the top view map image display area 1101 in the field of view, and users see the new top view map image and can further add an image to the new top view map image if necessary. For example, in the case in which to capture a top view map image as wide field of view as possible the stage 140 is positioned away from the measurer 100 when the image is captured, the right and left parts of the image of an object to be captured often cannot be seen, and to address this an image of a right or left part of the object can be added if necessary to take measurement against such unclear image.

Figure 27:
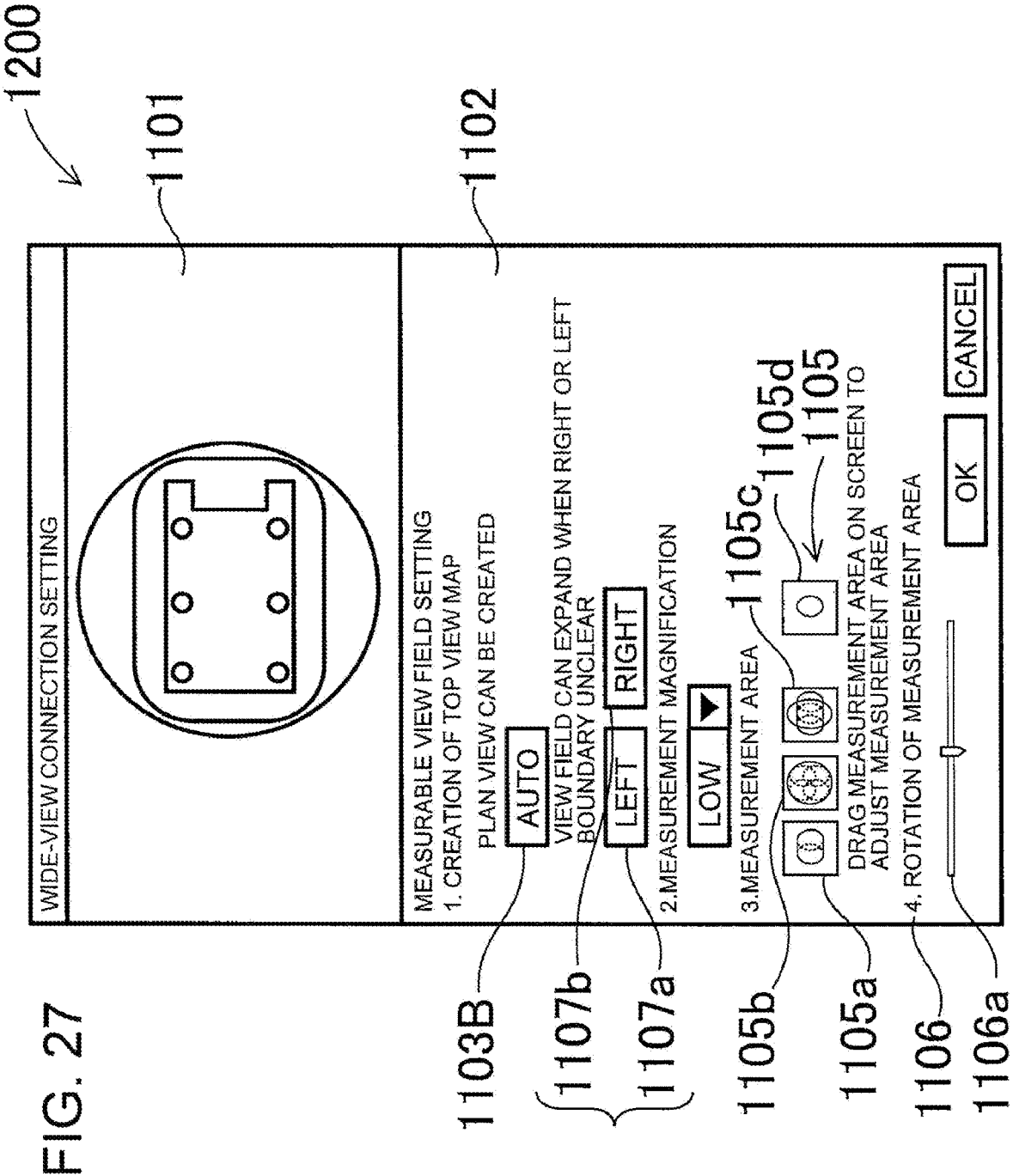
FIG. 27 is an image showing a measurement area setting screen according to a modified embodiment.

It is noted that, although addition buttons 1107 in the embodiment of FIG. 27 add an additional image to the right or left side of the top view map image which has been obtained, the present invention is not limited to this but such an additional image may be added to the top or bottom side of the top view map image, a part which is located in a slanting direction relative to the top view map image, or the like.

(Measuring Operation in Accordance with Measurement-Area Setting)

After the measurement area is defined as discussed above, measurement is conducted in accordance with this measurement definition. Here, the movement controller 144 moves the translation stage part 141 so that measurement points are positioned at the center of their corresponding field of view of the three-dimensional shape measuring apparatus. FIG. 31 shows a defined area and exemplary measurement positions in the defined area. Although only the translation stage part 141 is illustratively moved in this example, needless to say, rotation of the rotation stage part 143 can be combined with the movement of the translation stage part 141. In the case in which the rotation of the rotation stage part 143 can be combined with the movement of the translation stage part 141, after the translation stage part 141 is moved, once the translation stage part 141 is moved to the center of the rotation stage part 143, the rotation stage part 143 is rotated at the position, and then the translation stage part 141 is translated.

Here, in the arrangement in which a measurement object is measured in a slanting direction from the top with respect to the placement surface 142 as shown in the FIG. 6, etc., a camera is likely to receive external light from surroundings as compared with the arrangement in which such a camera is arranged right above the placement surface 142 and observes down a measurement object from a position the measurement object. To reduce such external light, in addition to the light-shielding cover 102 which extends above the placement surface 142 to shield light, a light-shielding curtain may be hung from the light-shielding cover 102. In this arrangement, the light-shielding curtain will be arranged on the far side of the placement surface 142, however in the case in which the light-shielding curtain is formed of a soft material such as cloth, even if a measurement object contacts the light-shielding curtain when moved by the movement of the placement surface 142, the light-shielding curtain can softly deform in response to this contact, and as a result such contact is not necessarily considered.

(Automatic Measuring Mode)

The three-dimensional shape measuring apparatus according to the first embodiment has an automatic measuring mode which can automatically determine necessary generation conditions from shape data which is generated by capturing an image of a measurement object which is placed on the placement surface 142, and can measure the measurement object in accordance with the automatically-determined necessary generation conditions. Users can easily obtain desired measurement data by executing the automatic measuring mode without concern about necessary generation conditions which are needed by the three-dimensional shape measuring apparatus. For example, if a measurement object is too large to be included in the measurement field of view, a measurement area of the measurement object is automatically defined by executing the automatic measuring mode, and the stage 140 is moved and two or more sets of shape data of the measurement object are generated at the moved positions one after another so that the entire shape of the measurement object is measured by combining the two or more sets of shape data with each other. The automatic measuring mode can be realized by the movement controller 144, for example. Also, generation conditions that can be automatically defined in the automatic measuring mode can include measurement area, measurement direction, optical measurement conditions, and the like.

(Automatic Selection of Measurement Area)

Even if a measurement object is larger, the three-dimensional shape measuring apparatus which includes the translation stage part 141 can measure different measurement areas by moving the stage 140 to change a measurement position of the measurement object by using the translation stage part 141. To measure a plurality of different positions as discussed above, measurement areas are necessarily defined. Examples of the procedure for automatically defining measurement areas can be provided by automatic selection by prescanning, automatic determination in measurement, and the like. The following description describes these examples.

(Automatic Selection by Prescanning)

Figure 32:
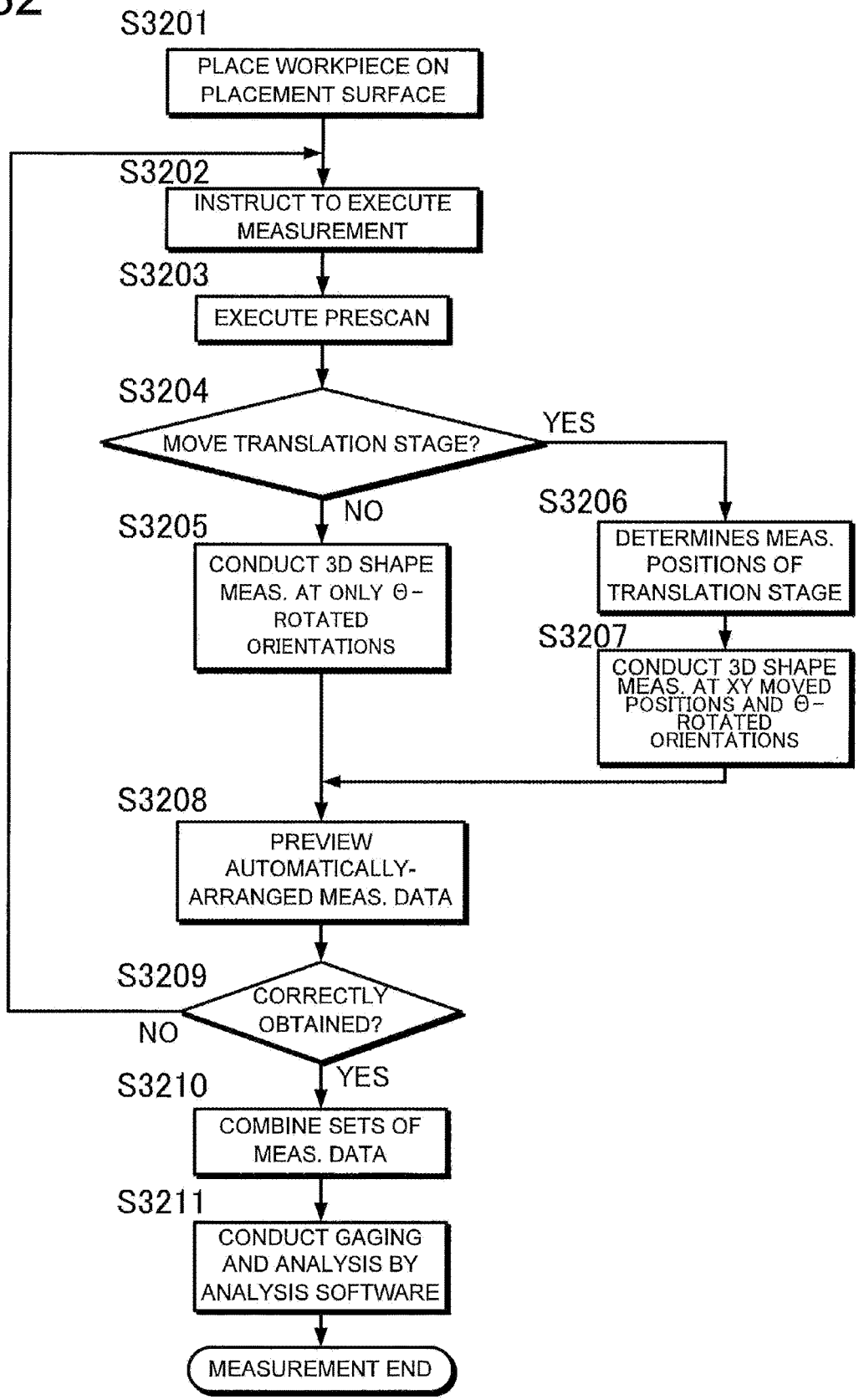
FIG. 32 is a flowchart illustrating the procedure for acquiring measurement data of a measurement object by prescanning.

Firstly, automatic selection by prescanning is described. The prescanning refers to high speed measurement with reduced measurement accuracy under simple measurement conditions simpler than the normal measurement. In the automatic selection using prescanning, the area of the measurement object is estimated by executing prescanning at the position in which a measurement object is placed on the placement surface 142 in the center of the field of view, and measurement areas are automatically determined. Here, the procedure for automatically determining measurement areas by using prescanning and obtaining measurement data of the entire image of a measurement object is described with reference to a flowchart of FIG. 32.

Firstly, a measurement object is placed on the placement surface 142 in Step S3201. Here, the measurement object is manually placed onto the placement surface 142 by users. In addition, the three-dimensional shape measuring apparatus may prompt users to place the measurement object onto the placement surface 142 if necessary. Subsequently, in Step S3202, users give the three-dimensional shape measuring apparatus an instruction to execute measurement. In response to the instruction, the three-dimensional shape measuring apparatus executes prescanning in Step S3203.

Subsequently, in Step S3204, it is determined whether the translation stage part 141 is necessarily moved or not. Here, the movement controller 144 determines whether the translation stage part 141 is necessarily moved or not. Subsequently, if the translation stage part 141 is not necessarily moved, the procedure goes to Step S3205 in which three-dimensional shape measurement is conducted at orientations where only the rotation stage part 143 is rotated by the movement controller 144 without movement of the translation stage part 141, and the procedure then goes to Step S3208. On the other hand, in Step S3204, if it is determined that the translation stage part 141 is necessarily moved, the procedure then goes to Step S3206 in which the movement controller 144 determines measurement positions to which the translation stage part 141 is moved. Subsequently, the movement controller 144 moves the translation stage part 141 to the measurement positions which are determined, and additionally rotate the rotation stage part 143 if necessary to conduct three-dimensional shape measurement in Step S3207, and the procedure then goes to Step S3208.

After three-dimensional shape measurement is conducted, automatically-arranged measurement data is previewed in Step S3208. Here, the combined shape data generator 260b displays the entire image of the measurement object on the display by arranging sets of shape data which are generated at the positions of the measurement object depending on their positions. Users see this entire image of the measurement object displayed on the display and determine whether it is correctly obtained or not in Step S3209. Subsequently, if users do not determine that the entire image of the measurement object is not correctly obtained, the procedure returns to Step S3202 so that the aforementioned steps are repeated. Subsequently, if users determine that the entire image of the measurement object is not correctly obtained, the procedure goes to Step S3210 in which sets of measurement data are combined. Here, the combined shape data generator 260b executes positioning of the sets of shape data to generate combined shape data. Finally, in Step S3211, users measure and analyze the obtained combined shape data by using the three-dimensional shape measuring program or the three-dimensional shape analyzing program which measures and analyzes the shape of the measurement object if necessary.

Even if a measurement object has a too large size to be included in the measurement field of view, users can obtain the entire shape image of the measurement object by automatically moving the stage 140 based on the prescanning of the measurement object without defining measurement areas, orientation, generation condition, and the like as discussed above. That is, the movement controller 144 automatically determines measurement areas depending on the shape of a measurement object and moves the stage 140 to obtain the entire image, and the combined shape data generator 260b generates combined shape data.

Figure 33E:
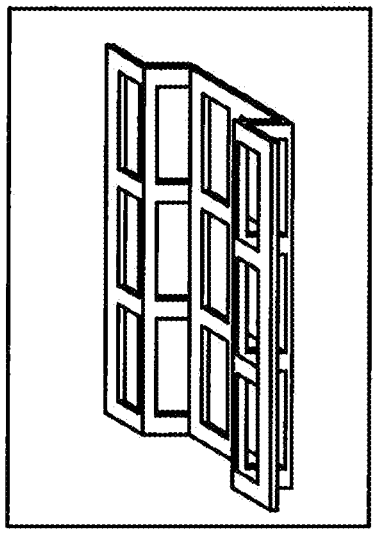
FIG. 33E is still another exemplary observed image of a measurement object.
Figure 33F:
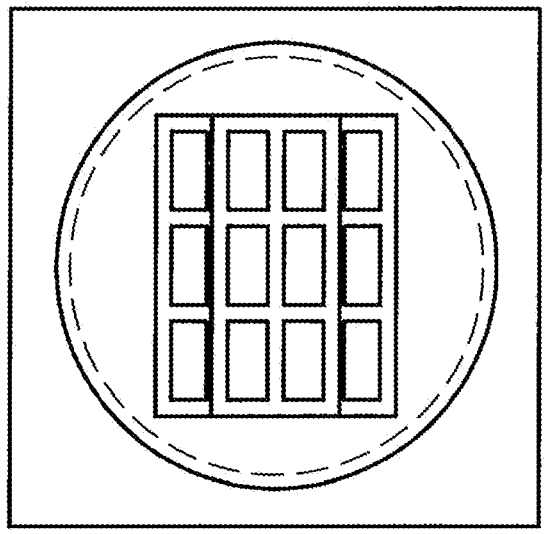
FIG. 33F is an image of a top view map image of the measurement object shown in FIG. 33E which is generated by using combination of movement of the translation stage part 141 and rotation of the rotation stage part 143.
Figure 33C:
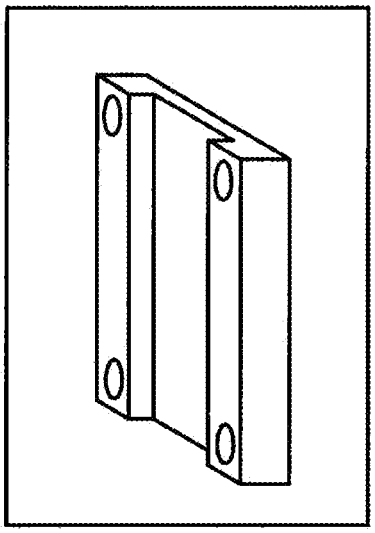
FIG. 33C is another exemplary observed image of a measurement object.
Figure 33D:
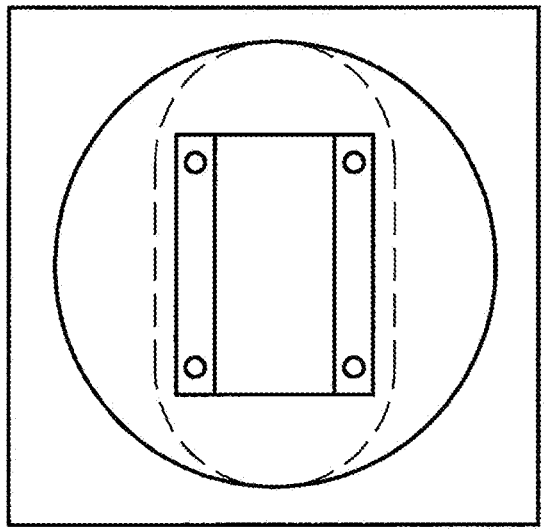
FIG. 33D is an image of a top view map image of the measurement object shown in FIG. 33C which is generated by using combination of movement of a translation stage part 141 and rotation of the rotation stage part 143.
Figure 33A:
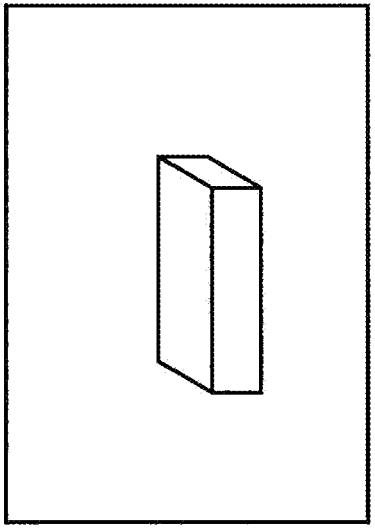
FIG. 33A is an exemplary observed image of a measurement object.
Figure 33B:
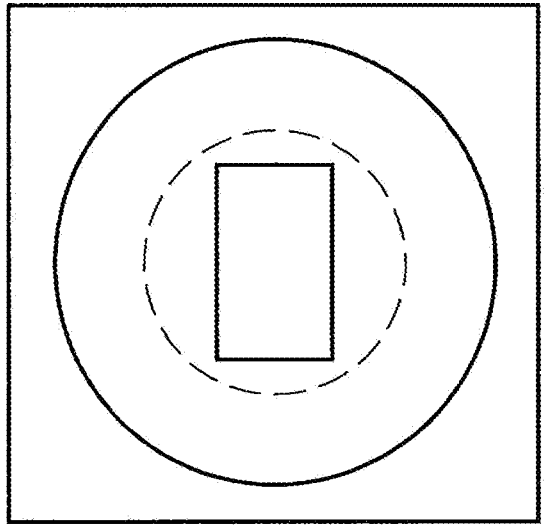
FIG. 33B is an image of a top view map image of the measurement object shown in FIG. 33A which is generated by using only rotation of a rotation stage part 143.

Here, results of top view map images which are obtained as measurement data by pre-scanning various types of measurement objects are shown in FIGS. 33A to 33F. In these drawings, FIG. 33A is an exemplary observed image of a measurement object; FIG. 33B is an image of a top view map image of the measurement object shown in FIG. 33A which is generated by using only rotation of a rotation stage part 143; FIG. 33A is another exemplary observed image of a measurement object; FIG. 33D is an image of a top view map image of the measurement object shown in FIG. 33C which is generated by using combination of movement of a translation stage part 141 and rotation of the rotation stage part 143; FIG. 33E is still another exemplary observed image of a measurement object; and FIG. 33F is an image of a top view map image of the measurement object shown in FIG. 33E which is generated by using combination of movement of the translation stage part 141 and rotation of the rotation stage part 143.

The procedure for generating such a top view map image is described with reference to a flowchart of FIG. 34. Firstly, prescanning is executed in Step S3401. The execution procedure of the prescanning is discussed above with reference to FIG. 32. Subsequently, a top view map image is created in Step S3402. The top view map image is generated by the top view map image generator 261. Subsequently, in Step S3403, it is determined whether the measurement object is included within the area in which its entire shape can be captured by using only rotation of the rotation stage part 143 or not. This determination can be made by the CPU 210 or the movement controller 144, for example. Subsequently, if it is determined that the entire image of the measurement object can be captured by using only rotation of the rotation stage part 143, the procedure goes to Step S3404 in which measurement data is obtained by using only rotation of the rotation stage part 143. Here, the rotation stage part 143 is rotated by a predetermined angle to a first position, and a set of partial shape data is obtained. After that, the rotation stage part 143 is further rotated to a second position, and a set of partial shape data is obtained. After the entire image of the measurement object is obtained by repeating the operations, the combined shape data generator 260b generates combined shape data by combining the sets of partial shape data so that the combined shape data is displayed on the display. For example, a measurement object shown in FIG. 33A is entirely included in the placement surface 142 so that it can be determined that the entire image is captured by using only rotation of the rotation stage part 143 based on the observed image of FIG. 33A. Accordingly, sets of partial shape data are obtained one after another at positions where the rotation stage part 143 is rotated by the movement controller 144. Here, the placement surface 142 is rotated by the rotation stage part 143 by a predetermined angle (e.g., 60° angular pitch) so that sets of partial shape data are obtained at the positions. It is noted that the predetermined angle is not limited to 60° but can be any angle such as 45°, 90°, or the like. Although finer shape data can be obtained by a smaller angular pitch, the number of images to be captured becomes greater and as a result its processing time correspondingly becomes longer. For this reason, the angular pitch is suitably adjusted depending on required accuracy and speed.

The obtained partial shape data is displayed on the display. Here, the obtained partial shape data is superposed at its corresponding position on the placement surface 142 to be displayed in a screen representing a plan view of the placement surface 142 whereby forming a top view map image. Subsequently, every when the rotation stage part 143 is sequentially rotated and additional partial shape data is obtained, the additionally obtained partial shape data is added to the partial shape data that has been obtained so that a new shape data is displayed. Accordingly, users can see the shape data of the measurement object to which the additionally obtained partial shape data is added at every measurement pitch value. Finally, a top view map image of the measurement object show in FIG. 33B is displayed as the combined shape data of FIG. 33A. In addition, a dashed circle in FIG. 33B roughly indicates an area corresponding to one field of view. That is, if a measurement object is included within this area, the entire image of the measurement object can be captured without moving the translation stage part 141. In other words, it can be determined that the entire image of the measurement object can be captured by using only rotation of the rotation stage part 143. In the determination of Step S3403 in the flowchart of FIG. 34, the movement controller 144 determines whether the measurement object is included in the field-of-view area indicated by the dashed circle or not. Also, the measurement area shown in FIG. 33B corresponds to the aforementioned top view map image display area 1101 of the measurement-area setting screen 1500 shown in FIG. 30. That is, users can understand that the entire image of the measurement object can be included by selecting the one-field pattern button 1105d. Although it has been described that users manually define a measurement area (i.e., the number of field-of-view areas) in the aforementioned exemplary screen shown in FIG. 30, a measurement area can be automatically defined by the three-dimensional shape measuring apparatus based on partial shape data that is firstly obtained in this embodiment.

The procedure shown in the flowchart of FIG. 34 is described again, and in Step S3403, if it is not determined that the entire image of the measurement object can be captured by using only rotation of the rotation stage part 143, in other words, if the movement controller 144 determines that movement of the translation stage part 141 is needed, the procedure goes to Step S3405 in which it is determined whether the measurement object is included within a predetermined translation range of the translation stage part 141 or not. Here, an example of the predetermined translation range of the translation stage part 141 can be provided by an area that is defined by the fixed field-of-view range in the X direction (top-and-bottom direction in FIG. 33D) and an extended range in the Y direction (right-and-left direction in FIG. 33D), for example. If the entire image of the measurement object is included within this area, the entire image of the measurement object can be captured by using only movement of the translation stage part 141 in the Y direction (right-and-left direction in FIG. 33D). In other words, because movement of the translation stage part 141 in the X direction (top-and-bottom direction in FIG. 33D) is not needed, the number of moving operations of the stage 140 is reduced so that the number of sets of partial shape data is reduced, and as a result shape data which grasps the entire measurement object can be efficiently obtained. Similarly, the measurement area is suitably rotated depending on how the measurement object is placed on the placement surface 142 (e.g., portrait orientation, inclined orientation, etc.) so that the shape data can be obtained with a reduced number of moving operations.

Subsequently, in Step S3405, the stage 140 is moved, and shape data is generated. Here, similar to Step S3404, the rotation stage part 143 is rotated by a predetermined angle (e.g., 60° angular pitch) so that sets of partial shape data are obtained one after another. Subsequently, the translation stage part 141 is moved in the Y direction, and the rotation stage part 143 is similarly rotated so that sets of partial shape data are obtained one after another. Subsequently, the combined shape data generator 260b generates combined shape data by combining the obtained sets of partial shape data so that the combined shape data is displayed on the display. As a result, the top view map image shown in FIG. 33D as the shape data is obtained from the measurement object shown in the observed image of FIG. 33C. In FIG. 33D, a measurement area shown by a dashed oval line, that is, a landscape measurement area zone corresponding to two measurement areas which are aligned in the horizontal direction in one-row and two-column arrangement are selected. Also, the measurement area shown in FIG. 33D corresponds to the aforementioned top view map image display area 1101 of the measurement-area setting screen 1200 shown in FIG. 27.

Figure 34:
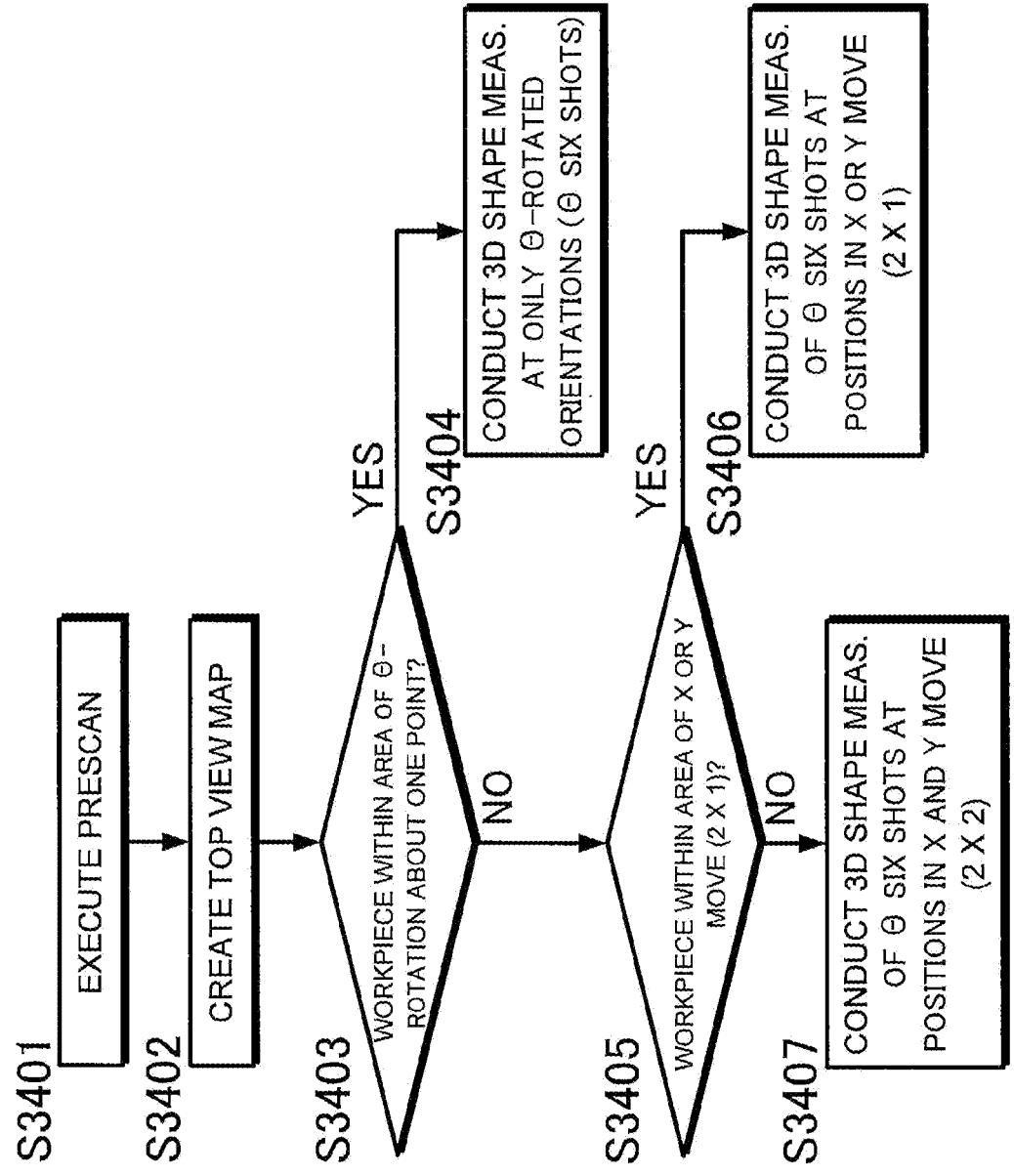
FIG. 34 is a flowchart illustrating the procedure for generating a top view map image.

On the other hand, in Step S3405 in the flowchart of FIG. 34, if the movement controller 144 does not determine that the measurement object is included within a predetermined translation range of the translation stage part 141, the procedure goes to Step S3407 in which the stage 140 is moved to expand an area of the translation movement of the translation stage part 141 so that the shape data is obtained. The expansion of the translation movement refers to expansion of the field-of-view ranges not only in Y direction (right-and-left direction in FIG. 33F) but also in the X direction (top-and-bottom direction in FIG. 33F) in FIG. 33F, for example. In this exemplary top view map image, the measurement area corresponding to four field-of-view areas which are aligned in two-row and two-column arrangement are selected. Accordingly, even if a measurement object is large both in its length and width directions as shown in the observed image of FIG. 33E, a top view map image which includes the entire image can be generated as shown in FIG. 33F. In Step S3407, similar to Step S3406, etc., the stage 140 is moved, and shape data is generated. Here, the rotation stage part 143 is rotated by a predetermined angle (e.g., 60° angular pitch) so that sets of partial shape data are obtained one after another. Subsequently, the translation stage part 141 is moved in the X and Y directions, and the rotation stage part 143 is similarly rotated so that sets of partial shape data are obtained one after another. The rotation stage part 143 is rotated by a 60° angular pitch six times in each of the four stage positions in the two-row and two-column arrangement as discussed above so that sets of partial shape data are generated and are combined by the combined shape data generator 260b, and as a result the generated combined shape data is displayed on the display. As a result, the top view map image shown in FIG. 33F as the shape data is obtained from the measurement object shown in the observed image of FIG. 33E. In this exemplary top view map image shown in FIG. 33F, the measurement area zone which is defined by combining four measurement areas shown by a dashed circle larger than FIG. 33B is selected. Also, the measurement area shown in FIG. 33F corresponds to the aforementioned top view map image display area 1101 of the measurement-area setting screen 1300 shown in FIG. 28. It is noted that, in the case in which four measurement areas are combined, although the four measurement areas are arranged so that four circles corresponding to the measurement areas are arranged to form a cross shape as shown in FIG. 28 they may be arranged side by side in a matrix shape such as in the two-row and two-column arrangement.

Modified Embodiment

In addition, although it has been described that the translation stage part 141 is moved in the lengthwise or width direction in the foregoing embodiment, the present invention is not limited to this but the translation stage part 141 may be moved in a diagonal direction, for example. In this case, when a long measurement object is diagonally placed on the placement surface 142, the translation stage part 141 can be moved along its lengthwise direction, that is, in the diagonal direction so that its shape data is generated. Also, the stage 140 may be arranged so that its X and the Y axes in which the translation stage part 141 is translated diagonally extend with respect to the depth direction in which the stage 140 is moved toward and away from the support 700 and the width direction perpendicular to the depth direction as viewed in a plan view of the placement surface 142.

For example, in the first embodiment, because the driving direction of the translation stage part 141 changes in accordance with the rotational position θ, if the distance from the center to the stroke end (=(entire stroke)/2) is not shorter than L at any orientation, the end of the placement surface 142 will collide with the support stand 702. For this reason, safe strokes which can avoid the collision in any directions of strokes of the translation stage part 141 shown in FIG. 35A can be shown by the circular area shown by the solid line in FIG. 35B. As a result, the effective stroke ranges shown by the dashed line in FIG. 35B in which the stage 140 can be moved from the viewpoint of its own capability will be reduced.

Figure 35A:
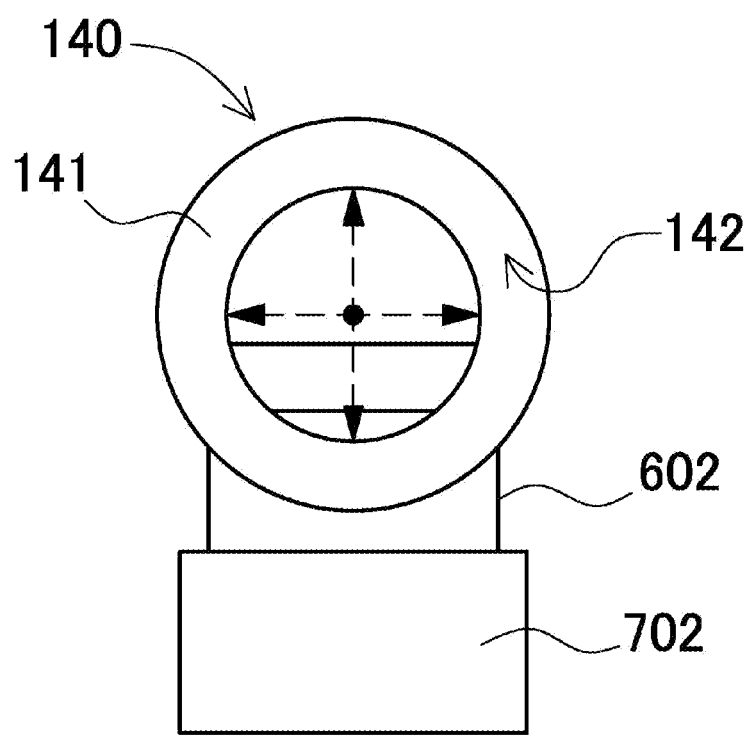
FIG. 35A is a schematic plan view showing a placement surface on which X and Y axes of a translation stage part extending in the vertical and horizontal directions are arranged.
Figure 35B:
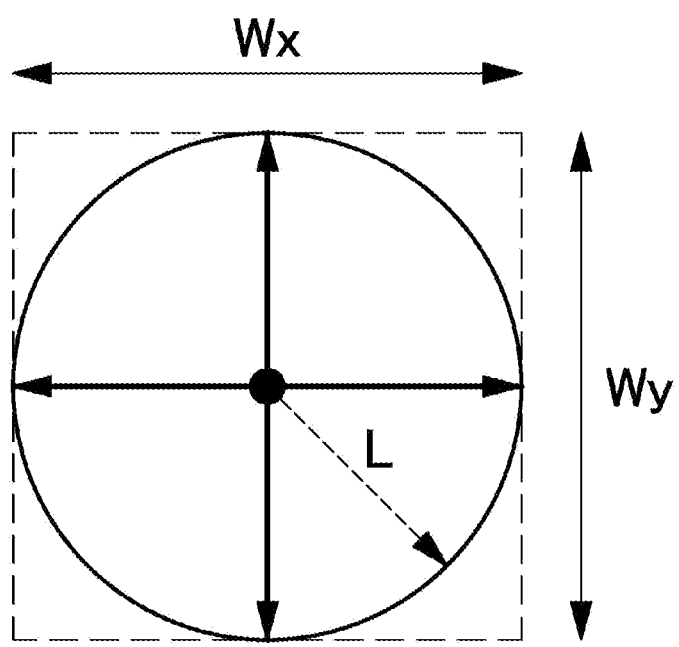
FIG. 35B is a schematic plan view showing X and Y strokes and a safe movement area circle of the translation stage part.
Figure 36A:
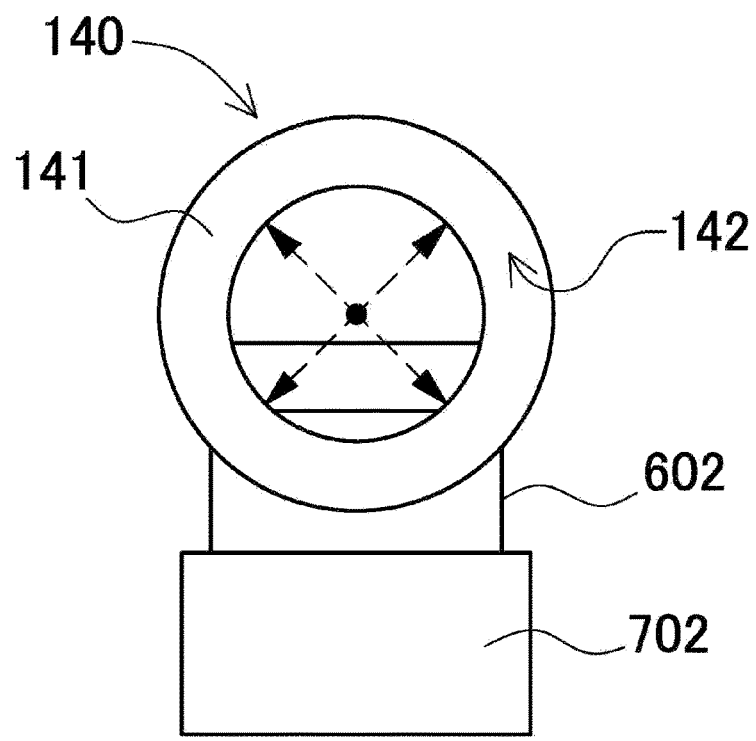
FIG. 36A is a schematic plan view showing a placement surface on which X and Y axes of a translation stage part are inclined with respect to the vertical and horizontal directions.
Figure 36B:
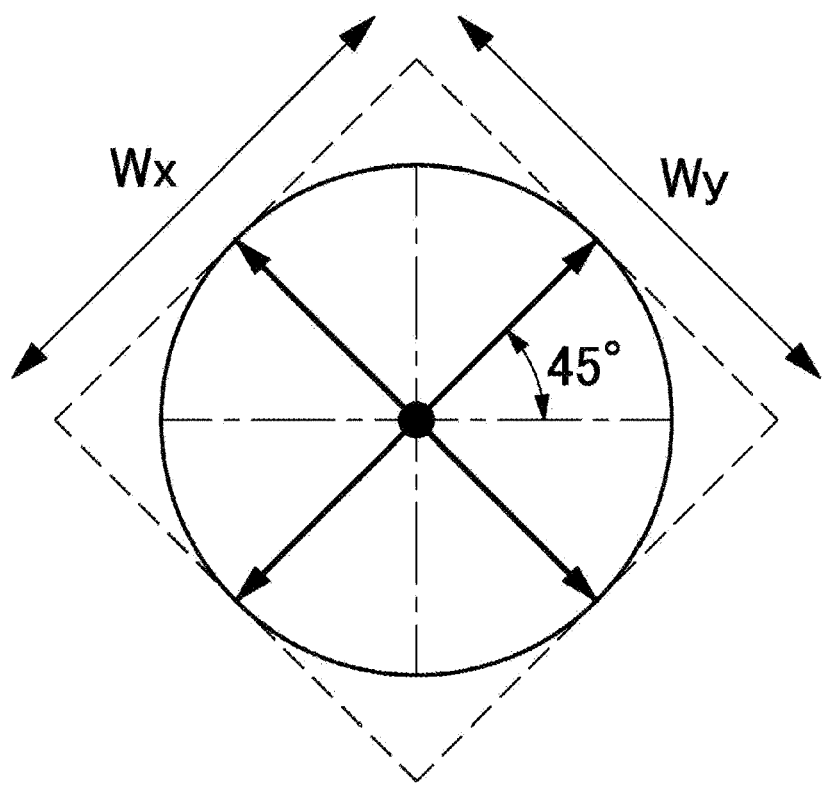
FIG. 36B is a schematic plan view showing X and Y strokes and a safe movement area circle of the translation stage part.

Contrary to this, in a three-dimensional shape measuring apparatus according to a modified embodiment shown in FIGS. 36A and 36B, the effective stroke ranges which form a rectangular shape may be inclined from the orientation shown in FIGS. 35A and 35B so that the corners are positioned at the top and bottom, and right and left sides. In other words, the diagonal lines of the effective stroke ranges which form a rectangular shape are rotated to agree with the X and Y axes in FIG. 35B. In the case in which X and Y axes of the translation stage part 141 are rotated to diagonal directions as viewed in a plan view, the stroke amounts in the lengthwise and width directions can be increased without increase of the placement surface 142 in size, and as a result this arrangement can be advantageous when a larger measurement object is measured. In the exemplary arrangement shown in FIG. 36B, the X and the Y axes in which the translation stage part 141 is translated forms an angle of 45° with the depth direction in which the stage 140 is moved toward and away from the support 700 (top-and-bottom direction in FIG. 36B) and the width direction perpendicular to the depth direction (right-and-left direction in FIG. 36B) as viewed in a plan view of the placement surface 142. According to this arrangement, the stroke amount in the width direction can be increased to $\sqrt{2}$ times while keep the size of the translation stage part 141 same as the that of FIG. 35B. It is noted that the inclination angle of the X and Y axes with respect to the lengthwise and width directions is not limited to 45°, and similar effects can be provided as long as the inclination angle is a diagonal angle (e.g., within a range 40° to 50°). However, if the inclination angle is small, the effect of increase of the stroke range in which the translation stage part 141 is moved in the width direction. For this reason, the inclination angle is preferably defined approximately 45° which can provide the largest increase of the stroke range.

(Automatic Selection in Measurement)

Automatic selection using prescanning has been described in the foregoing embodiment. However, automatic selection in the present invention is not limited to the automatic selection using the prescanning but can estimate areas that are not measured yet during generation of the measurement data without using prescanning and expand the measurement area zone at any timing. In this case, time for prescanning before measurement can be saved. On the other hand, according to this method, because the first set of measurement data is obtained at the initial position of the measurer 100 (e.g., reference position such as original point), overlaps may occur depending on measurement area zone determination ways. For example, if the measurement starts from the reference position (center) of the stage 140, in the aforementioned case of FIG. 33B the measurement at the center is used but in the cases of FIGS. 33D and 33F because measurement data corresponding to the center will be unnecessary the measurement at the center is wastes, and as a result wasted measuring time will be included.

(Automatic Selection of Measurement Orientation)

As discussed above, when the rotation stage part 143 is rotated, the orientation (i.e., rotation angle) of the measurement object can be automatically determined by the movement controller 144. Here, the rotation angle is the fixed predetermined rotation pitch in the foregoing embodiment. For example, the rotation stage part is rotated by a small rotation pitch of 60° six times so that it is totally rotated 360°, that is, one turn. Alternatively, the rotation stage part is can be rotated by another predetermined angle such as by a rotation pitch of 90° four times or by a rotation pitch of 45° eight times.

Also, as another method for determining a rotation angle, such a rotation angle can be determined based on measurement data that is obtained by using prescanning. For example, wall surfaces of a measurement object is searched by the movement controller 144 or the CPU 210 from the partial shape data that is obtained by using prescanning, and if wall surfaces are clearly detected the 90° pitch rotation is selected, on the other hand if not detected the 60° pitch rotation is selected. According to this automatic selection, because in the case of a relatively simple shape the shape can be easily grasped even when the rotation is rough, on the other hand, in the case of a complicated shape whose wall surfaces are unlikely to detect fine shape data is obtained by using small angular pitch, proper accuracy can be provided, and the processing can be simplified and be faster depending the measurement objects.

(Automatic Selection of Optical Measurement Conditions)

Also, optical measurement conditions which are needed in measurement operations can be automatically determined. For example, exposure time of the photoreceptor 120 can be automatically adjusted to optimal exposure time depending on the area of a measurement object at each measurement position.

(Imaging Area)

If a measurement object is small, the image capture area is not entirely used for processing but only an area which includes the measurement object can be automatically selected as the imaging area to be used for processing. When the image area can be reduced as in this case, the measuring time can be shorter.

Third Embodiment (Automatic Exposure)

Figure 37:
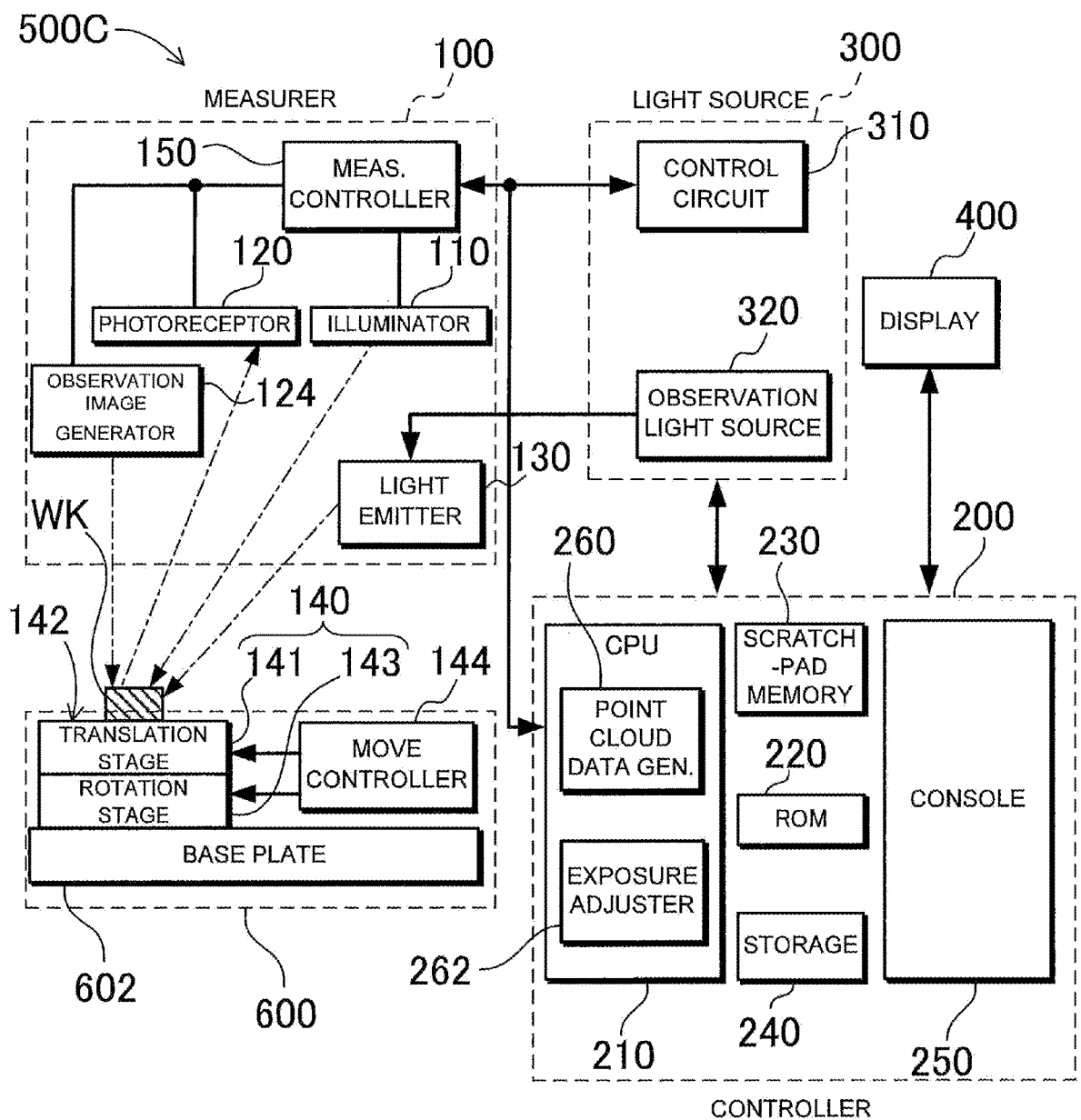
FIG. 37 is a block diagram showing a three-dimensional shape measuring apparatus according to a third embodiment.

In a three-dimensional shape measuring apparatus which observes down a measurement object in a slant direction from the top, measurement light exposure can be optimally adjusted based on brightness of the measurement object itself which is placed on the placement surface 142 irrespective of brightness on the outside. This automatic adjustment of light exposure conditions is referred to as automatic exposure. A three-dimensional shape measuring apparatus according to a third embodiment which has such an automatic exposure function is shown in FIG. 37.

In the arrangement in which the optical axis of the photoreceptor 120 does not perpendicularly intersect the placement surface 142 but the photoreceptor 120 is fixed in an orientation to face down a measurement object in a slant direction from the top as shown in FIG. 6, etc., because a measurement area in the height direction is necessarily sufficiently provided, the outside will be included in the field of view. Also, because a large area of the placement surface will be included in the field of view in addition to the outside, optimal exposure adjustment based on brightness of the measurement object itself is difficult. To address this, in the third embodiment, the automatic exposure function which extracts only a measurement object by excluding the outside and the placement surface and optimizes light exposure for the brightness. That is, to place emphasis on only the measurement object on the placement surface, only the measurement object is extracted to adjust the light exposure to the extracted measurement object, and as a result optimal measurement exposure adjustment to the measurement object can be made. Specifically, average luminance of the area that is extracted as the measurement object is calculated, and exposure time by which the average luminance is brought close to target luminance is calculated. This calculation is executed by an exposure adjuster 262 shown in FIG. 37.

(Elimination of Outside)

Figure 38:
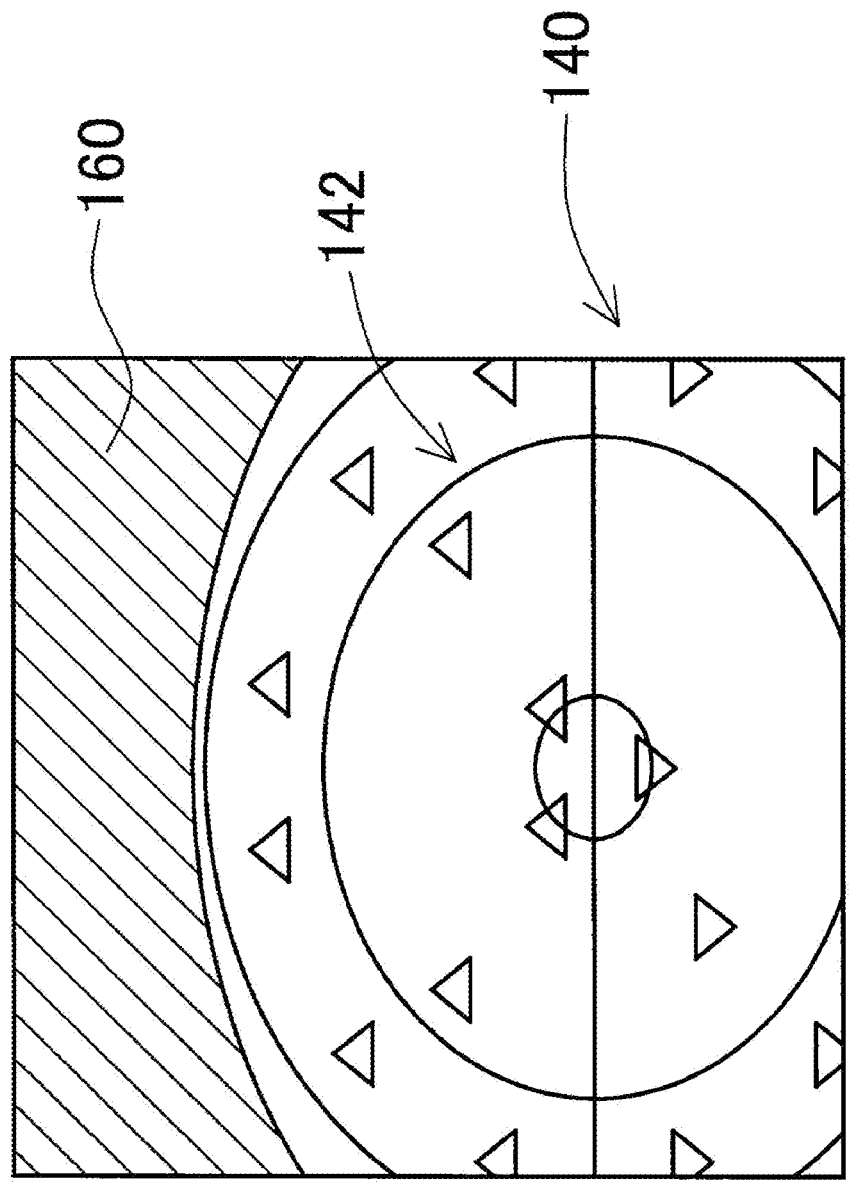
FIG. 38 is an image showing a placement surface area in an observed image.

In the three-dimensional shape measuring apparatus 500C according to the third embodiment, the position of the placement surface 142 in an image that is captured by the measurer 100 can be defined by previous calibration of the positional relationship between the measurer 100 and the placement surface 142. Because the apparatus is constructed to be able to measure a measurement object having a certain height, the outside will be widely included outside the placement surface in the field of view when a measurement object is not placed on the placement surface. For this reason, average luminance is calculated with emphasis on only the placement surface so that the exposure time is calculated, and as a result influences of the outside can be eliminated. As discussed above, the exposure adjuster 262 can properly adjust exposure time in accordance mainly with a measurement object by removing areas corresponding to the outside in the field of view (i.e., areas around the placement surface 142). As an example of such an image, a placement surface area of only the placement surface 142 in the observed image is shown in FIG. 38. A light-shielding curtain 160 is seen on the far side of the placement surface 142.

(Elimination of Placement Surface)

Even if the outside is eliminated, when a measurement object is small and overlaps only a part of the placement surface, because brightness of the placement surface affects the exposure adjustment, optimal exposure settings to the measurement object can be obtained. For example, if the placement surface is dark and a measurement object is small, influences of the placement surface will make exposure time longer, and as a result an image of the measurement object will be too bright. To address this, the exposure adjuster 262 extracts an area corresponding to the measurement object in the placement surface 142 and calculate average luminance of only the measurement object to calculate the exposure time, and as a result influences of the placement surface 142 can be eliminated. The following description will describe such a method for eliminating the placement surface 142.

(1: Method for Recognizing Area Having Large Brightness Difference from Placement Surface as Measurement Object)

A first example of the method for eliminating the placement surface can be provided by a method for recognizing an area having large brightness difference from the placement surface as a measurement object. In this method, the brightness of the placement surface is previously is obtained when any measurement object is not placed, and the brightness information is stored in the three-dimensional shape measuring apparatus. When a measurement object is placed, the exposure adjuster 262 recognizes an area having large difference from the brightness in which any measurement object is not placed so that exposure adjustment to the measurement object is made.

Figure 39:
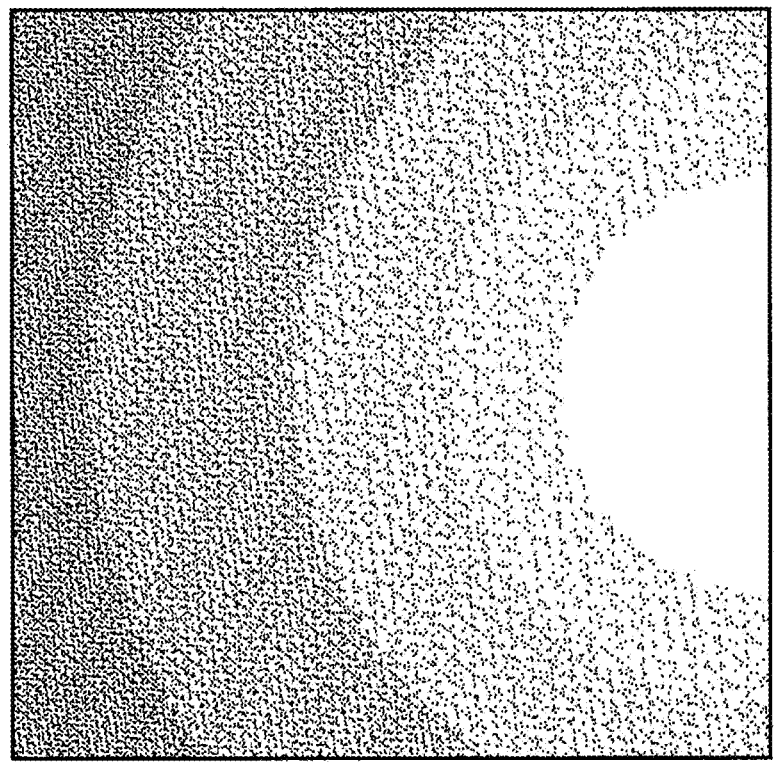
FIG. 39 is an image showing an exemplary placement surface brightness image to be stored for quadratic curve fitting.

Here, to previously store the brightness of the placement surface in the three-dimensional shape measuring apparatus, a method for storing the image of the placement surface as well as a method for storing only coefficients of a quadratic function or the like which is fitted to a brightness curve can be used. A method for storing the image of the placement surface as a brightness image of the placement surface is shown in FIG. 38, and a method for storing quadratic curve fitting as a placement surface brightness image is shown in FIG. 39.

It is noted that, if brightness of a measurement object is similar to that of the placement surface, although the measurement object cannot be distinguished from the placement surface, because exposure adjustment will be made to areas including both the measurement object and the placement surface, this exposure adjustment will be optimum for the measurement object, problems do not arise.

(2: Method for Recognizing Measurement Object by Using Edge Extraction)

In addition, a method for recognizing a measurement object by using edge extraction can be used as another method for eliminating the placement surface. In this method, the exposure adjuster 262 extracts edges from an observed image, and finds the boundary between the background and the measurement object whereby extracting only the measurement object. It is noted that an image processing amount of this method is likely to be large and calculation time is likely to be correspondingly long as compared with the aforementioned method for recognizing an area having large brightness difference from the placement surface as a measurement object.

(Example of Three-Dimensional Measurement)

An example of measurement which measures a machined metal piece formed of a thin metal sheet as a measurement object by using the three-dimensional shape measuring apparatus 500 according to this embodiment is now described with reference to FIGS. 40 to 44. Typically, such a machined metal piece is formed from a material which is pressed by rollers to reduce its thickness and then formed into a metal sheet by shaping, cutting or stamping the metal sheet by using a press die. In this case, because there is a possibility that a defective condition occurs in processing if thickness of each part of the machined piece does not fall within a predetermined range, there are needs to check the thickness of the machined piece.

(Thickness Measurement Screen 1200)

Figure 40:
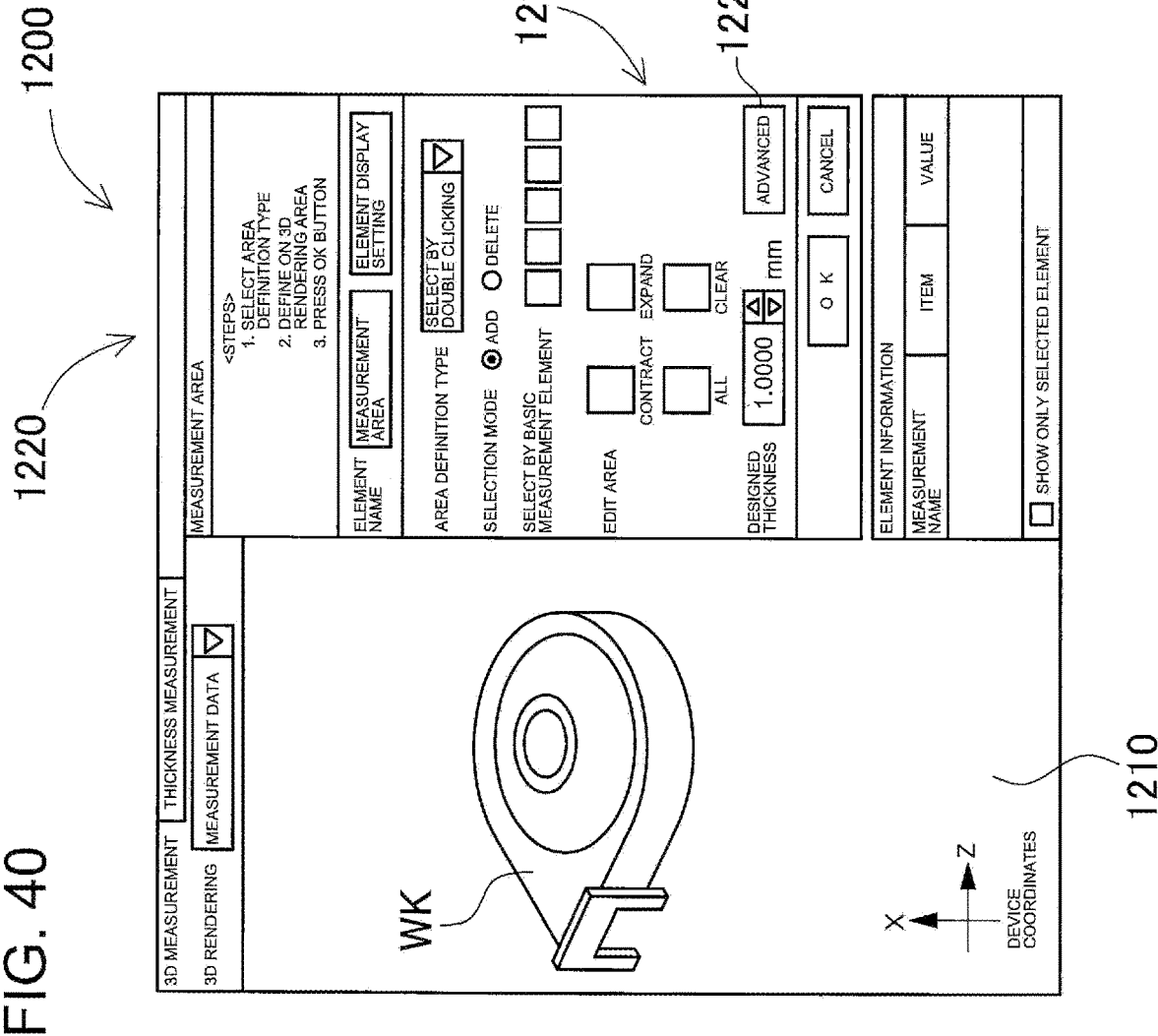
FIG. 40 is an image showing a GUI in a thickness measurement screen for measuring thickness by using a three-dimensional shape measuring program

FIG. 40 shows an exemplary GUI of a thickness measurement screen 1200 in which thickness measurement is made in a three-dimensional shape measuring program for executing three-dimensional shape measurement by using the three-dimensional shape measuring apparatus. An image display area 1210 which displays an image is arranged in the left part of the thickness measurement screen 1200, and a setting panel 1220 which makes settings of measurement which measures thickness of a measurement object in the right part. Different parts of a measurement object have different thickness, and a part of a measurement object to be required to be checked is changed depending on measurement objects. Users can specify areas to be measured, designed thickness, additional search thickness, display settings (settings of color palette), and the like through the setting panel 1220.

Users can select areas to be subjected to thickness measurement by clicking arbitrary points on a measurement object WK which is displayed in the image display area 1210. When a user click any point on the measurement object, a continuous surface including the clicked point is automatically extracted and selected as a thickness measurement area.

The setting panel 1220 includes basic measurement element designation buttons 1222, an advanced setting button 1224, and the like. A plurality of basic measurement elements (e.g., plane, cylinder, circular cone, sphere, point) are arranged as the basic measurement element designation buttons 1222. When a user selects any of the basic measurement element designation buttons 1222, thickness of only a part having a geometrical shape corresponding to the selected basic measurement element can be measured. When a basic measurement element is selected, an image corresponding to the selected basic measurement element is superposed on the measurement object WK in the image display area 1210.

Figure 41:
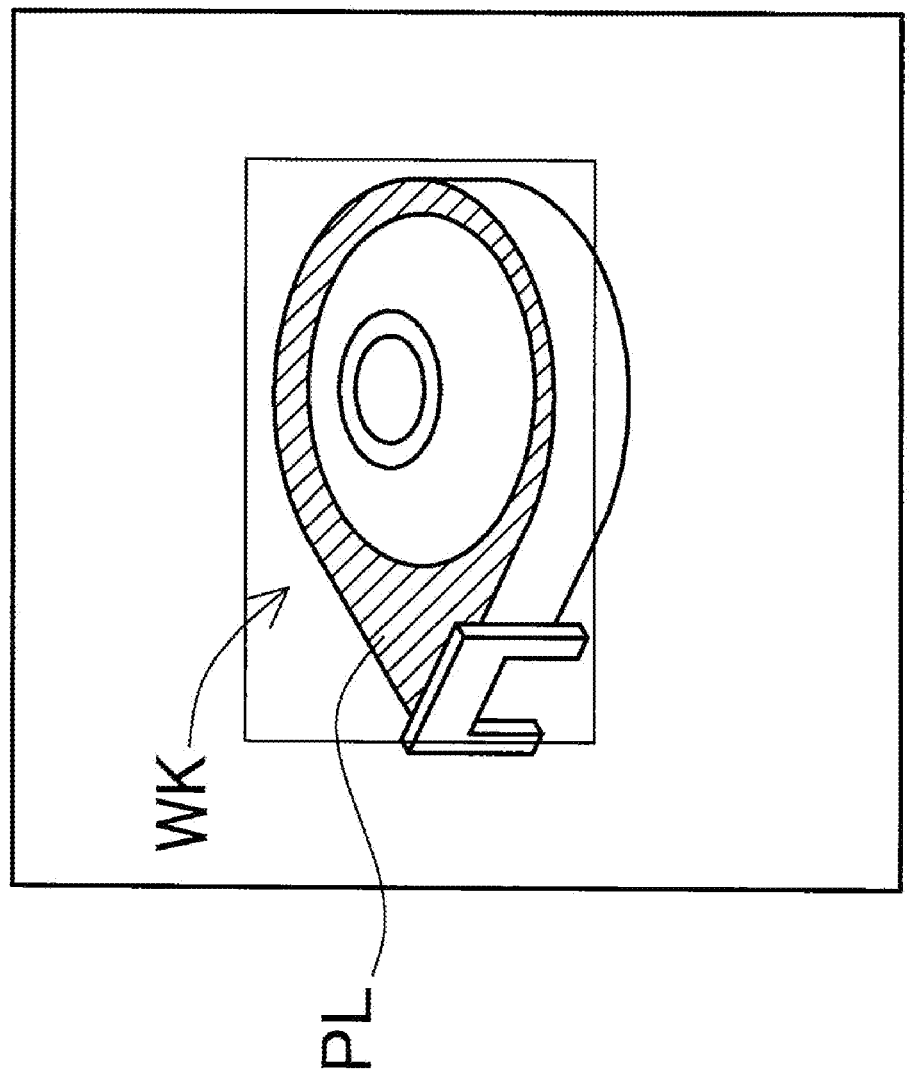
FIG. 41 is an image showing a selection result in an image display area when a flat part as basic measurement element is selected.
Figure 42:
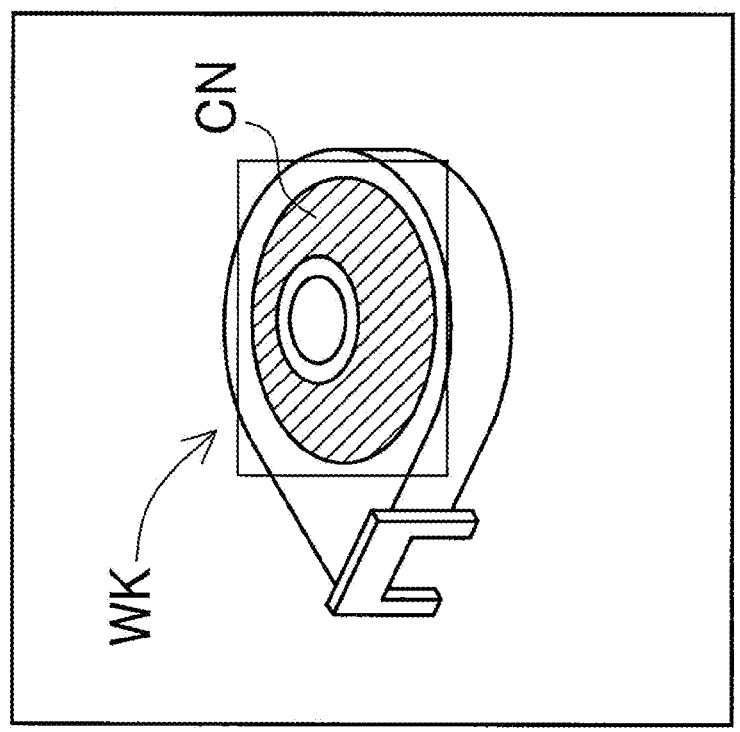
FIG. 42 is an image showing a selection result in an image display area when a conical part as basic measurement element is selected.

FIG. 41 shows a selection result when a basic measurement element of "plane" is selected. A plane including the point which is selected by a user is calculated based on least-squares method so that points that are included in the calculated plane PL are extracted as a surface subjected to thickness measurement.

Also, FIG. 41 shows an exemplary selection result when a basic measurement element of "cone" is selected, and the points that are included in the selected circular cone CN are extracted as a surface subjected to thickness measurement.

As discussed above, any area corresponding to a part of the machined piece to be subjected to thickness measurement can be selected by selecting from among basic measurement elements. Accordingly, users can made settings of suitable designed thickness, additional search thickness, and the display (color palette) for an emphasized area. Also, the measurement object can be entirely selected as thickness measurement area without selecting any of the basic measurement elements.

(Setting Window 1300)

Figure 43:
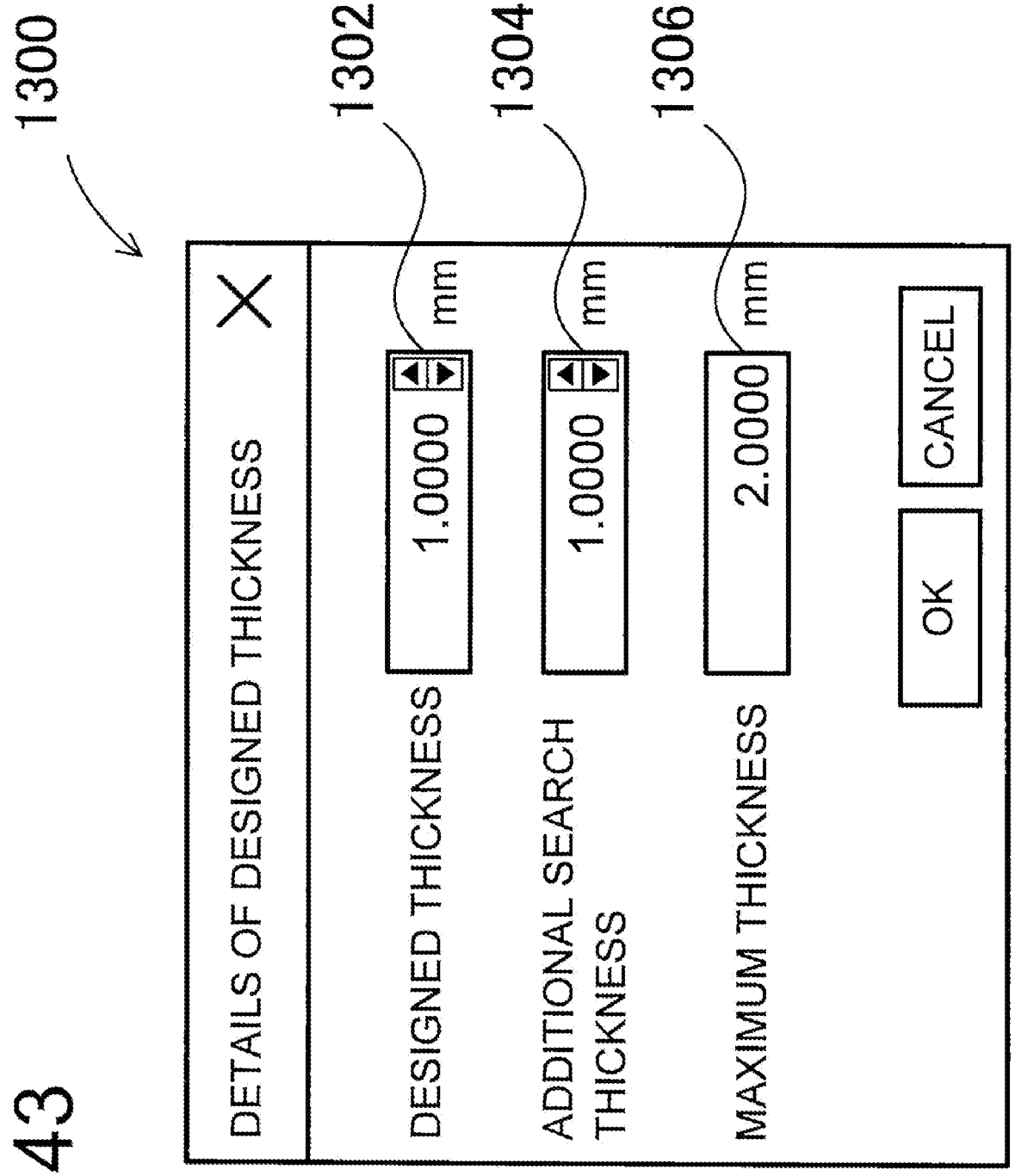
FIG. 43 is an image showing an exemplary setting window.

In the thickness measurement screen 1200 shown in FIG. 40, when the advanced setting button 1224 is pressed in the setting panel 1220, a setting window 1300 shown in FIG. 43 for specifying designed thickness and additional search thickness is popped up. Users can enter a designed value of thickness into a designed thickness field 1302, and a value which represents thickness to be additionally searched added to the designed thickness in an additional search thickness field 1304. In the example shown in FIG. 44, 1.000 mm is entered as additional search thickness to be additionally searched added to the designed thickness 1.000 mm and as a result the maximum thickness 2.000 mm is automatically calculated, and indicated in a maximum thickness field 1306. Thickness at a target point on the surface side can be calculated by searching a point on the back surface side in proximity to the target point. The term "search" referred here is processing to calculate thickness at a target point by searching a point closest to the target point which is included in the surface of the measurement object within a predetermined angular range with respect to a direction opposite to a normal to the surface at the target point. Thickness at a target point on the measurement object can be calculated as a distance between the target point and its corresponding point by searching the corresponding point which is positioned on the direction which is substantially opposite to the normal. In the case in which the maximum thickness 2.000 mm is specified, even when a point that is included in the surface of the measurement object is found, if the point is spaced at a distance greater than the proximity point 2.000 mm away from the target point, the point is not considered as its corresponding point, and as a result the point is out of thickness measurement.

(Reduction Percentage Setting Screen 1400)

Figure 44:
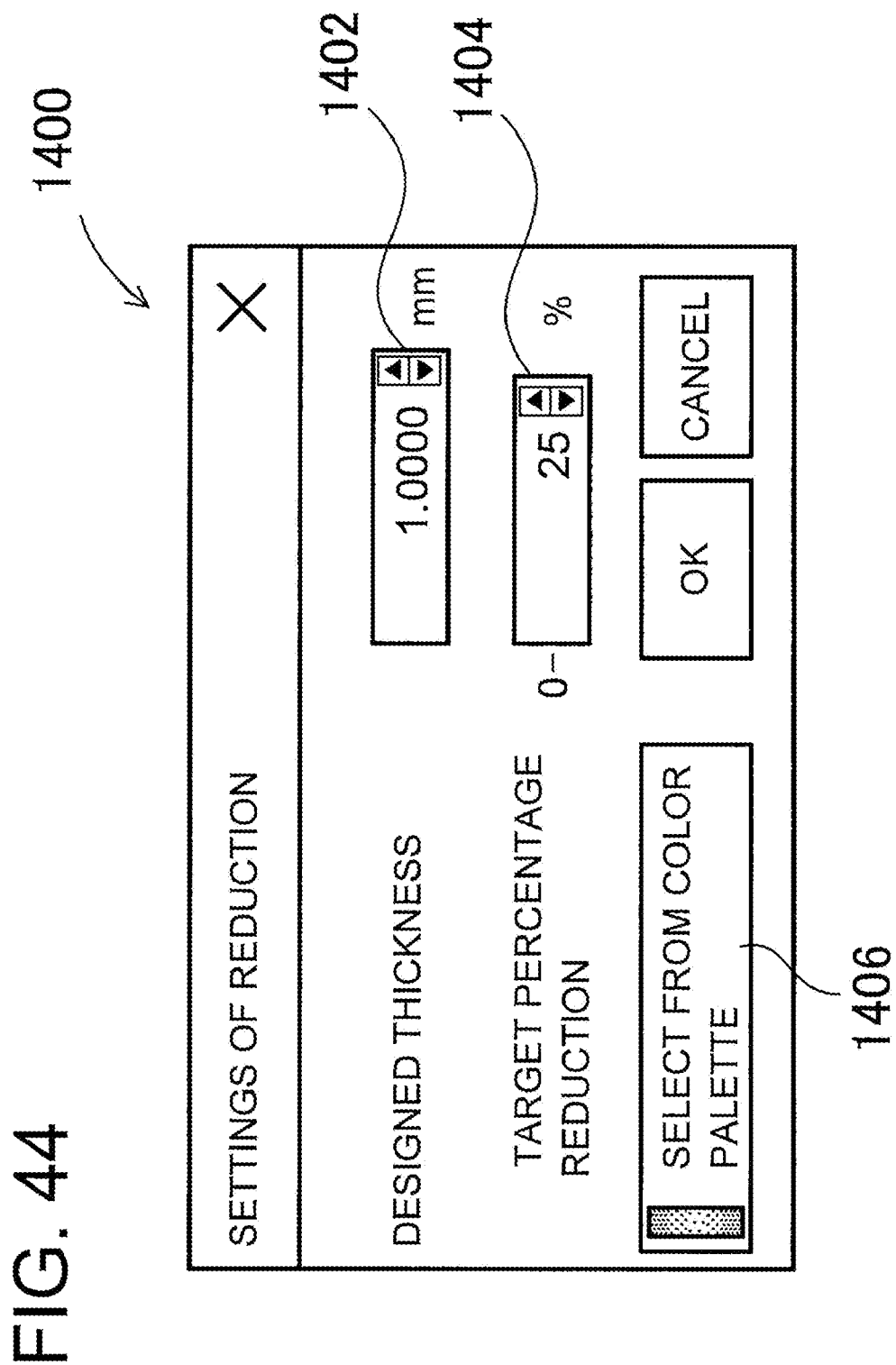
FIG. 44 is an image showing an exemplary reduction percentage setting screen.

A reduction percentage can be specified relative to designed thickness that is defined by users. The reduction percentage is a value relative to the designed thickness representing a thickness reduction percentage which is allowable to users. An exemplary reduction percentage setting screen 1400 which specifies the percentage reduction is shown in FIG. 44. In the reduction percentage setting screen 1400, the reduction percentage is specified in the target percentage reduction field 1404 as 25% with respect to the designed thickness 1.000 mm which is specified in a designed thickness field 1402 so that thickness reduction up to 0.750 mm is within the allowable limits.

(Settings of Color Palette)

In addition, in the percentage reduction setting screen 1400, when a color palette setting button 1406 is pressed, colors can be selected from a color palette. Thickness of a measurement object can be visualized by properly specifying colors from the color palette. When colors are specified in the color palette to continuously vary in accordance with the thickness, users can easily distinguish between thick and thin parts. In this case, when colors are automatically distributed so that the designed thickness is indicated by a neutral color (e.g., green), and thicker and thinner parts relative to the designed value are indicated by red and blue, respectively, users can easily find parts out of allowable thickness. The colors selected in the color palette are not limited to continuously variable colors but can vary stepwise. For example, when the reduction percentage is specified, a part thinner (or thicker) than the limit defined by the reduction percentage can be indicated by a color that is automatically specified different from other normal parts.

In this embodiment, because the thickness measurement area can be limitedly specified to a particular area, such colors selected from the color palette can be limitedly applied to the specified thickness measurement area. In particular, in the case in which designed thickness and reduction percentage vary depending on parts of a measurement object, the parts can be indicated by corresponding colors that are suitably specified in accordance with values specified for the parts in the color palette, and as a result users can easily find a defective part.

Also, the thickness at the position that is specified by a user can be superimposed to be indicated on the measurement object to which colors specified in the color palette are applied. In addition, the maximum thickness, the minimum thickness, average thickness, and the like in the area that is specified by a user can be automatically calculated and indicated.

A three-dimensional shape measuring apparatus according to the present invention can be used for three-dimensional shape measuring apparatuses and digitizers which measure height of a measurement object by using the triangulation principle, and inspection apparatuses which determine non-defective/defective based on the measurement results.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. A three-dimensional shape measuring apparatus which measures a three-dimensional shape of a measurement object, the three-dimensional shape measuring apparatus comprising:

a stage that includes a placement surface on which a measurement object is placed, and can move the placement surface;

a movement controller that controls the movement of the stage;

an illuminator that illuminates the measurement object, which is placed on the stage, with measuring light having a predetermined pattern;

a photoreceptor that receives the measuring light which is reflected by the measurement object illuminated by the illuminator, and provides light-reception signals representing a light reception amount; and a processor that generates a set of shape data representing three-dimensional shape of at least a part of the measurement object which is included in a measurement field of view of the photoreceptor at a particular position of the stage based on the light-reception signals which are provided from the photoreceptor, determines whether the measurement object is included in the measurement field of view based on the shape data corresponding to the at least the part of the measurement object, automatically defines measurement areas of the measurement object if the measurement object is too large to be included in the measurement field of view, repeats movement of the stage to the measurement areas by using the movement controller to obtain a set of shape data corresponding to other part of the measurement object which is located in proximity to the at least the part of the measurement object and the generation of the set of shape data of the measurement object at the position where the stage is moved, and generates combined shape data including the entire shape of the measurement object by combining the repeatedly obtained sets of shape data.

2. The three-dimensional shape measuring apparatus according to claim 1,
wherein the stage comprises
a rotation stage part that can rotate the placement surface about a rotation axis, and
a translation stage part that translates the placement surface in a plane to which the placement surface belongs, and
wherein the three-dimensional shape measuring apparatus further comprises a mount that supports the rotation stage part and the translation stage part so that they overlap one another as viewed in the rotation axis direction of the rotation stage part.

3. The three-dimensional shape measuring apparatus according to claim 2, wherein the processor determines whether only rotates the rotation stage part, or rotates the rotation stage part and translates the translation stage part based on the shape data corresponding to the at least a part of the measurement object.

4. The three-dimensional shape measuring apparatus according to claim 2, wherein the movement controller controls X-Y direction movement of the translation stage part, and controls the rotation of the rotation stage part at the position after the X-Y direction movement.

5. The three-dimensional shape measuring apparatus according to claim 2, wherein the translation stage part is arranged above the rotation stage part, which is supported by the mount, to be able to be translated in the stage.

6. The three-dimensional shape measuring apparatus according to claim 2 further comprising
a support that is coupled to the mount, and fixedly supports the illuminator and the photoreceptor to produce the measurement areas to be measured by the measuring light above the stage, and
a fixer that is fastened to an upper part of the support, and fixes the illuminator and the photoreceptor to incline optical axes of the illuminator and the photoreceptor with respect to the placement surface so that the illuminator and the photoreceptor face the measurement areas obliquely downward.

7. The three-dimensional shape measuring apparatus according to claim 2, wherein the processor is capable of generating shape data of the measurement object under simple generation conditions.

8. The three-dimensional shape measuring apparatus according to claim 7, wherein the simple generation conditions includes at least one of
shorter exposure time of the photoreceptor than normal,
higher gain than normal,
reduction in resolution,
limitation on the number of used illuminators if two or more illuminators are included,
limitation on the number of used projection patterns of the illuminator if two or more projection patterns are included,
limitation on the number of used photoreceptors if two or more photoreceptors are included, and
disallowance of rotation of the rotation stage part in acquisition of the light-reception signals.

9. The three-dimensional shape measuring apparatus according to claim 7, wherein the processor generates a top view map image representing a plan view of the measurement object, which is placed on the stage, as viewed downward from a position right above the measurement object based on simple shape data that is generated under the simple generation conditions, and determines the measurement areas to be measured based on an outline of the measurement object which is extracted from the top view map image.

10. The three-dimensional shape measuring apparatus according to claim 9, wherein the processor selects only rotation operation of the rotation stage part or the combination of rotation operation of the rotation stage part and translation operation of the translation stage part based on the determined measurement areas to be measured whereby measuring the measurement areas.

11. The three-dimensional shape measuring apparatus according to claim 1 further comprising an exposure adjuster that adjusts exposure time of the photoreceptor based on the light-reception signals provided from the photoreceptor by removing a surrounding area of the stage from the light-reception signals.

12. A three-dimensional shape measuring apparatus which measures a three-dimensional shape of a measurement object, the three-dimensional shape measuring apparatus comprising:
a stage that includes a placement surface on which a measurement object is placed, and can move the placement surface;
a movement controller that controls the movement of the stage;
an illuminator that illuminates the measurement object, which is placed on the stage, with measuring light having a predetermined pattern;
a photoreceptor that receives the measuring light which is reflected by the measurement object illuminated by the illuminator, and provides light-reception signals representing a light reception amount; and
a processor that generates a set of shape data representing three-dimensional shape of at least a part of the measurement object which is included in a measurement field of view of the photoreceptor at a particular position of the stage based on the light-reception signals which are provided from the photoreceptor, repeats movement of the stage by using the movement controller based on the shape data corresponding to the at least a part of the measurement object to obtain a set of shape data corresponding to other part of the measurement object which is located in proximity to the at least the part of the measurement object and the generation of a set of shape data of the measurement object at the position where the stage is moved, and generates combined shape data including the entire shape of the measurement object by combining the repeatedly obtained sets of shape data, wherein
the processor is capable of generating shape data of the measurement object under simple generation conditions, and
the processor generates a top view map image representing a plan view of the measurement object, which is placed on the stage, as viewed downward from a position right above the measurement object based on simple shape data that is generated under the simple generation conditions, and determines a measurement area or measurement areas to be measured based on an outline of the measurement object which is extracted from the top view map image.

* * * * *